(12) United States Patent
Walz

(10) Patent No.: US 6,437,776 B1
(45) Date of Patent: *Aug. 20, 2002

(54) VIDEO ASSISTED PROGRAM ENVIRONMENT

(76) Inventor: Barton A. Walz, P.O. Box 7887, Charlottesville, VA (US) 22906

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,189

(22) Filed: Jun. 30, 1997

(51) Int. Cl.[7] ................................................ H04N 7/12
(52) U.S. Cl. ...................................... 345/330; 345/346
(58) Field of Search ................................ 345/326–358; 395/200.34–200.37, 396, 330; 709/204–207; 348/14

(56) References Cited

U.S. PATENT DOCUMENTS

| | | | | |
|---|---|---|---|---|
| 4,974,173 A | * | 11/1990 | Stefik et al. ................ 345/332 |
| 5,392,400 A | * | 2/1995 | Berkowitz et al. .......... 345/330 |
| 5,440,699 A | | 8/1995 | Ferrand ...................... 395/155 |
| 5,491,743 A | * | 2/1996 | Shiio et al. ................. 345/330 |
| 5,524,195 A | | 6/1996 | Clanton ...................... 395/155 |
| 5,530,796 A | | 6/1996 | Wang ......................... 395/156 |
| 5,539,886 A | * | 7/1996 | Aldred et al. ........... 345/330 X |
| 5,541,662 A | | 7/1996 | Adams ....................... 348/460 |
| 5,544,300 A | * | 8/1996 | Skarbo et al. .......... 345/330 X |
| 5,557,724 A | | 9/1996 | Sampat ....................... 395/157 |
| 5,564,043 A | | 10/1996 | Siefert ....................... 395/600 |
| 5,594,859 A | * | 1/1997 | Palmer et al. ............... 345/330 |
| 5,617,539 A | * | 4/1997 | Ludwig et al. .......... 345/330 X |
| 5,655,066 A | * | 8/1997 | Martin et al. ............... 345/332 |
| 5,758,110 A | * | 5/1998 | Boss et al. .................. 345/329 |
| 5,764,901 A | * | 6/1998 | Skarbo et al. .......... 345/330 X |
| 5,774,117 A | * | 6/1998 | Kukkal et al. .............. 345/330 |
| 5,790,127 A | * | 8/1998 | Anderson et al. ....... 345/330 X |

OTHER PUBLICATIONS

Ishii, "TeamWorkStation: Toward a Seamless Shared Workspace", CSCW '90 Proceedings, pp. 13–26, Oct. 1990.*
Ishii et al., "Design of TeamWorkStation: A Realtime Workspace Fusing Desktops and Computer Screens", Multi–User Interfaces and Applications, pp. 131–142, May 1990.*
Cowart, "Mastering Windows 3.1", Sybex, pp. 14–30, 151–156, Sep. 1992.*

* cited by examiner

Primary Examiner—Steven Sax

(57) ABSTRACT

A second environment that operates with the standard operating single computer system and then co-exists with the environment 1 already in place and operating in the computer system. Upon execution of a computer language code this second environment opens in a seamless integration of its program to its new tasks that you select. One example allows video teleconferencing to be activated while the other environment remains available for all usual computer tasks. Thus two separate operations can be simultaneous with all the typical tasks available within each of the separate environments. Multiple separate environments can be encompassed, and more than one video monitor can be utilized to ease the visual separation of such multiple applications, and all such applications are based on a single computer system with usual configuration and software.

10 Claims, 67 Drawing Sheets

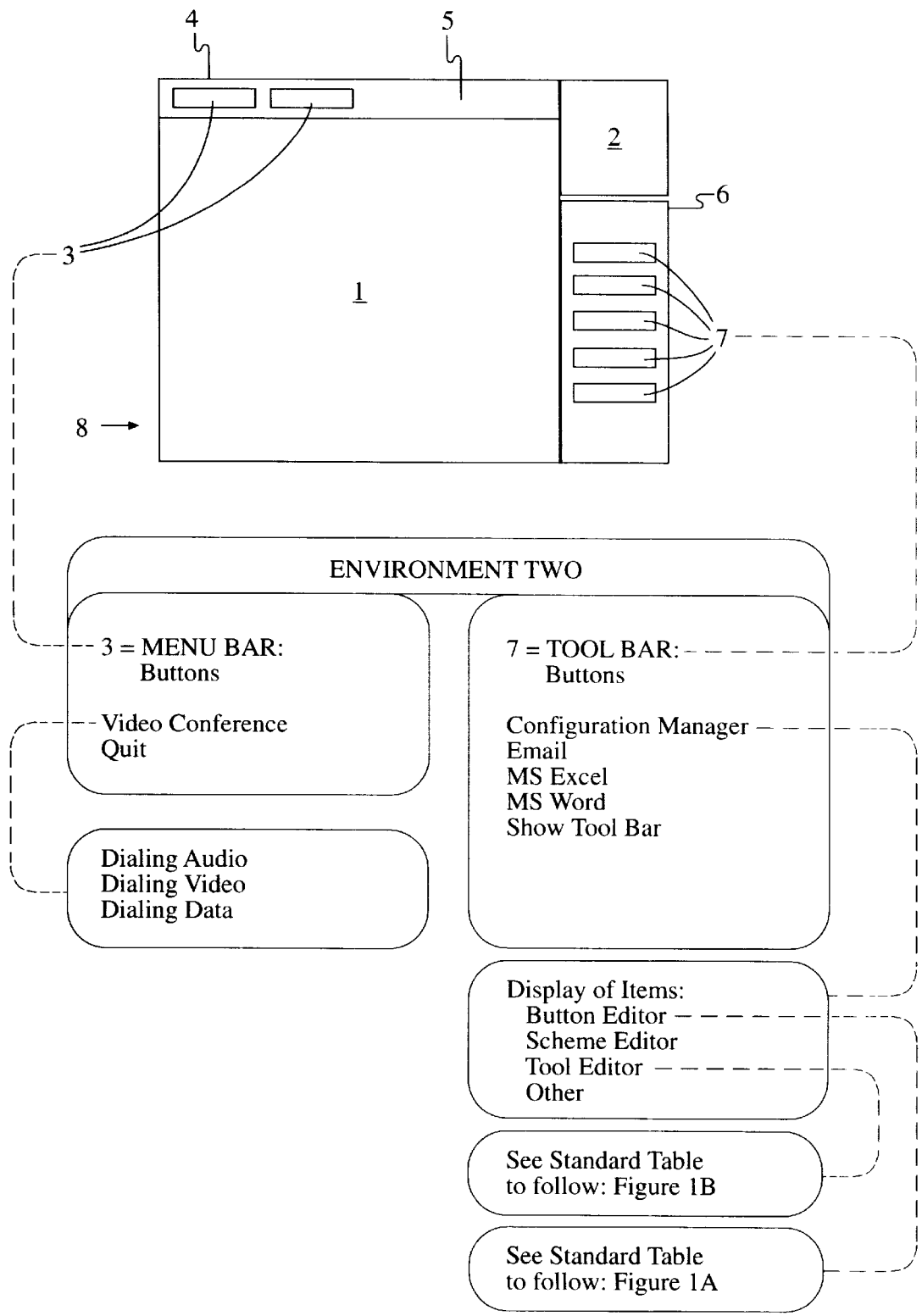

Figure 1A

STANDARD TABLE FOR BUTTON EDITOR

BUTTON EDITOR:

Actions
   Text
   Bitmap
   Type**
   Program
   Arguments
   Browse
Properties
   Schemes   12 choices
   Size
   Width
   Height
   Border
   CLEAR   removes entries
     No border
     Shrink to fit
     Grow if needed
   Update =
     This button
     This row
     This column
     All buttons

** 24 functions & controls here

Figure 1B

STANDARD TABLE FOR TOOL BAR EDITOR

TOOL BAR EDITOR:

Position
   Display
     Monitor One
     Monitor Two
     Multiple
Properties
   No border
   Shrink to fit
   Grow if needed
   Update this button
   Size width
   Size height
   Border field
Area
   Hide all
   Show program
   Show icon
   Show video
   Show environment
   Display Move Tool Bar __Top
__Left          __Right
    __Bottom

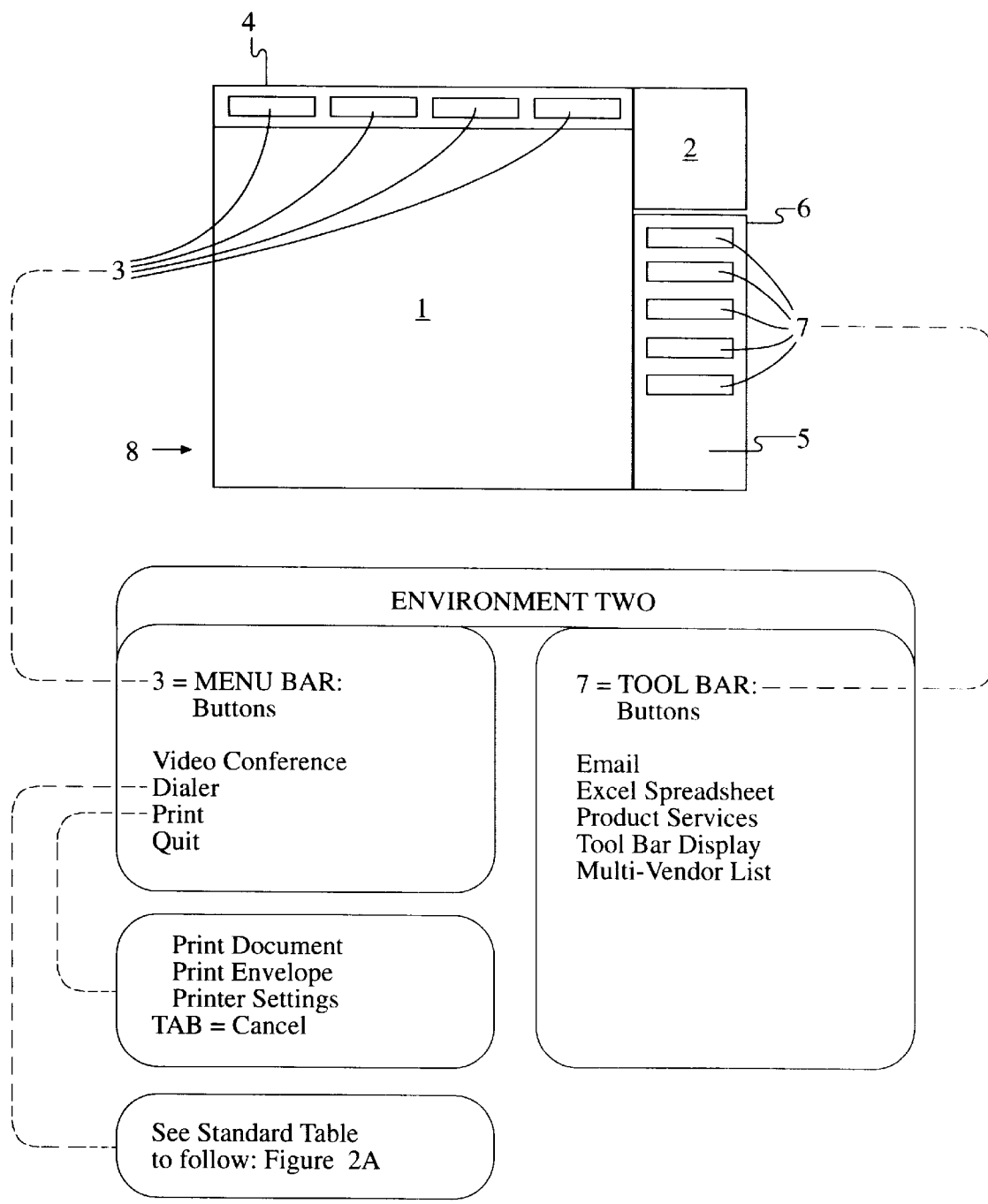

Figure 2A

STANDARD TABLE FOR DIALER

DIAL LIST
    Right click
  Button
    Tech Support*
  Contact
    Info Editor
      Database
        Connectivity
  Connection
    ISDN
    TCP/IP
    IPX
    POTS
    DSL
    T-1
    SAT
    WL
    Other
  TAB = Load contact from database
  INFO = Name
        Address
        City, State
        Phone #
        E-mail

* generic program name; can be renamed

VIDEO TOOLBAR
Switch to Full Screen
1/4 Size

VIDEO TOOLBAR
Switch to Full Screen
Full Size

Figure 6A

TABLE OF STANDARD MENU ITEMS

Menu Buttons
    Activate any other button type
    Desktop Navigation

Selection Buttons
    Multiple actions
    Pre-configured activity

Functions
    Auto Boot/Reboot
    Auto Respond
    Compression
    Decryption
    Encryption
    Inline translation
    Pipelining
    Remote diagnostics
    Remote control
    Network Bindery Activities
    Browse internet
    Navigate directory structure
    Navigate content
    Organize shortcut icons
    O/S operation
        Single
        Multiple
    Send/Receive Email
    Transfer files Commands
    Environmental
        Global
        Local
        Multiple
    Launch
        Applications
        Utilities
    Enable/Disable modem
    Multi-environmental command carriers
    Scripting
        Smart Agents
        Embedded process

Figure 6B

TABLE OF STANDARD TOOL BAR ITEMS

Tools
    Editors
        Button Editor
        Headline Editor
        Layout Editor
        Schemes Editor
        Startup Group Editor
        Toolbar Editor
        Video Editor
    Managers
        Application
        Communication
        Configuration
        Environment
        File
    Resource Detection
    Communication
        Bandwidth availability
        Multipoint
        Topology Type Detection
        Transfer Packet Analyser
    Collaboration
        Application Sharing
        Audio Sharing
        Data Sharing
        File Sharing
        Windowing Tool System
    Display
        Desktop
        Toolbar
        Video Source
            Internal
            External
            Multiple

SHOWING DRAWING ASSEMBLY

MULTIPLE ENVIRONMENTS:
Showing Connectivity

Figure 7:
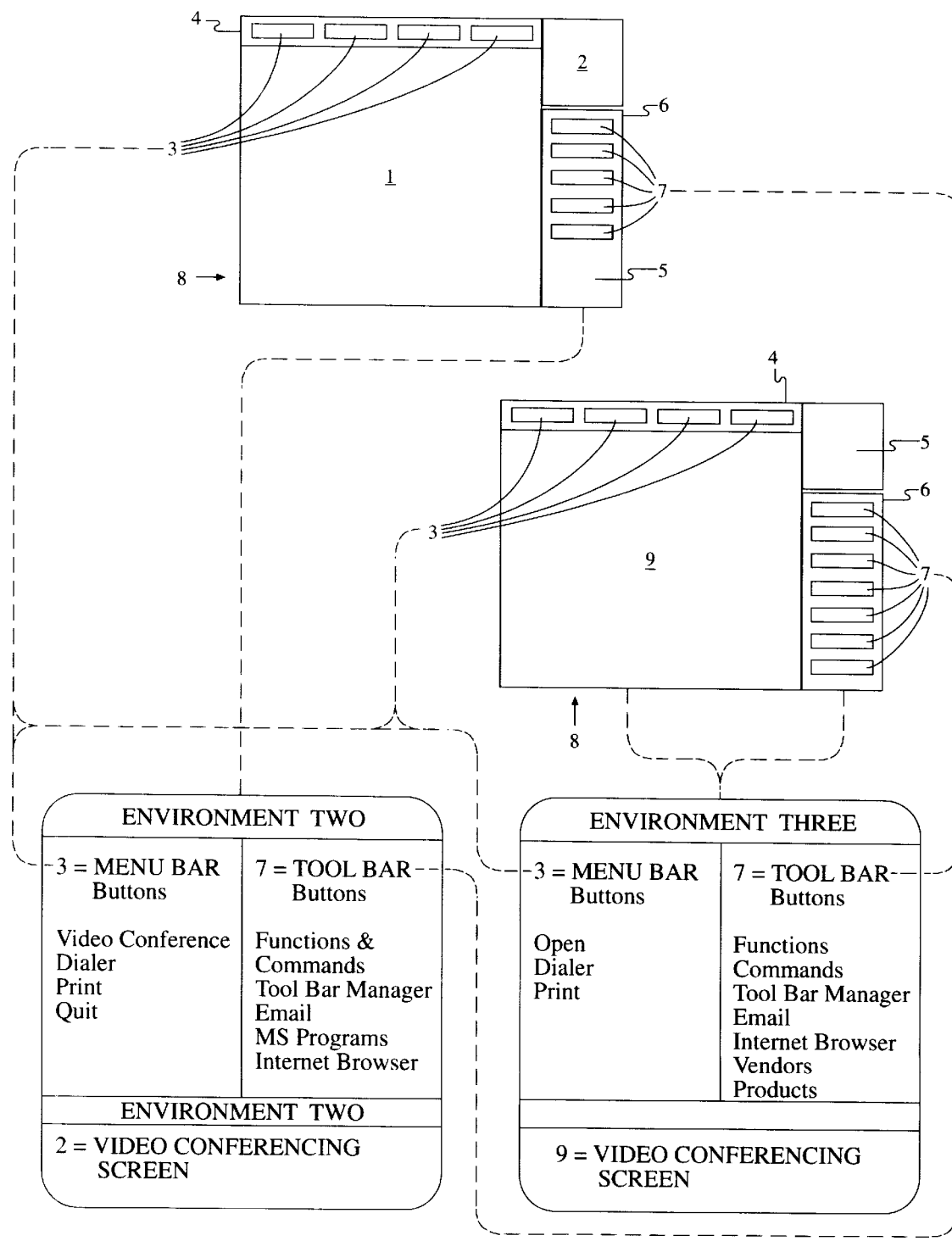
Figure 7A:
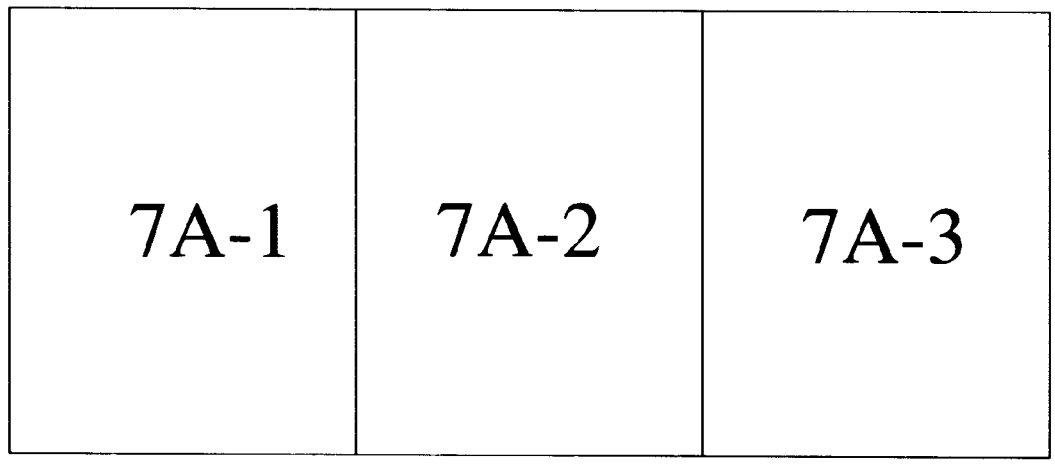
Figure 7A:
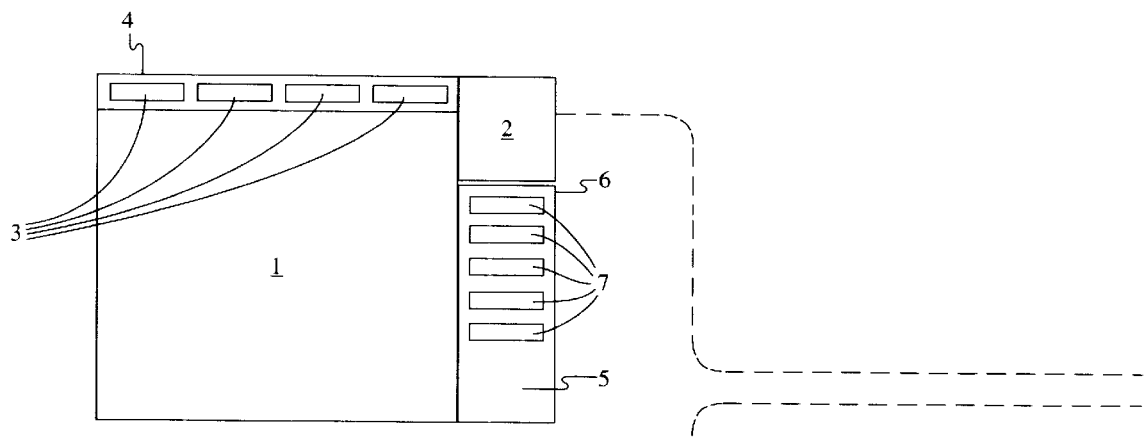
Figure 2:
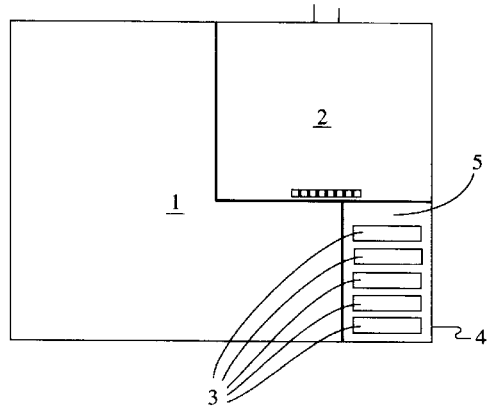
Figure 3:
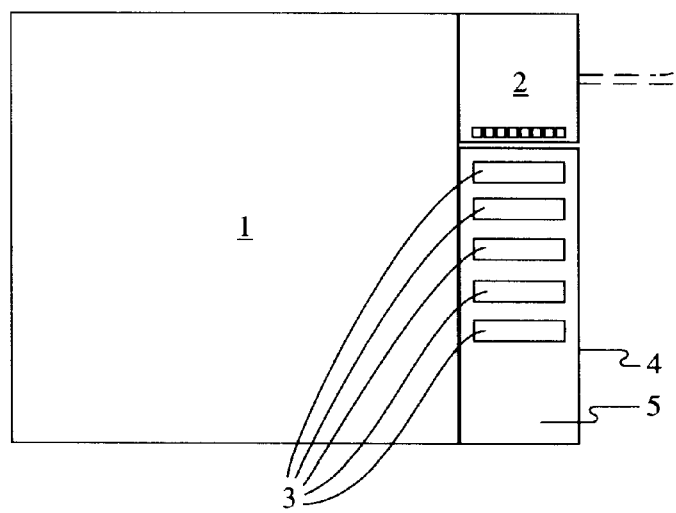

See Figure 7A-2

MULTIPLE ENVIRONMENTS:
Showing Connectivity

Figure 1:
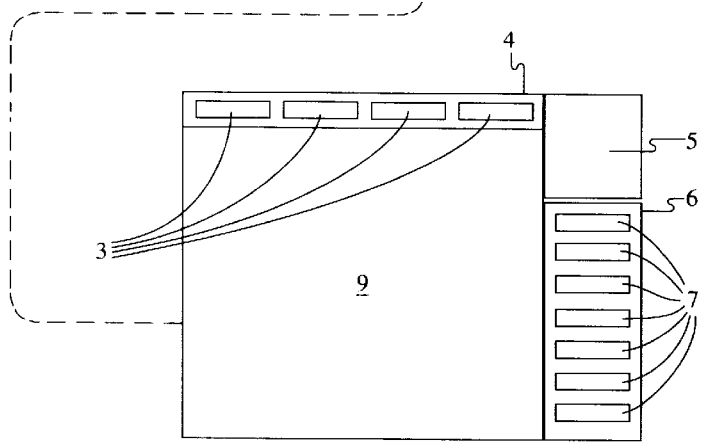
Figure 7A:
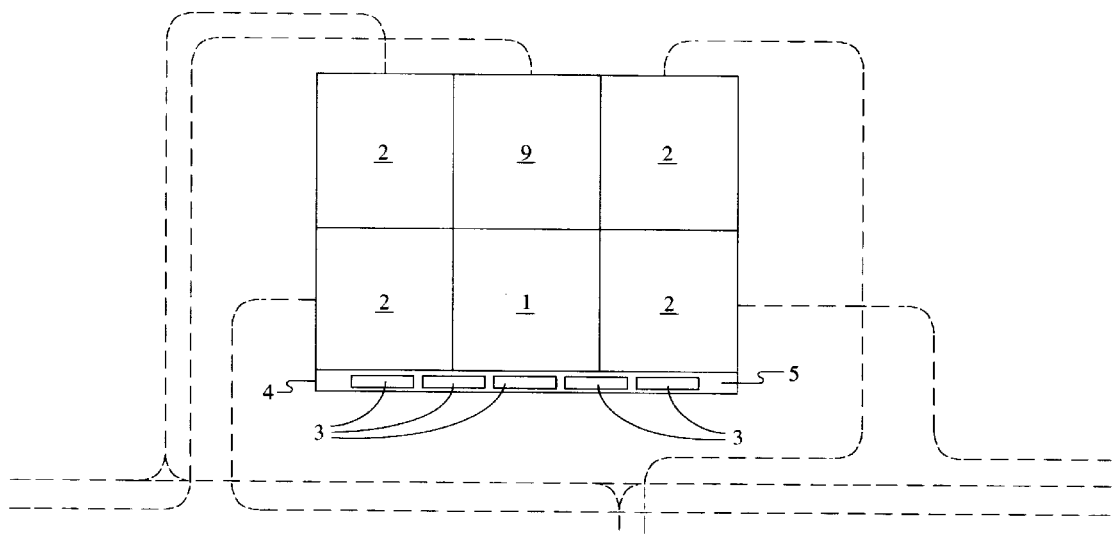

See Figure 7A-1

Figure 3:
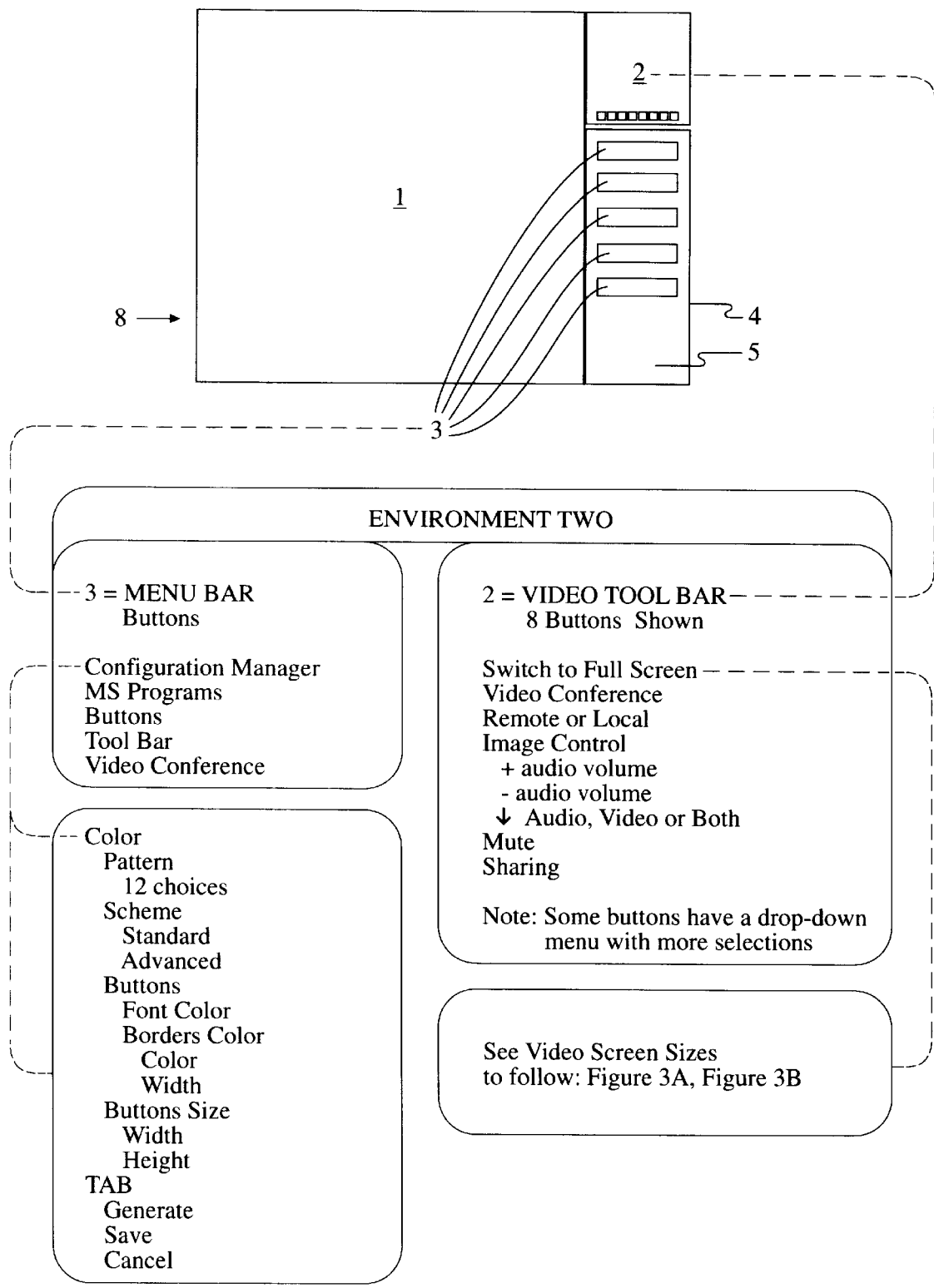
Figure 3A:
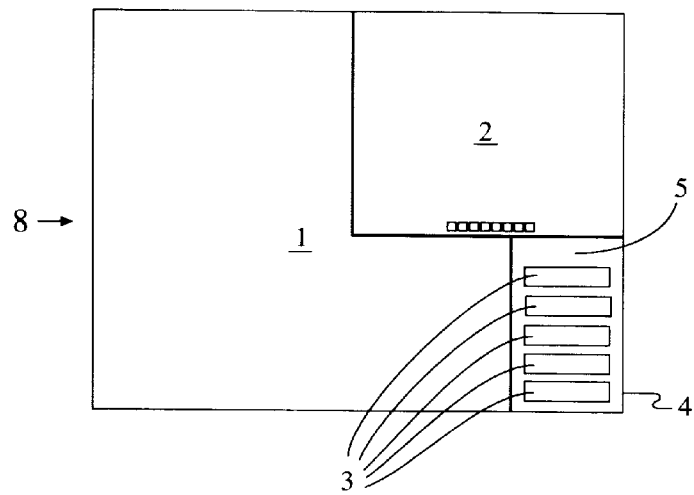
Figure 3B:
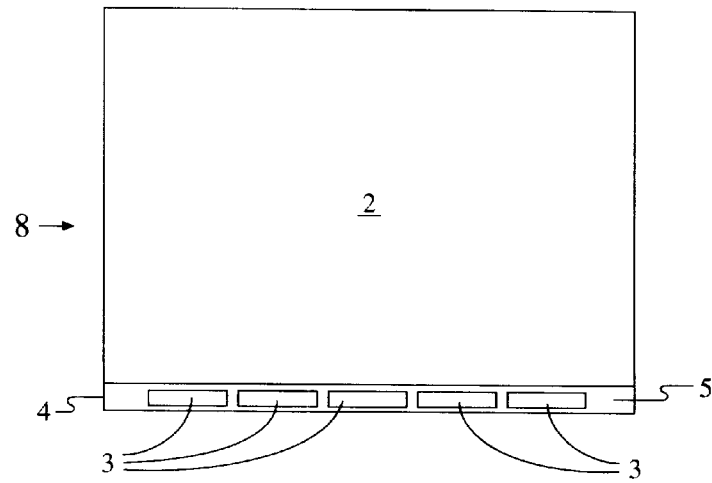

See Figure 7A-3

MULTIPLE ENVIRONMENTS:
Showing Connectivity

See Figure 7A-2

SHOWING DRAWING ASSEMBLY

MULTIPLE ENVIRONMENTS:
Showing Bidirectional Printing

Figure 7A:
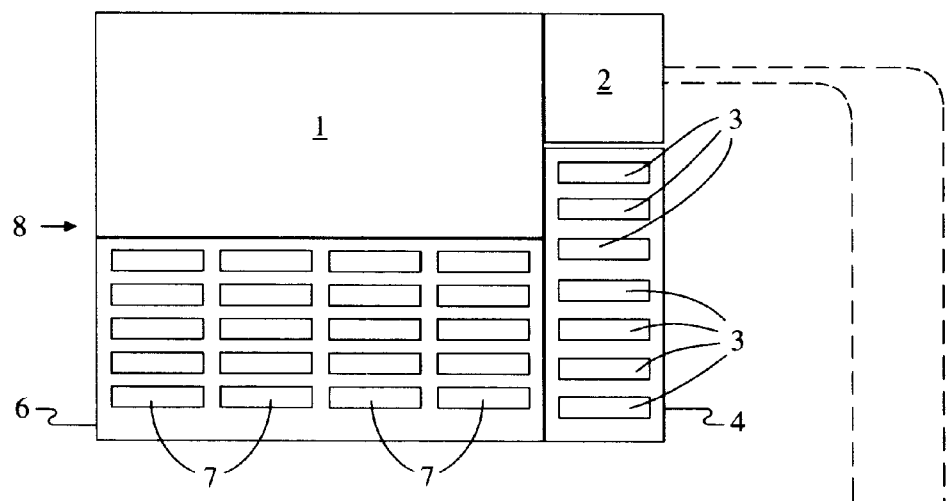
Figure 7B:
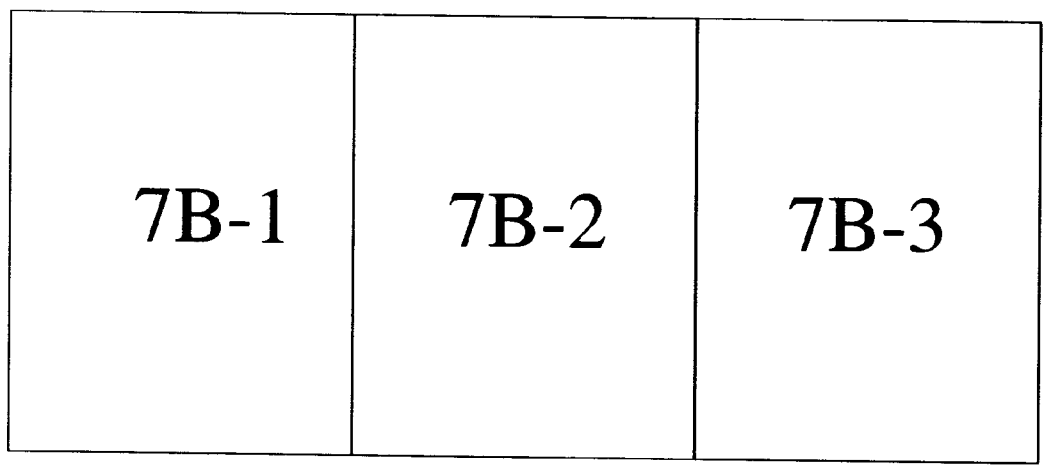
Figure 7B:
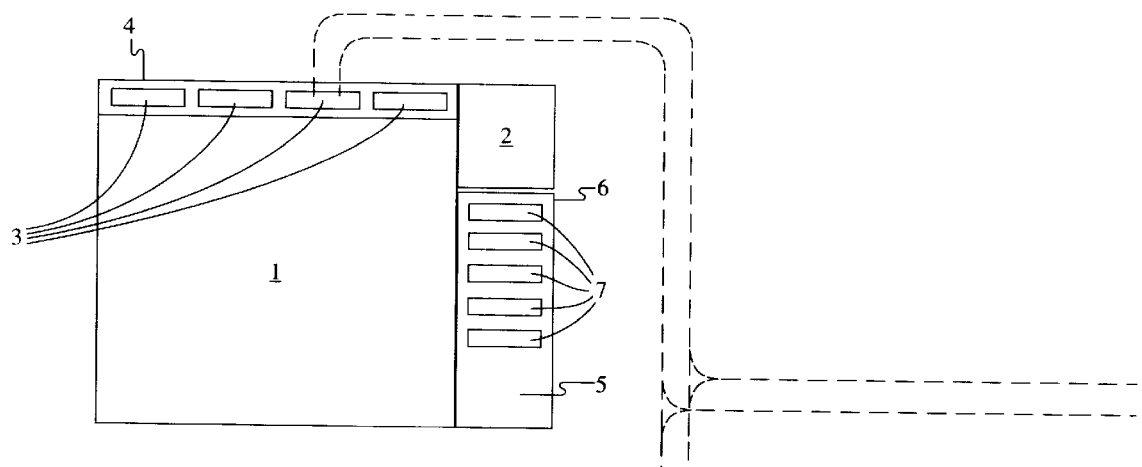
Figure 1:
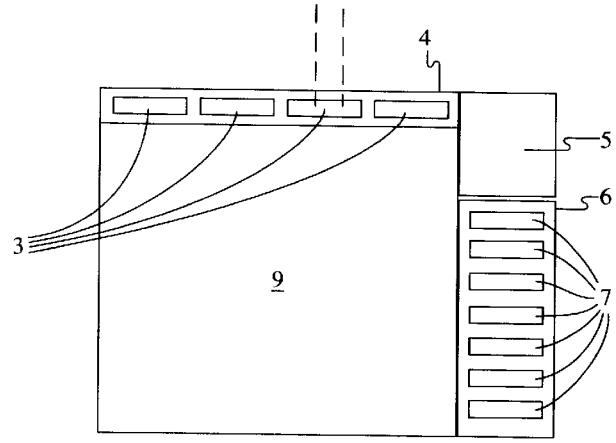
Figure 7B:
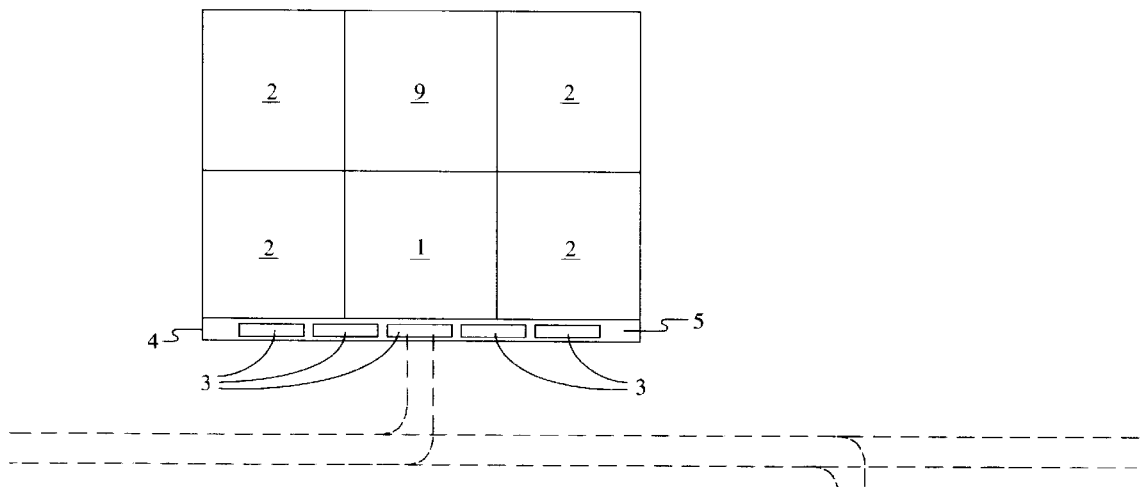
Figure 2:
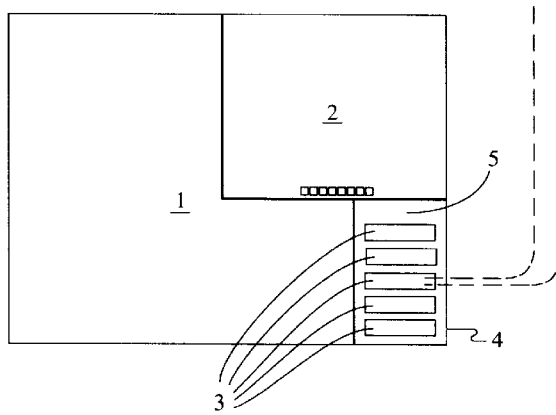
Figure 7B:
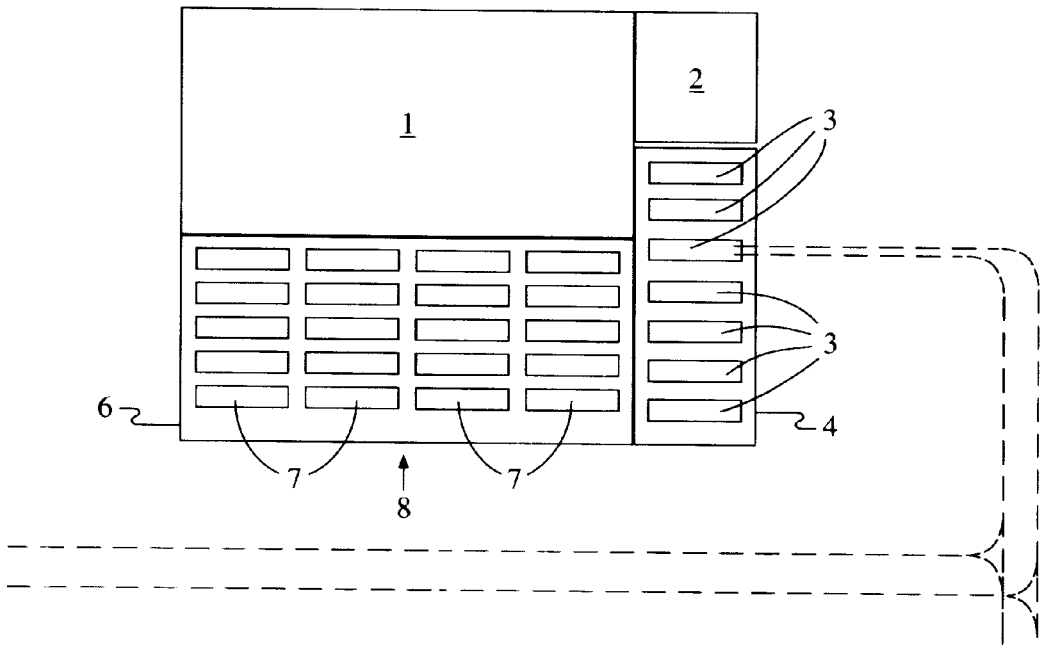
Figure 3:
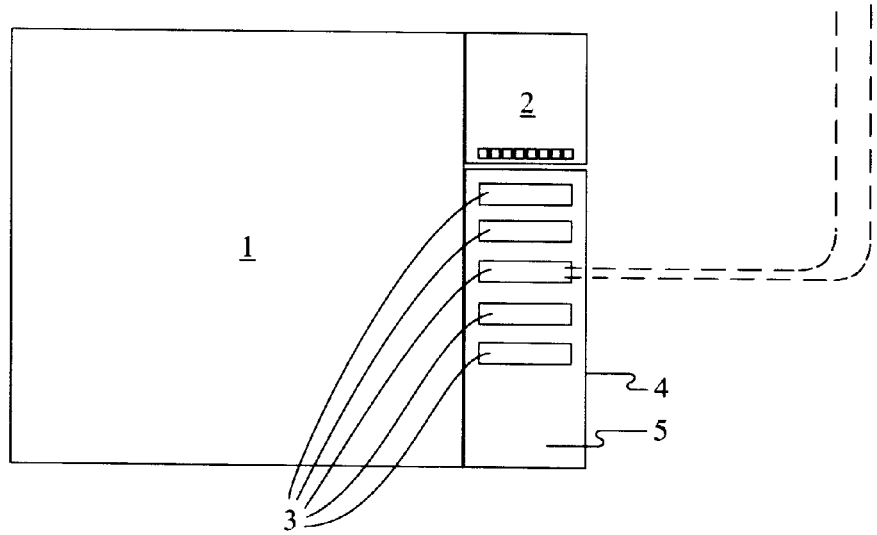

See Figure 7B-2

MULTIPLE ENVIRONMENTS:
Showing Bidirectional Printing

See Figure 7B-1

See Figure 7B-3

MULTIPLE ENVIRONMENTS:
Showing Bidirectional Printing

See Figure 7B-2

SHOWING DRAWING ASSEMBLY

MULTIPLE ENVIRONMENTS:
Showing Bidirectional Connectivity/Networks

MULTIPLE ENVIRONMENTS:
Showing Bidirectional Connectivity/Networks

MULTIPLE ENVIRONMENTS:
Showing Bidirectional Connectivity/Networks

VIDEO ASSISTED PROGRAM ENVIRONMENT

FIELD OF INVENTION

This invention is considered to be a special computer application of a new field wherein two or more distinct and separate computer environments can exist on a single video monitor screen performing usual tasks including video conferencing. This invention can encompass more than two separate environments and can be utilized with more than one video monitor to ease the visual separation of such multiple applications in the video monitor screens. These extended applications of separate environments and functions would be based on a single computer system with usual configuration and software. As this is a new field, no classification exists with the usual prior patents and experience.

One object of the invention is to perform video conferencing without overlaying the existing environment, but perform in a separate environment that will allow normal and usual use of the computer while video conferencing. The result of this new application is to offer separate and distinct computer environments in which each can perform all usual tasks and which can be expanded to other computer sites as well in a system for video conferencing or other tasks.

BACKGROUND OF THE INVENTION

The increase in benefits and functions of the modern computer has been continuous and expanding over recent years, and the advent of video conferencing as discussed herein has further expanded this horizon and function. Improvements in computer technology have been dramatic and rapid with regard to the benefits to the user. As the mechanical speed and scope of the computer have increased, so have functions and services, such as video conferencing, increased. It seems now common that computers are connected to telephone lines which expand outside services such as the InterNet and "e-mail" to these machines.

The standard and usual functions and services for computers has been in a single environment which has developed into a variety of functions and currently enhanced through the windows applications. From the basic DOS language there have been many upgrades which have diversified the services for the user and have made the computer easier and faster to use. The upgrade applications include word processing, recordskeepping, accounting, office services, inventories, labels and shipping, as well as banking, payments, and even personal services in a variety of commercially supplied applications. The variety and the competition for these programs has developed into different competing systems using the single monitor screen, and several environments have been built up to serve this single stand alone monitor with some beneficial and some confusing results. In some situations an upgraded DOS program can exist in one environment and yet, divide the monitor screen with an environment using O/S-2, the IBM language in another program.

The convenience offered by the windows programs has proven invaluable to the average user and to users such as airlines and travel agents which benefit from similtaneous multiple interactions showing activities of flight schedules, prices, itineraries, routes, and even hotels and auto rentals to book while on the single screen environment. Windows systems prove equally valuable with program managers, help and instructions, and separate independent work functions that can be drawn up to view in a window. The modern computer system has many upgrades in programs and operating systems that offer a vast array of choices and activities that all function in the single stand alone monitor.

One of these choices is in video conferencing in a single environment wherein a "window" is set aside in a corner or margin that shows the image seen by the small video camera located upon a monitor. This image can be from your site, or from other remote sites anywhere in the world, that have similar video camera capability. To be active in the teleconferencing your image returns to these remote sites when you speak. Although the demands on computer memory and function are high, the acceptance and use of video teleconferencing is increasing.

Since this invention is in a new field of technology which has not previously existed, the development of prior patent experience can cite only examples of patents based upon related fields and the patents that build and serve the development of this technology.

In the basic applications of video conferencing the difficulty of emcompassing several or multiple languages when added onto the single environment such as in U.S. Pat. No. 5,564,043, Oct. 8, 1996 of Siefert is simplified and managed by my invention. My additional environment has as a configuration manager the ability to pass tables and data values to other application tables and sites involving a similar system as cited through U.S. Pat. No. 5,440,699, Aug. 8, 1995 of Ferrand, et al., yet continuing to provide dependent and subordinate tables and field values that operate independently but maintain data linking.

In video conferencing such as cited in the U.S. Pat. No. 5,541,662, Jul. 30, 1996 of Adams, et al. my new program has expanded this perspective into an additional environment that receives audio, video, and data streams of information and separates the types of data to the appropriate channels for processing. As seen in the U.S. Pat. No. 5,557,724, Sep. 17, 1996 of Sampat, et al. wherein the video conferencing will interact and overlay portions of the Windows in the single environment, my invention has a specific application for the video in the additional environment that is separate and yet combines the needed functions. These additional environments can utilize existing data streams and channel products as requisite and as presented by multiple input sources, and combine or unify to interface the controls and functions with a specific integration to a specific program and application. My invention can extend this unique application of an additional environment into multiple additional separate environments and additional video monitors or other visual systems as needed whenever these functions of added environments would be useful and desired. In this multiple configuration many computer tasks can be kept separate and functioning clearly for the user, and yet based upon only one usual computer system and software.

The advantage and convenience of my invention is clear and with the features of the additional environments, and which include the programable single click buttons which can expand the services and functions of computer use. The separated environments allows features as cited in U.S. Pat. No. 5,530,796, Jun. 25, 1996 of Wang to locate and establish a menu bar that utilizes custom applications and task managers to provide the needed adaptive and reliable menuing and tool bar configuration. Following the examples of U.S. Pat. No. 5,524,195, Jun. 4, 1996 of Clanton, III, et al., my environment is able to utilize the animated sprites and the smart agents to provide graphical online help to programs, functions, commands, and operations.

The many advantages of the second and additional environments as developed herein will show features that the computer user will appreciate and value in the clarity of the video, the design as user friendly, the competence of the program, the ability to adapt for the various inputs and computer languages, separate tasks and job functions, even in foreign language applications, and the extension of range and function of the user's computer.

SUMMARY OF THE INVENTION

This invention is in the field of computers wherein we can have two or more separate environments in which the additional environments are activated while the original environment is available for all usual computer tasks. Thus, two or more separate operations can be maintained simultaneously with all the typical tasks available within each of the separate multiple environments. Environment 2 can maintain video teleconferencing in all of its functions while environment 1 can maintain its usual tasks.

This invention can encompass more than two separate environments and can be utilized on more than one video monitor or other visual system to ease the visual separation of such multiple applications. These extended applications of the separate environments and functions would be based on a single computer system with usual configuration and software.

Heretofore all desktop computer systems have been operated by versions of a single operating system such as DOS, Windows, Unix, and Macintosh. The standard operating system as in use today remains as one environment and runs independently without alterations.

This invention is this added environment. The "Video Assisted Program Environment" becomes the additional independent operating system that then co-exists with environment one already in place and operating in the computer system. This computer operating system now has an additional independent environment that operates simultaneously. This additional environment can extend to become multiple environments which can continue separate functions on a single computer system if requisite.

This invention becomes a "Video Assisted Program", or VAP as an acronym, as it is the "software" instructional program placed in the standard computer that operates the additional environment. This VAP then provides the desktop computer with a multi-tasking, multiple operating system that is supported with commands and functions in both command line code and object code. This VAP system can operate simultaneously while a video conference is in session.

In this independent VAP environment there is no overlay upon a windows operating program as is evident in the standard computer environment. The various display elements that are composed within the VAP environment perform activities and functions that effect other software activities and functions and thus becoming interactive.

Upon execution of computer language code, The VAP program activates and allows seamless integration of single or multiple programs with live video conferencing. In the VAP environment the user may select the appearance of the VAP environment, develop integrated phone dial lists, establish user options, and establish printing at remote computer locations bidirectionally. This invention is fully operational and can manage activities and functions with single click navigation and launching features. The user may select an application with a single button click to launch an activity, or navigate through a multi-vendor list, or navigate a product services list, or select actions and activities from remotely connected computers.

The VAP environment is user friendly and offers a section or headline block for the company or user name and logo identification. The VAP offers customization features for specific requirements in these feature as listed:
 1. Controlled applications;
 2. Controlled operating systems;
 3. A secure program access authorization code;
 4. Security of information and data;
 5. Multiple site connectivity, local or remote;
 6. Mini-applications within a program and extendible to additional video monitors;
 7. Fast access to video dialed sites: by printing, by phone, or by alternative satellite link-up;
 8. Printer: local, remote, or bidirectional;
 9. Smart software agents: their controls and functions.

The benefits of multi-tasking, multi-operating systems and multiple environments supporting video conferencing now become clear to understand when these are installed upon the standard single operating computer environment. Thus in my invention the single computer environment can now be modified to support multiple environments on a single computer system and to include multiple operating systems with their appropriate developed functions and controls, and to display on single or multiple video monitors.

With the utilization of the combined environments the benefits of the multiple operating computer systems will provide the user with a diverse, fully featured, fully operational configuration that expands the computer functions and is user friendly.

The Video Assisted Program Environment allows the computer user in a typical two environment structure to maintain all existing software programs and applications in environment one, and then to configure another operating environment for specialty features and commands of elements and components. Additionally, this dual environment may be extended to more environments, all operating simultaneously. This is a novel and unique invention that can improve and benefit the video teleconferencing technology and give the users functions and services never before available with this technology.

While initiated and implemented as video teleconferencing, this novel invention is by no means limited to this application system as it may be configured and extended for the convenience of the operator to service other normal computer activities. When in the video conferencing system, extension of the multiple functions may be desired for clarity, convenience, flexibility, operations, as the video conferencing remains in place, on line, and watching you and waiting for its "prompt" showing that it is active. The desirability of being able to perform other normal computer functions while "actively" waiting for a video conference prompt is much to be desired. The additional separate environment, or multiple environments, or multiple monitors, or the newer video display systems can be configured with tool bars, tabs, operating buttons, and software for normal uses while waiting "actively" for your turn on the video conference network which can be in any of the environments selected. This invention serves as a unique means to flexibly extend the operation and use of a standard single computer.

A BRIEF DESCRIPTION OF THE DRAWINGS

All Figures will show a standard video monitor [8] available with the standard computer system.

FIG. 1. The video monitor [8] is shown in a typical configuration in a normal use for video conferencing. The standard computer screen [1] is environment 1. At the top line/bar is the environment 2 [4] showing a menu bar to select functions and activities using the buttons [3], and reserving a section [5] in which to place a name or logo for this new environment 2 [4, 6]. Video imaging [2] is shown for the video teleconferencing, and the environment 2 [6] continues down the righthand side with a tool bar area and its additional command buttons [7].

FIG. 2. Another embodiment showing the two environments: one in the standard screen [1] in a video monitor [8] and the second here used for video conferencing [4, 6] with the video teleconferencing image in the right side upper corner [2]. At the top of the environment 2 [4] is shown the menu bar and buttons [3], and at the right side is shown the environment 2 [6] with the tool bar and buttons [7] and a section that can be used for a headline or logo [5].

FIG. 3. A different embodiment with the standard environment 1 [1], and the environment 2 at the right side [4] with the video teleconferencing image [2] in the upper corner. Selections for functions and for tasks is integrated in this environment 2 [4] in the buttons [3] on the right side. A section for a headline or logo [5] is shown available in the right side lower corner.

Figure 4:
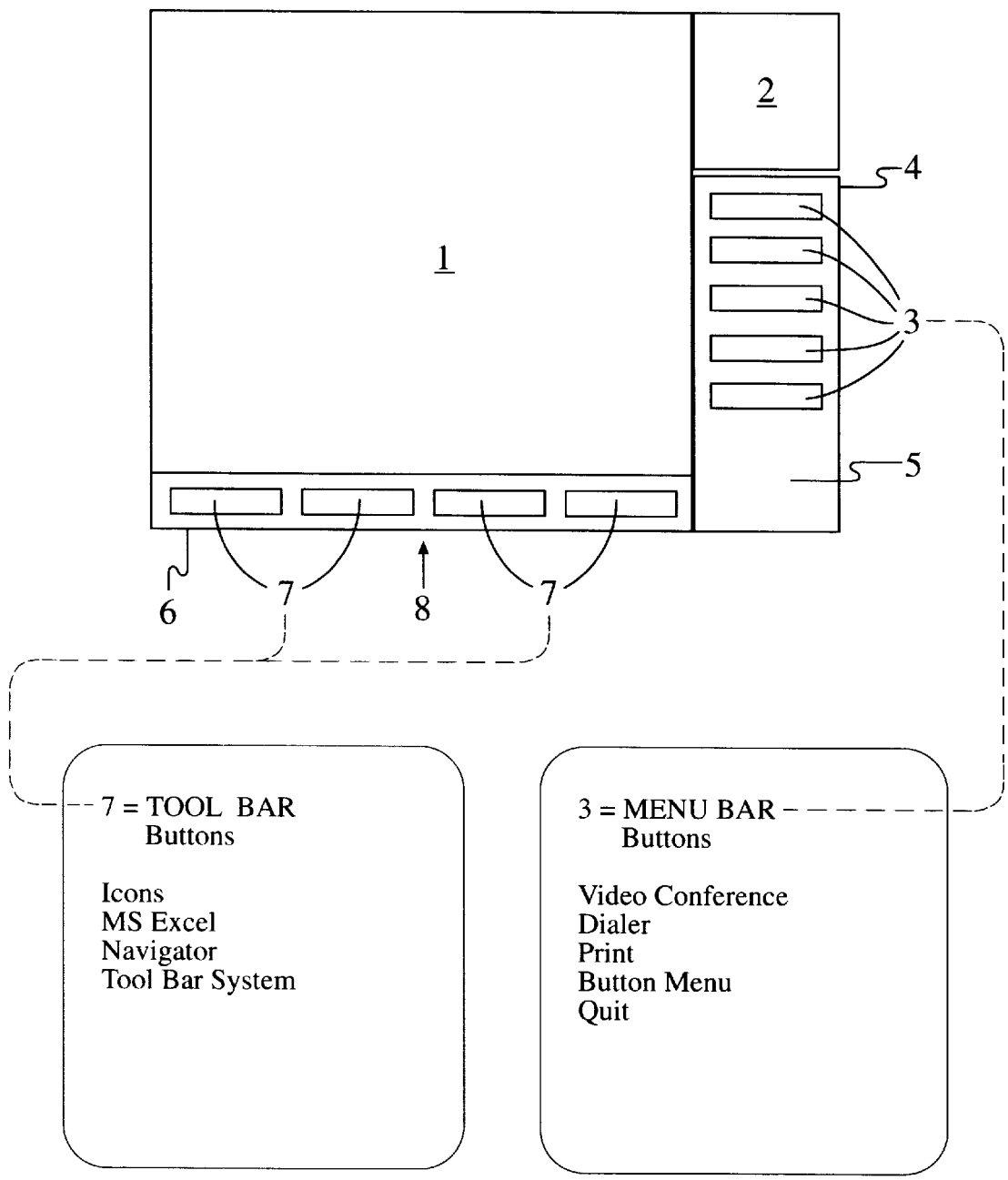

FIG. 4. Another embodiment with the standard environment 1 [1] in the standard video monitor [8], and the environment 2 at the right side [4] and below [6]. In the environment 2 the menu command buttons are shown available on the right side [3], and the tool buttons at the bottom [7]. A section available for a headline or logo [5] is shown in the right side lower corner.

Figure 5:
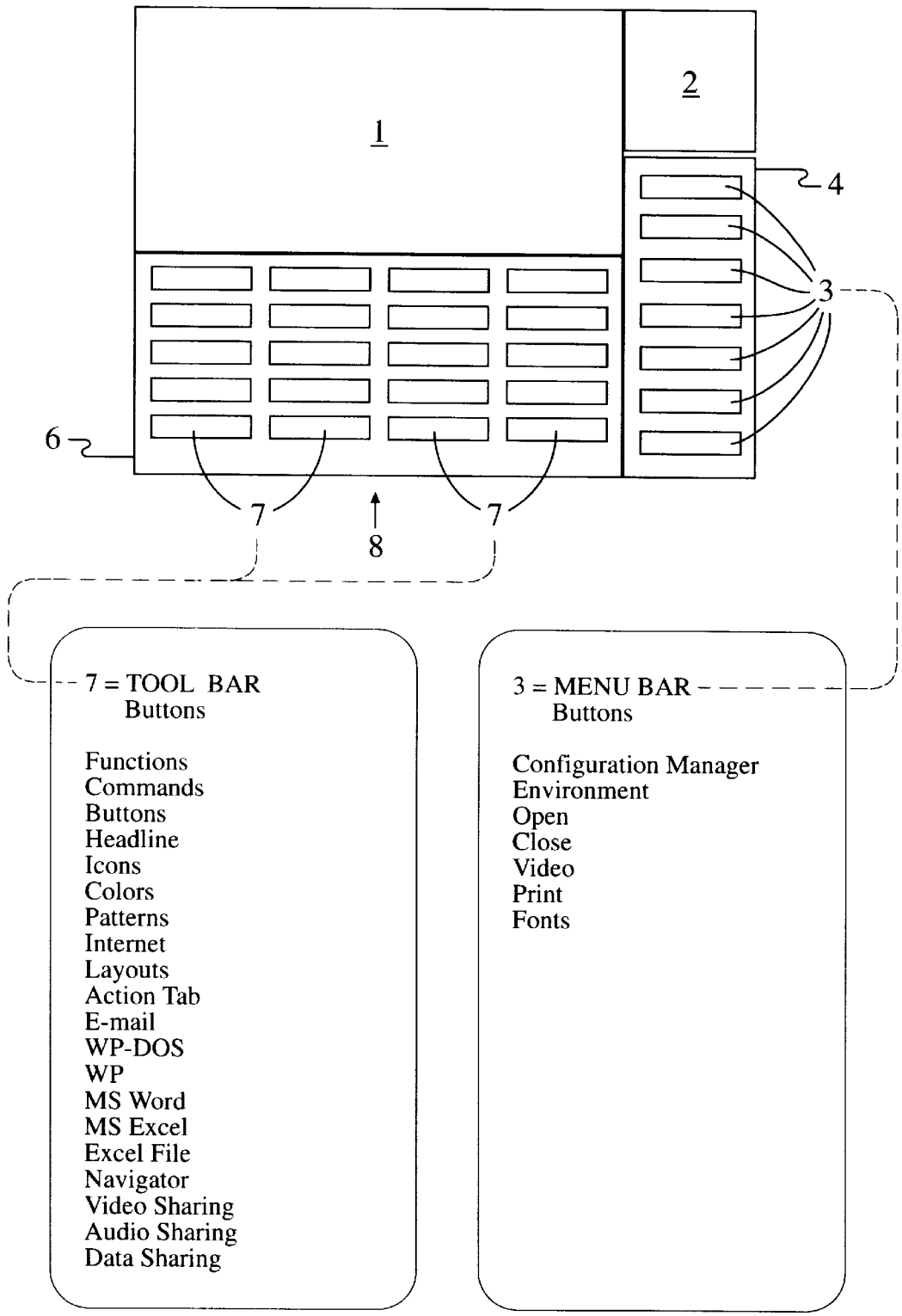

FIG. 5. A different embodiment configured with a smaller environment 1 [1] in the video monitor [8], and the environment 2 [4, 6] expanded for more command buttons. On the right side in the upper corner is the video image [2] for video teleconferencing. On the right side are the menu command buttons [3], and at the bottom are numerous task buttons in the tool system [7].

Figure 6:
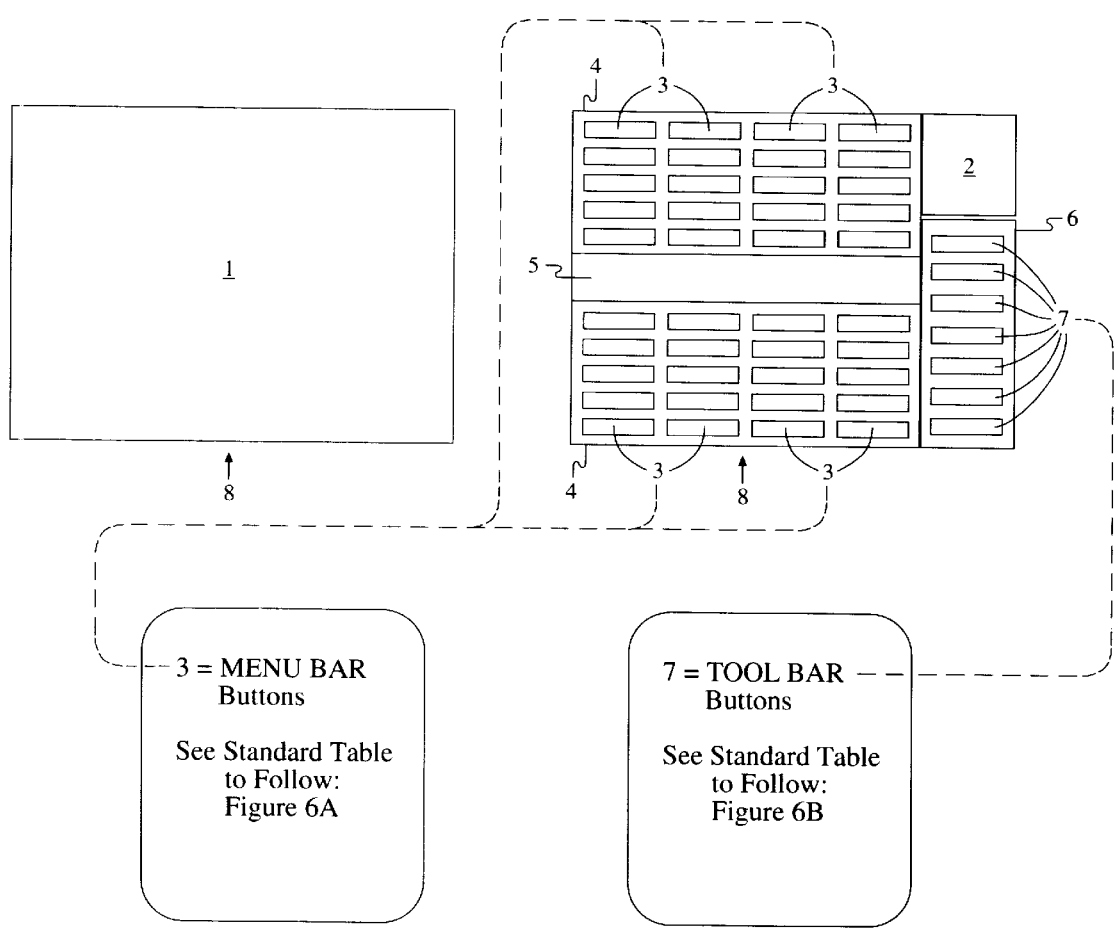

FIG. 6. Two video monitors [8, 8] operated by a single computer are shown with the environment 1 [] on the left side monitor [8], and environment 2 [4, 6, 4] on the right side monitor [8]. The video image [2] for the video teleconferencing in shown in the right side upper corner. In this embodiment, environment 2 [6, 4] has the buttons reversed in functions with the tool system [7] being shown on the right side and with numerous menu buttons [3] shown filling the screen top and bottom on the center and left side [4]. This FIG. 6 presents a view of the ability to extend the environments to other monitors.

FIG. 7. Two video monitors, 8 & 8, operated by a single computer are shown with three environments. Environments one and two are shown on the left video monitor, and environment three is shown on the right video monitor.

Environment one is the standard screen 1 with the usual single operating computer activity.

Environment two 4, 6, is shown for use in video teleconferencing with its video image 2 in the right side upper corner, and with its menu at the top 4, and with its tool system on the right side 6, and with a section available for a name or logo 5 in the right side lower corner.

Environment three 3, 4, 6, is shown in the video monitor 8 on the right side. Varying configurations and activities can be established in this environment three, and for this representation the screen 9 is shown in a large size with the menu 3 at the top, and the tool system on the right side 7. In many configurations these menu and tool systems can be reduced or eliminated to give maximum area for a program, or game. A section is available 5 for a name or logo on the right side upper corner.

FIG. 7A. Drawing shows page assembly location of three drawing FIGS.; 7A-1, 7A-2, and 7A-3.

FIG. 7A-1. The first of three related drawing figures that show multiple environments and their interconnectivity such as item identified as two, a video area; connects to item identified also as two in drawing FIGS. 7A-2 and 7A-3. Figure also shows item identified as nine, a video area; connecting to item identified also as nine in drawing FIG. 7A-2, also a video area. Command buttons 3 are shown at the top areas of environment two 4. Tool buttons 7 are shown on environment three 5. Environment one 1 is shown on the upper left drawing.

FIG. 7A-2. The second of three related drawing figures that show multiple environments and their interconnectivity such as item identified as multiple two, video areas; connects to item identified also as two in drawing FIGS. 7A-1, 7A-2, and 7A-3. Figure also shows item identified as nine, a video area; connecting to item identified also as nine in drawing FIG. 7A-1, also a video area. Command buttons 3 are shown at the bottom and lower right areas of environment two 4. Environment one is shown in the lower center of the upper drawing and in the left and lower portion of the lower drawing.

FIG. 7A-3. The third of three related drawing figures that show multiple environments and their interconnectivity such as item identified as multiple two, video areas; connects to item identified also as two in drawing FIGS. 7A-1, 7A-2, and 7A-3. Command buttons 3 are shown at the right areas of environment two 4. Tool buttons 7 are shown on environment three 6 in lower portion the upper drawing. Environment one 1 is shown in th upper portion of the upper drawing and the majority of the total area of the lower drawing.

FIG. 7B. Drawing shows page assembly location of three drawing FIGS.; 7B-1, 7B-2, and 7B-3.

FIG. 7B-1. The first of three related drawing figures that show multiple environments and their bidirectional printing capablilties such as item identified as command button three, upon activation connects and supports bidirectional printing between the connected environments two 4 located in the upper and lower drawings as well as connected to figure drawings located in FIGS. 7B-2 and 7B-3.

FIG. 7B-2. The second of three related drawing figures that show multiple environments and their bidirectional printing capabilities such as item identified as command button three, upon activation connects and supports bidirectional printing between the connected environments two 4 located in the upper and lower drawings as well as connected to figure drawings located in FIGS 7B-1 and 7B-3.

FIG. 7B-3. The third of three related drawing figures that show multiple environments and their bidirectional printing capabilities such as item identified as command button three, upon activation connects and supports bidirectional printing between the connected environments two 4 located in the upper and lower drawings as well as connected to figure drawings located in FIGS. 7B-1 and 7B-2.

Figure 7C:
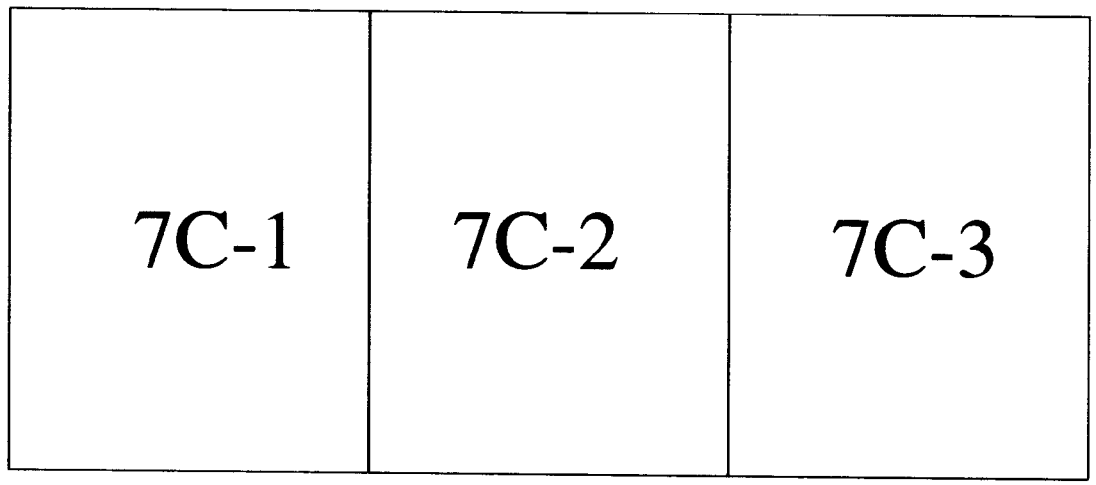
Figures 1, 7C:
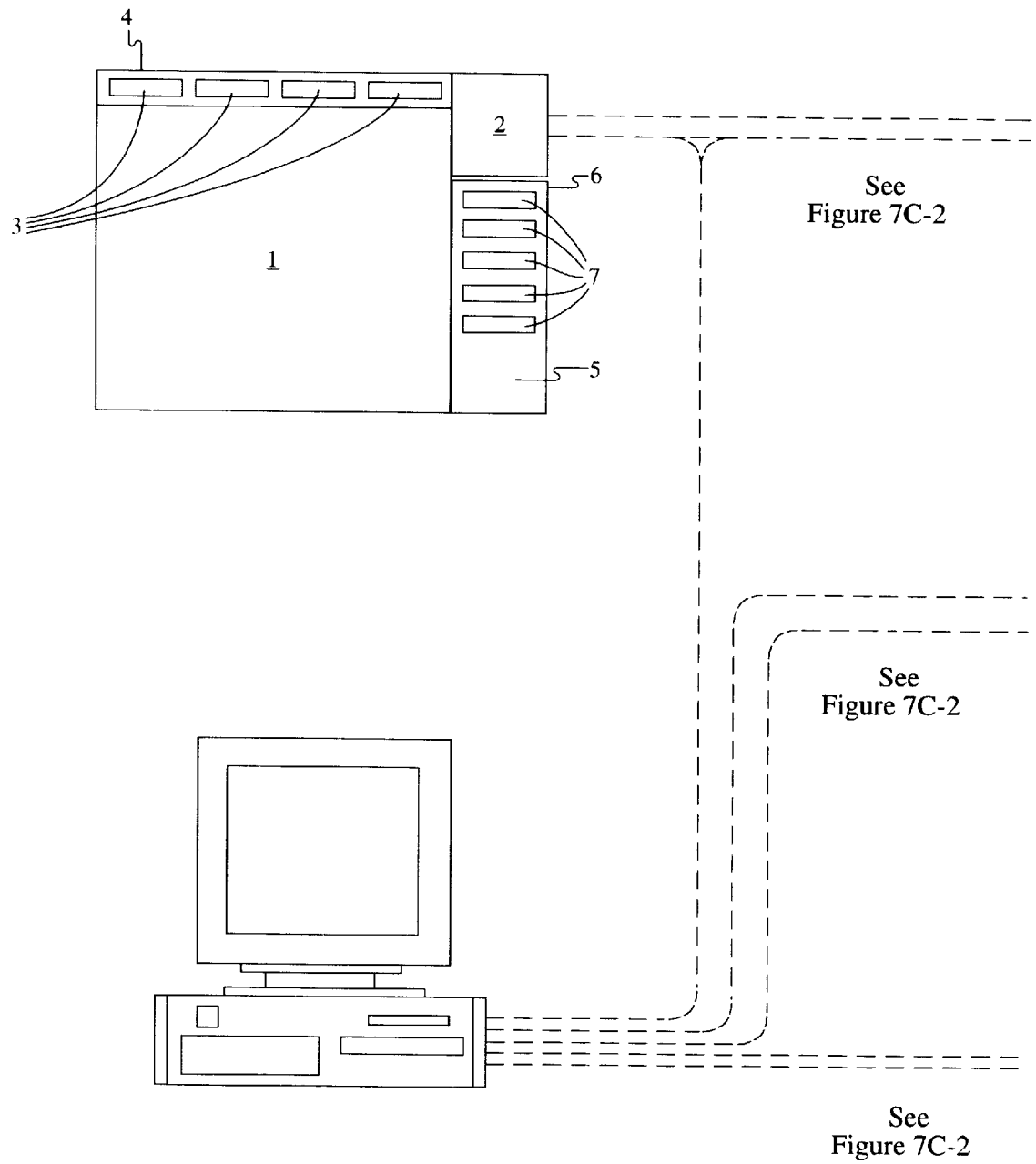
Figures 2, 7C:
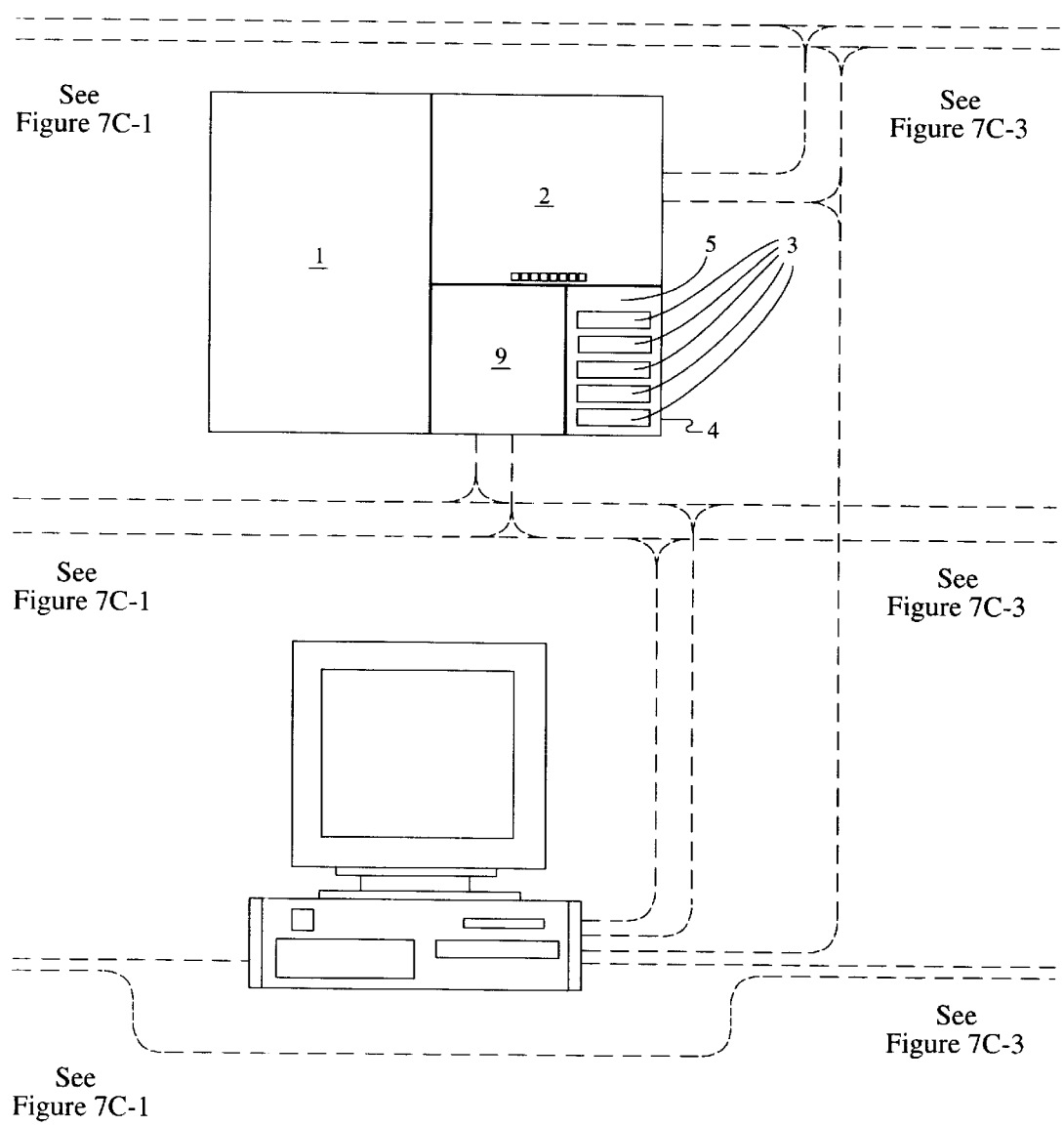
Figures 3, 7C:
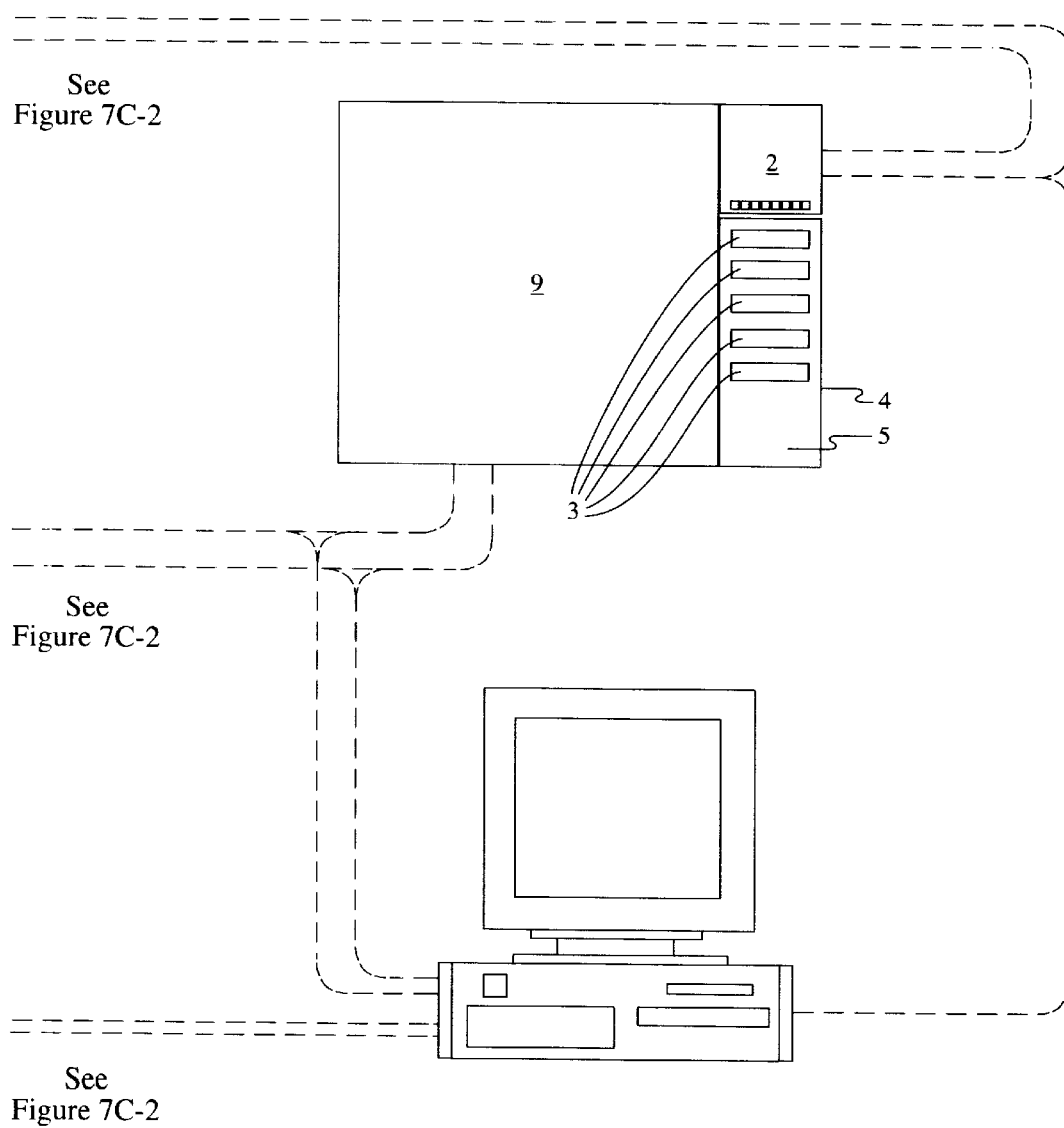

FIG. 7C. Drawing shows page assembly location of three drawing FIGS.; 7C-1, 7C-2, and 7C-3.

FIG. 7C-1. The first of three related drawing figures that show multiple environments and their bidirectional network connectivity capabilities such as item identified as item two, upon activation connects and supports bidirectional network connectivity between the connected environments two 4 located in the upper drawing as well as connected to upper figure drawings located in FIGS. 7C-2 and 7C-3. The lower drawing shows the standard computer system with a regular operating system and networking components connected to same on FIGS. 7C-2 and 7C-3.

FIG. 7C-2. The second of three related drawing figures that show multiple environments and their bidirectional network connectivity capabilities such as item identified as item two, upon activation connects and supports bidirectional network connectivity between the connected environments two 4 located in the upper drawing as well as connected to upper figure drawings located in FIGS. 7C-1 and 7C-3. The lower drawing shows the standard computer system with a regular operating system and networking components connected to same on FIGS. 7C-1 and 7C-3.

FIG. 7C-3. The third of three related drawing figures that show multiple environments and their bidirectional network connectivity capabilities such as item identified as item two, upon activation connects and supports bidirectional network connectivity between the connected environments two 4 located in the upper drawings as well as connected to upper figure drawings located in FIGS. 7C-1 and 7C-2. The lower drawing shows the standard computer system with a regular operating system and networking components connected to same on FIGS., 7C-1 and 7C-2.

Figure 8:
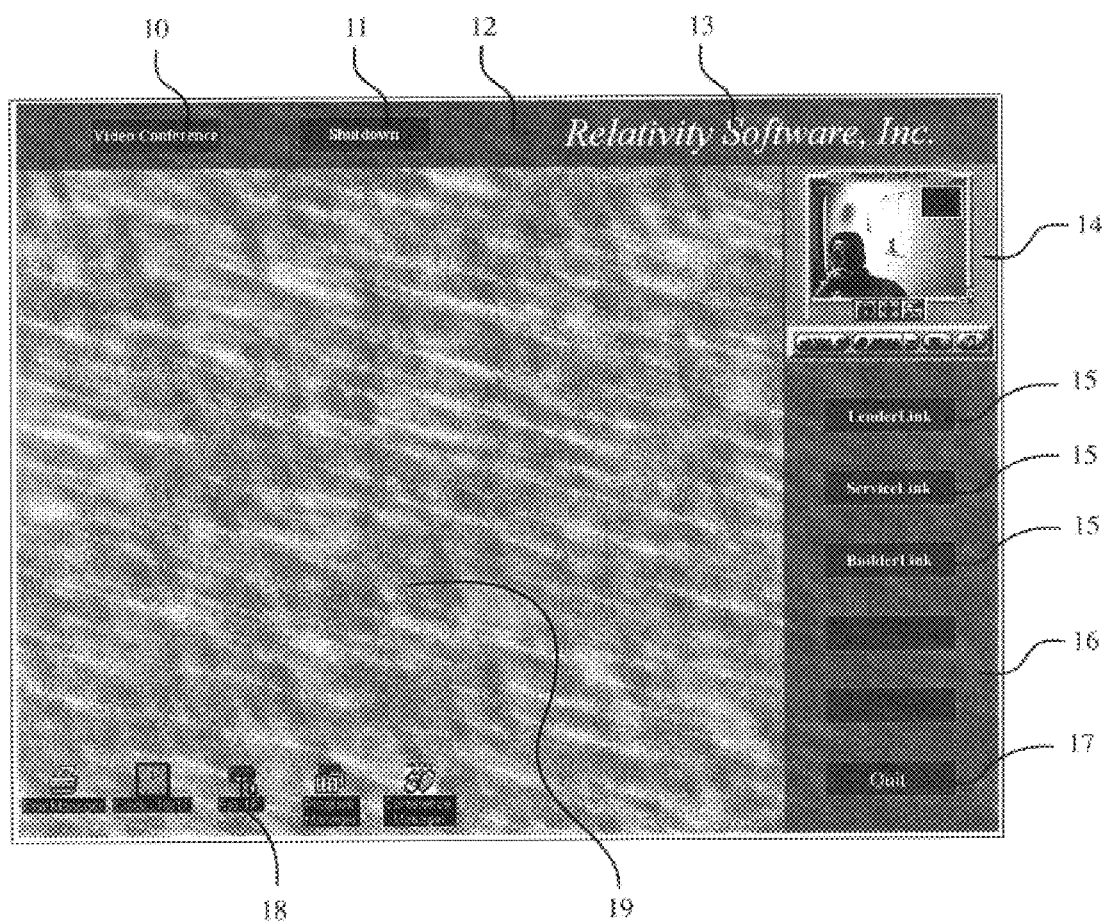
Figure 9:
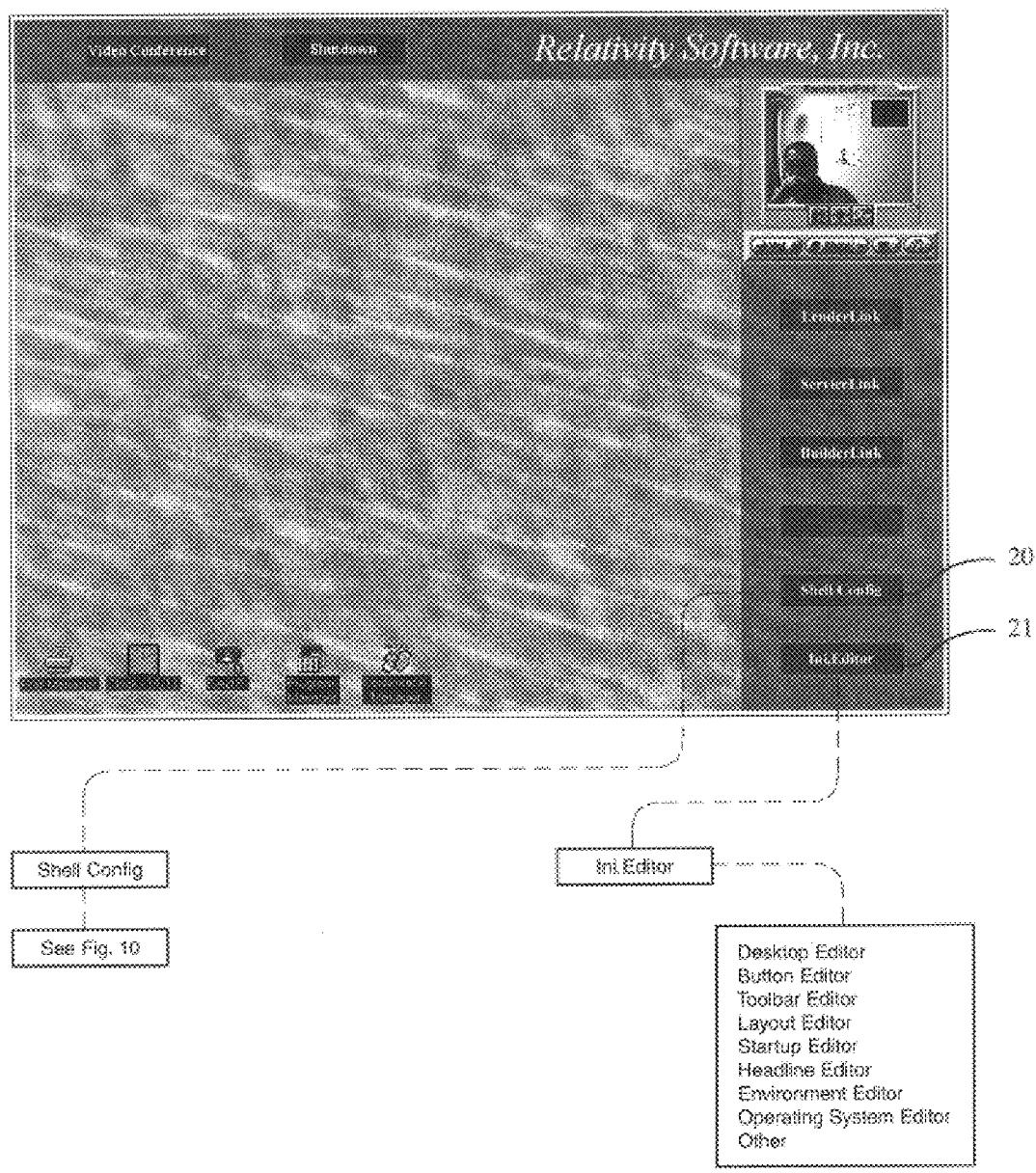
Figure 10:
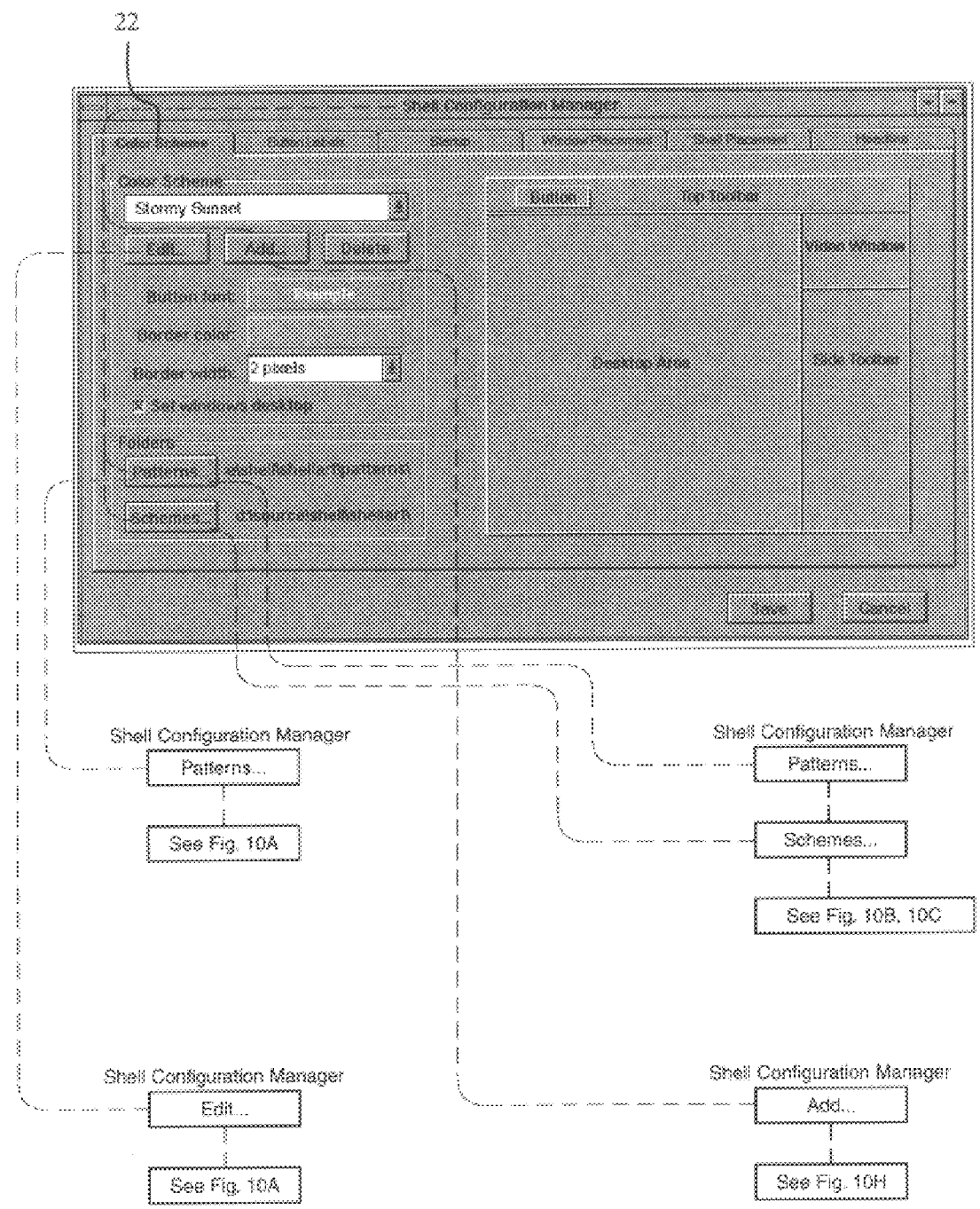
Figure 10A:
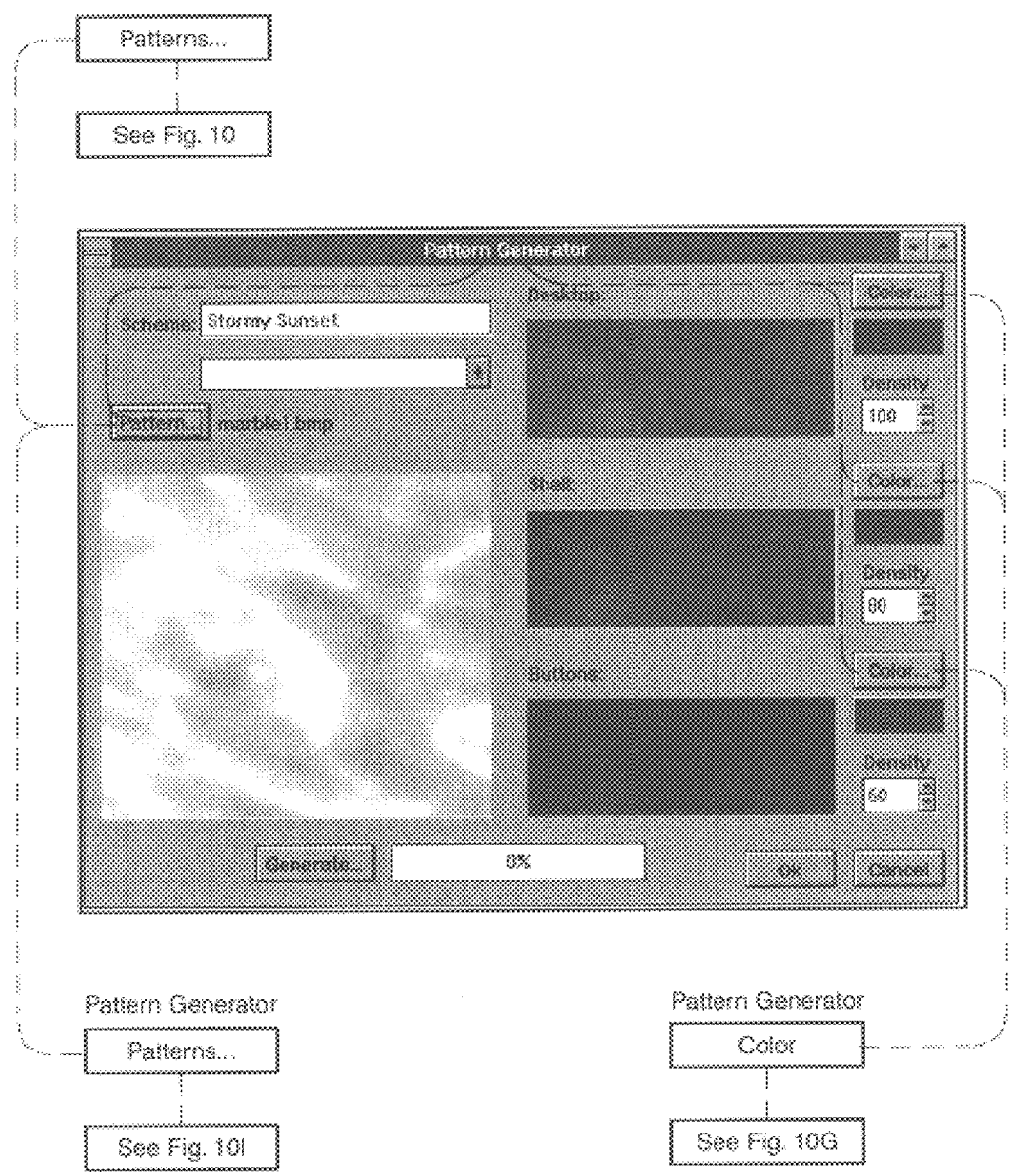
Figure 10B:
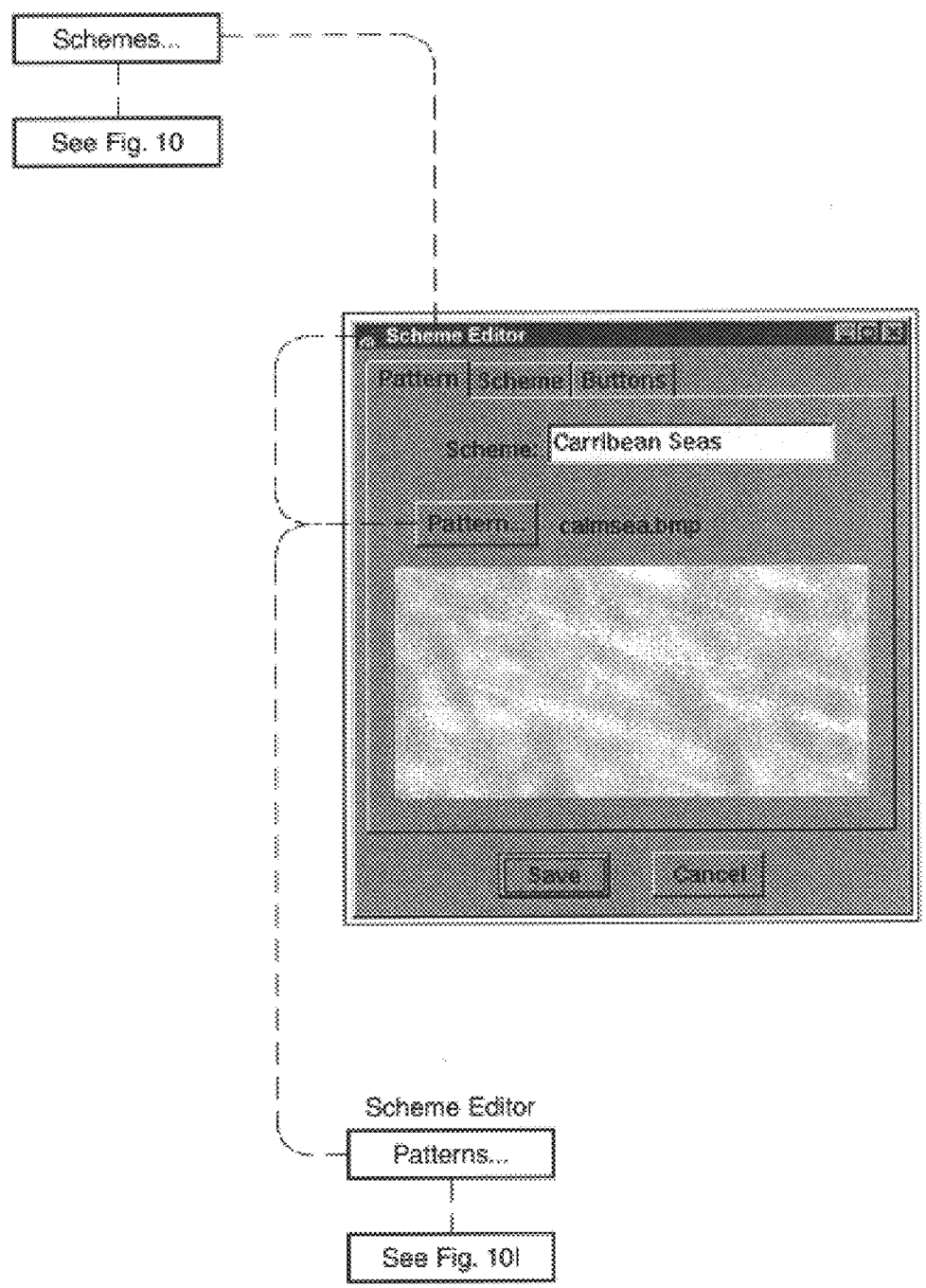
Figure 10C:
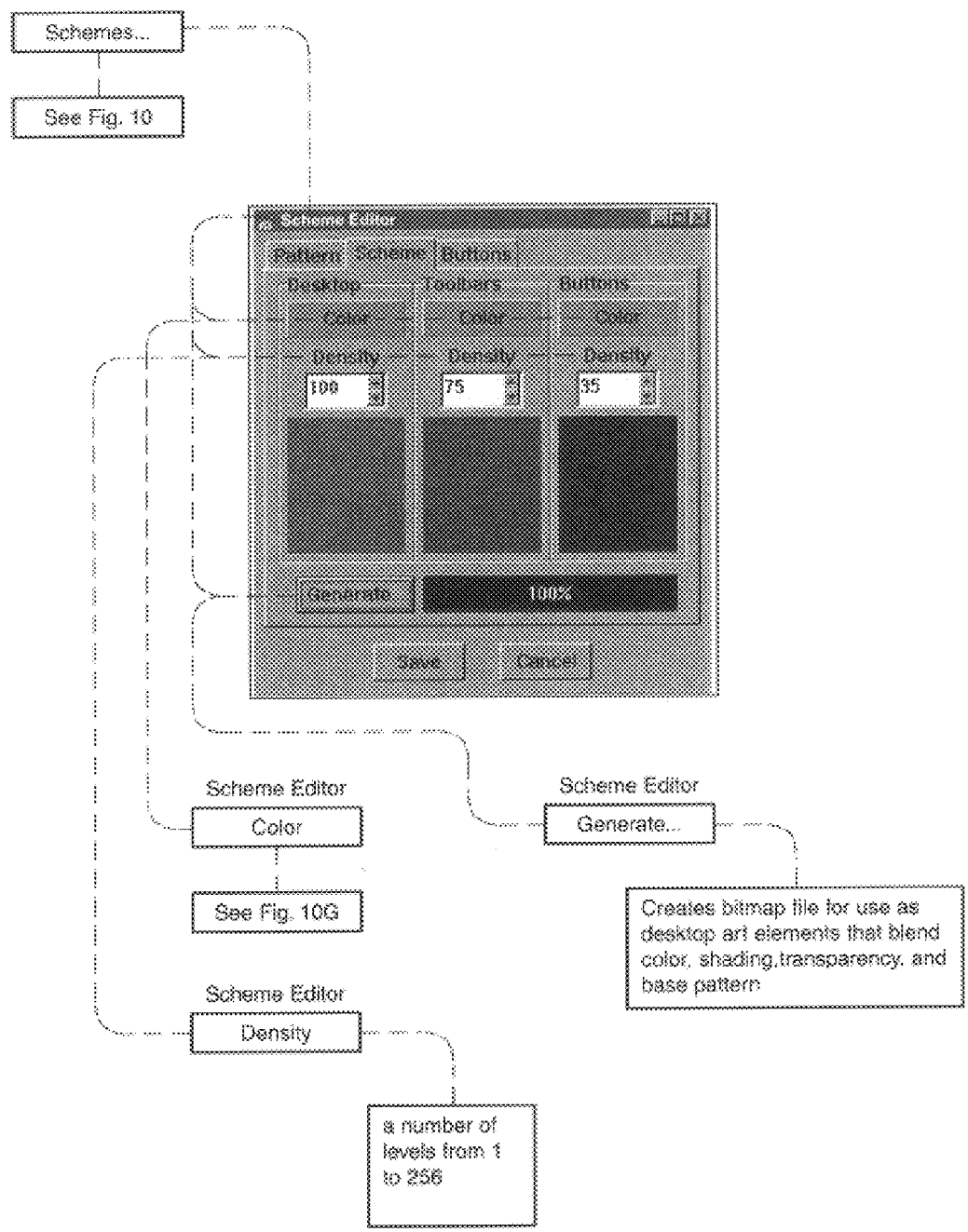
Figure 10D:
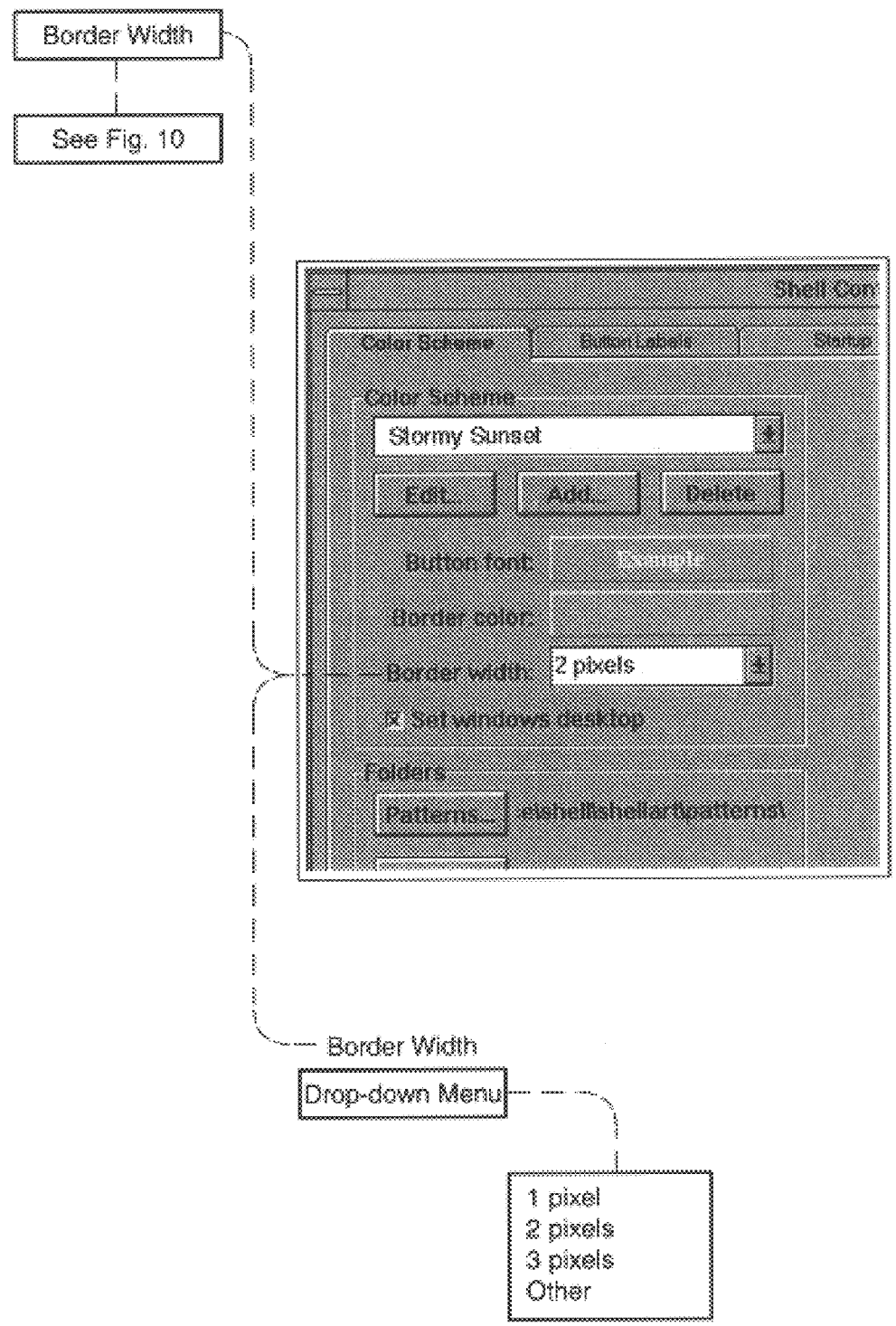
Figure 10E:
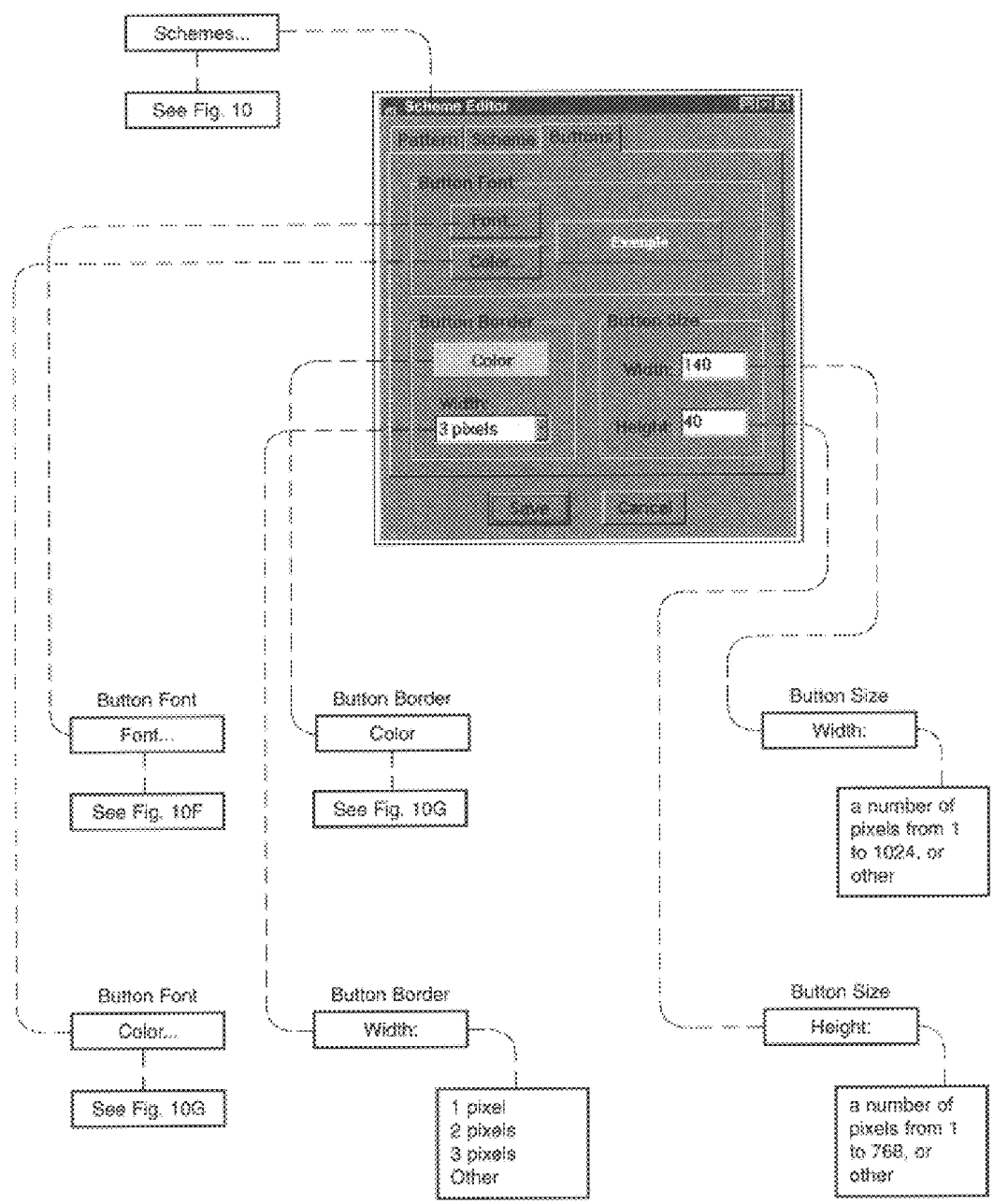
Figure 10F:
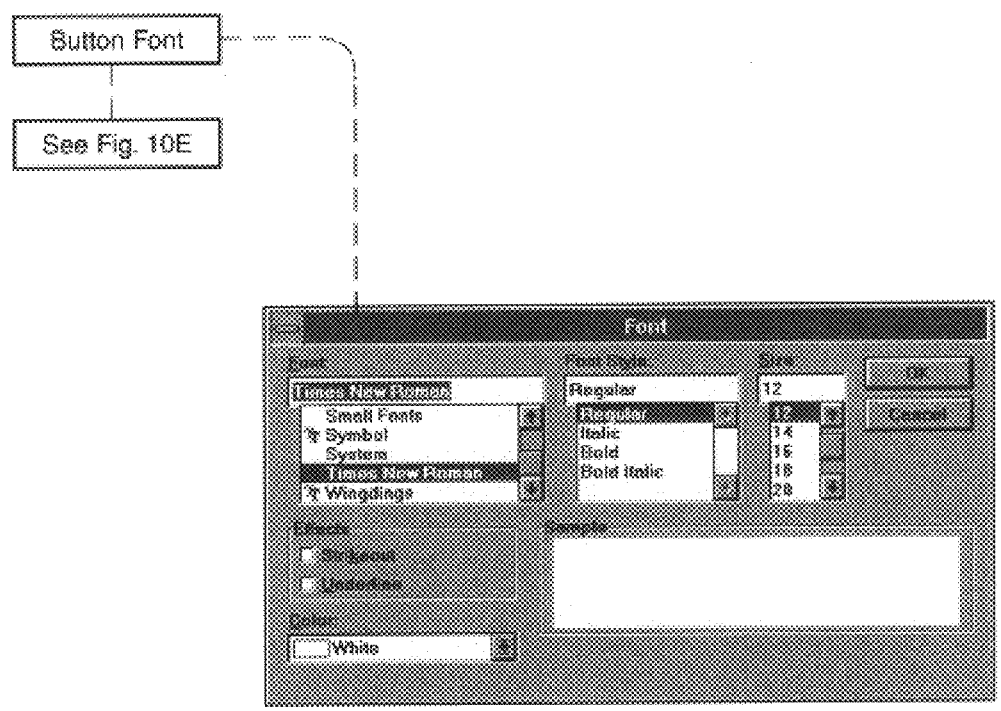
Figure 10G:
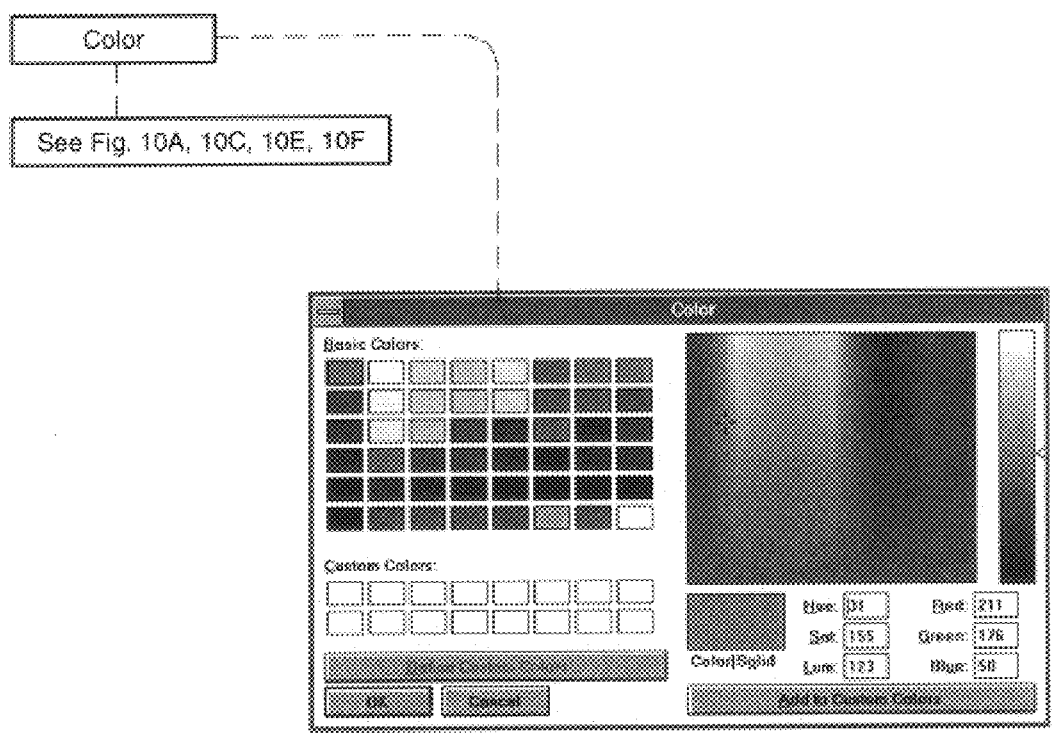
Figure 10H:
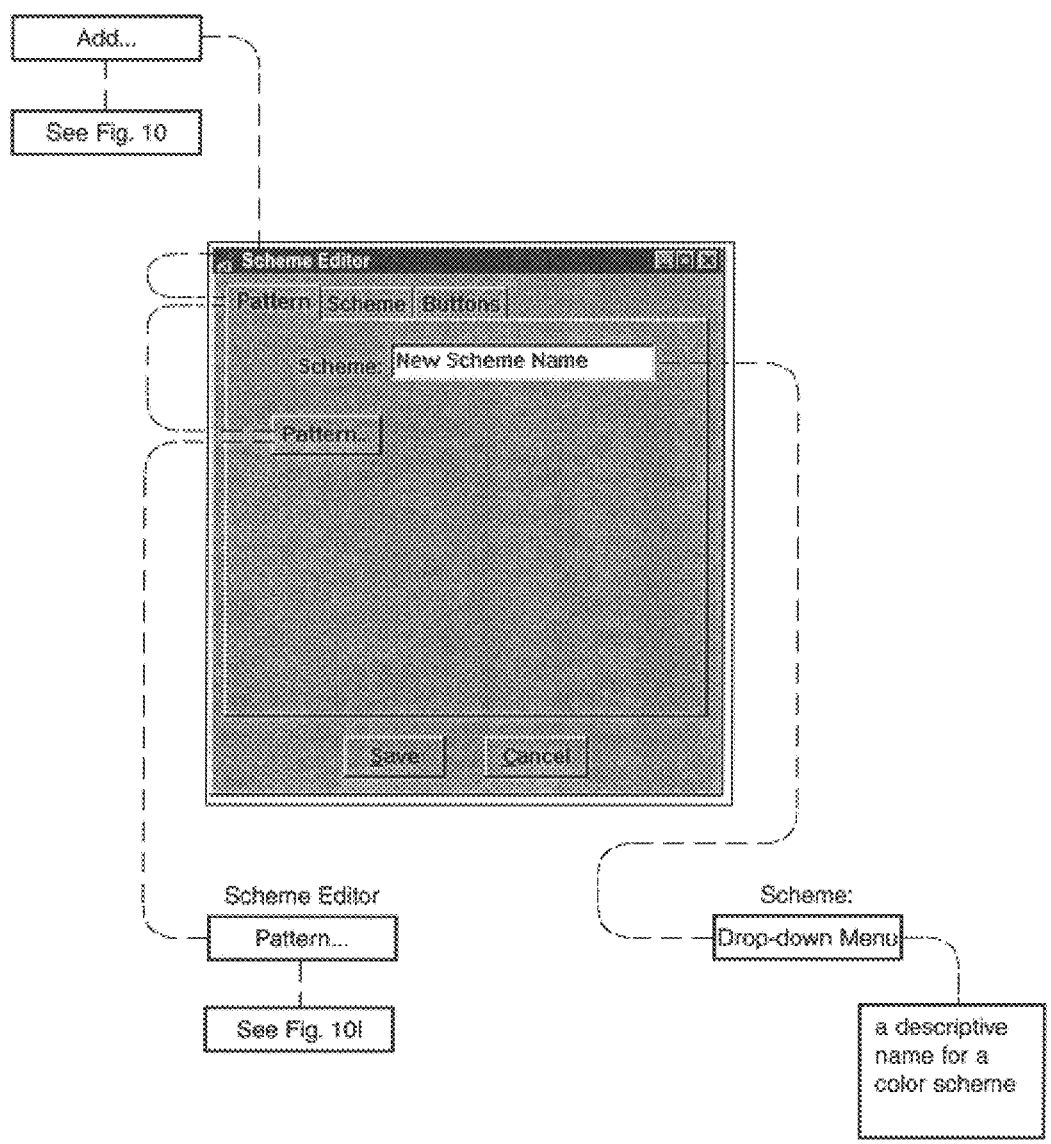
Figure 10I:
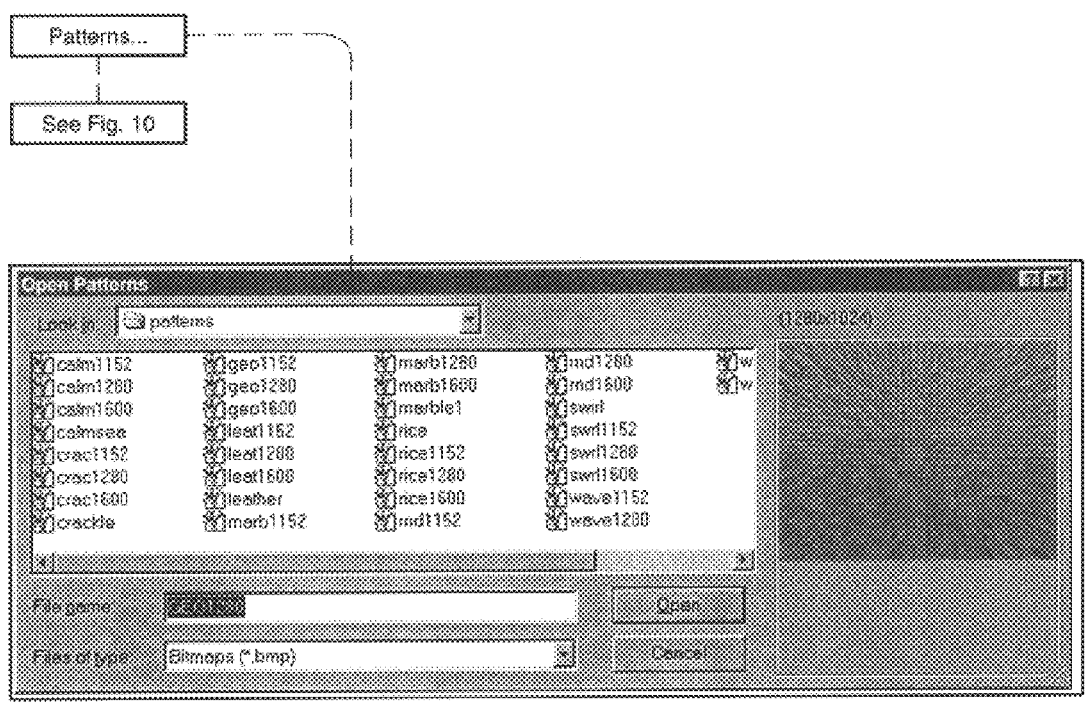
Figure 11:
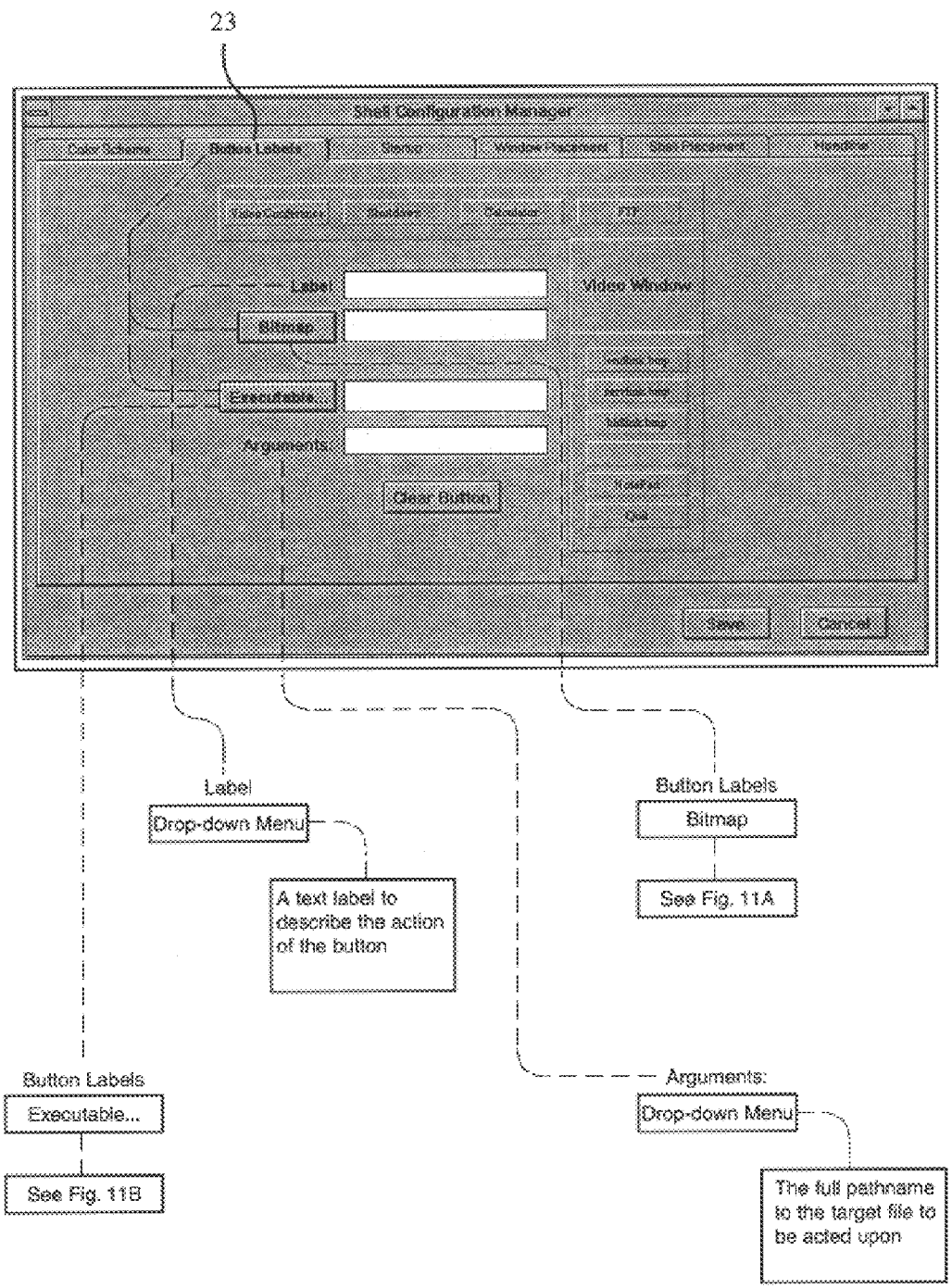
Figure 11A:
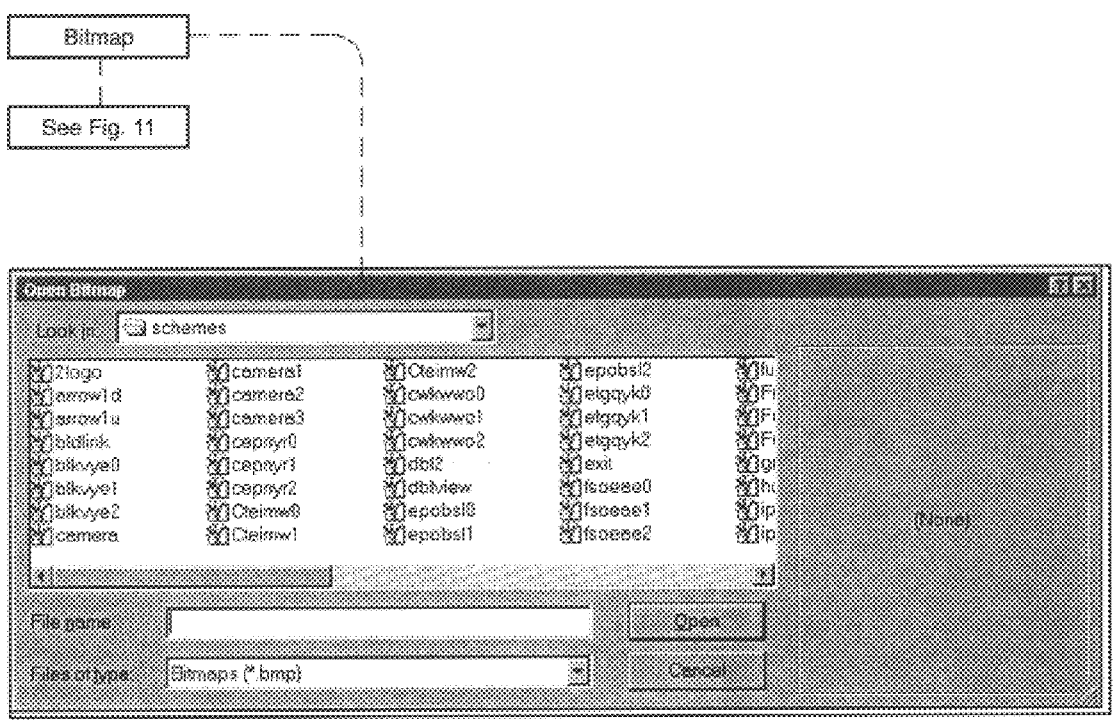
Figure 11B:
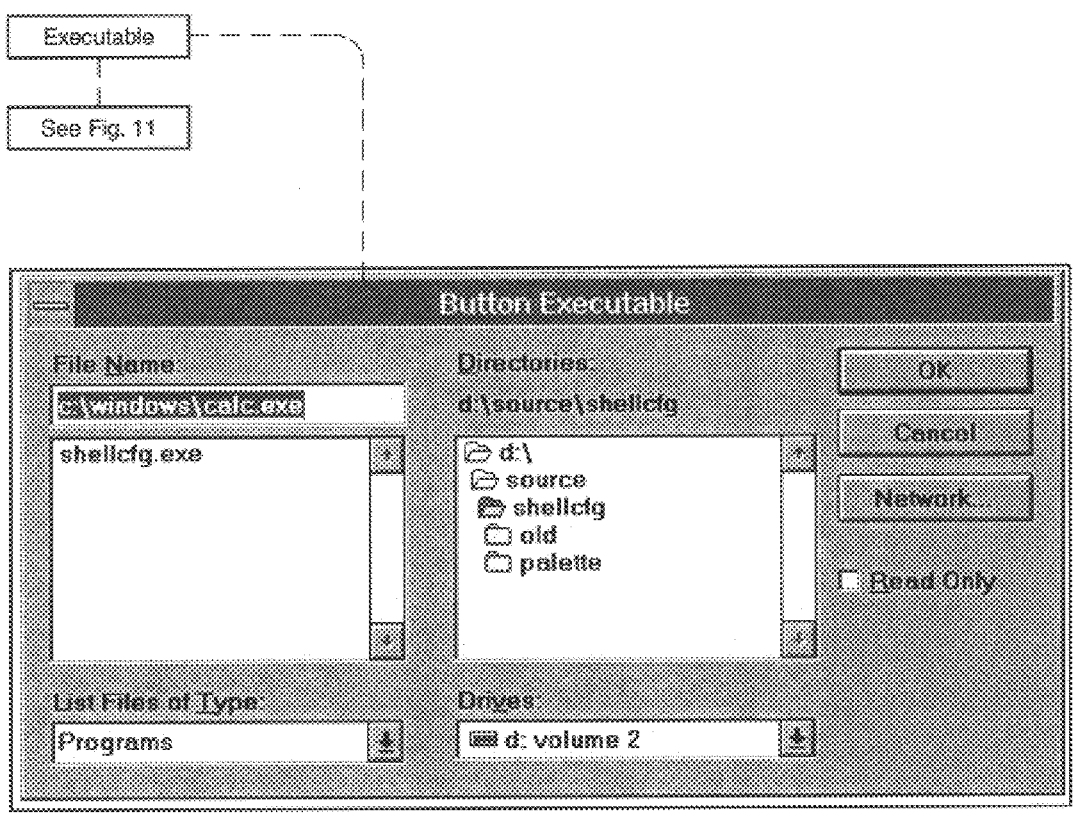
Figure 12:
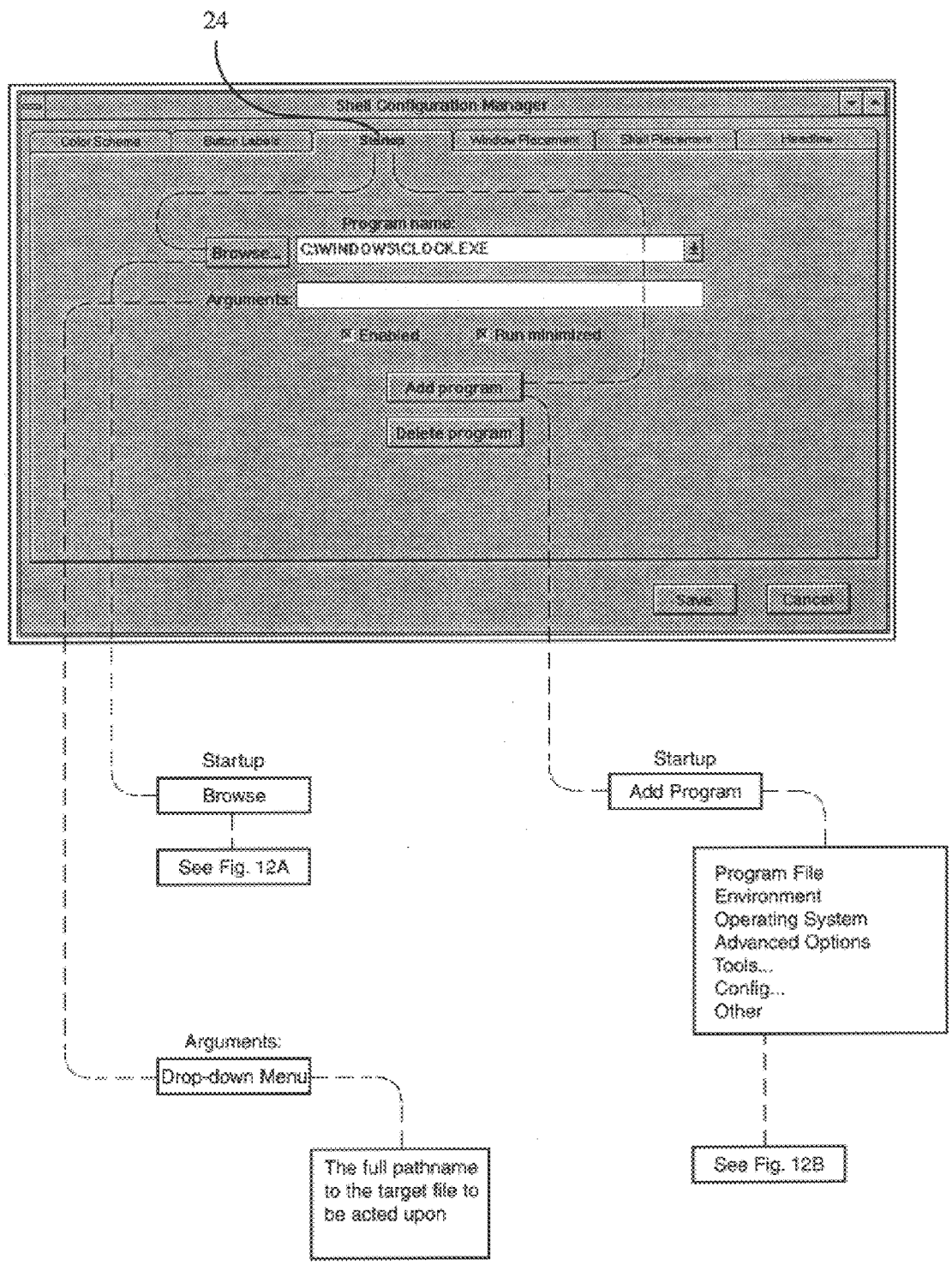
Figure 12A:
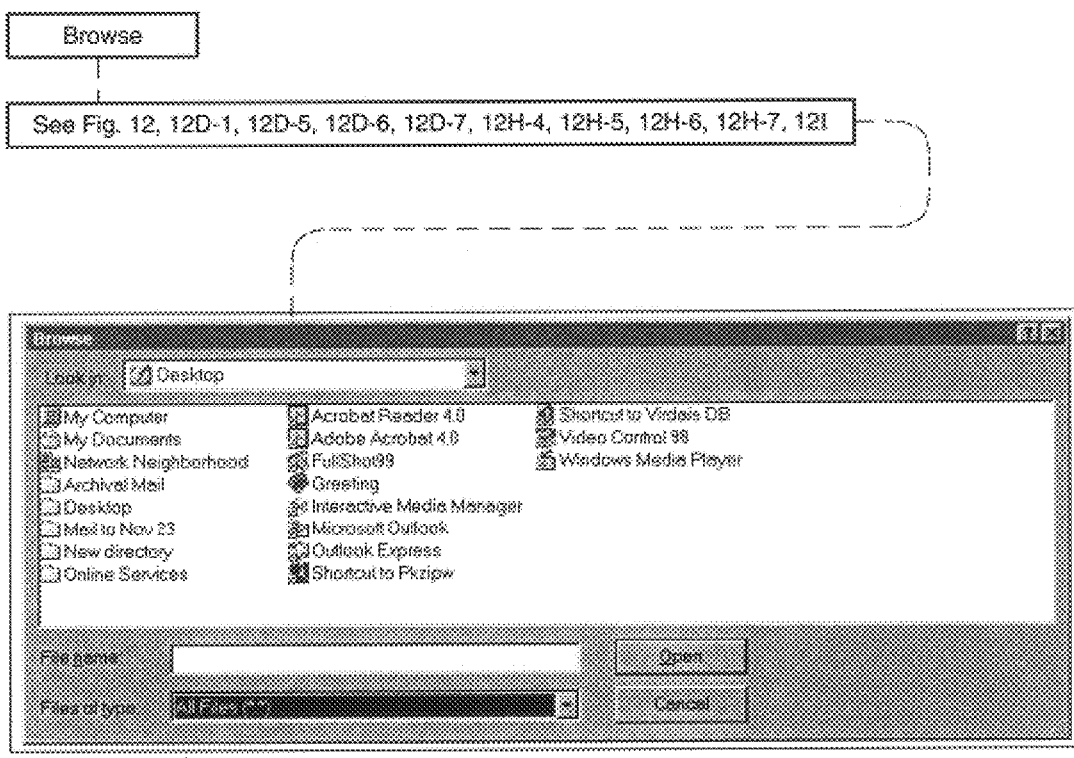
Figures 1, 12A:
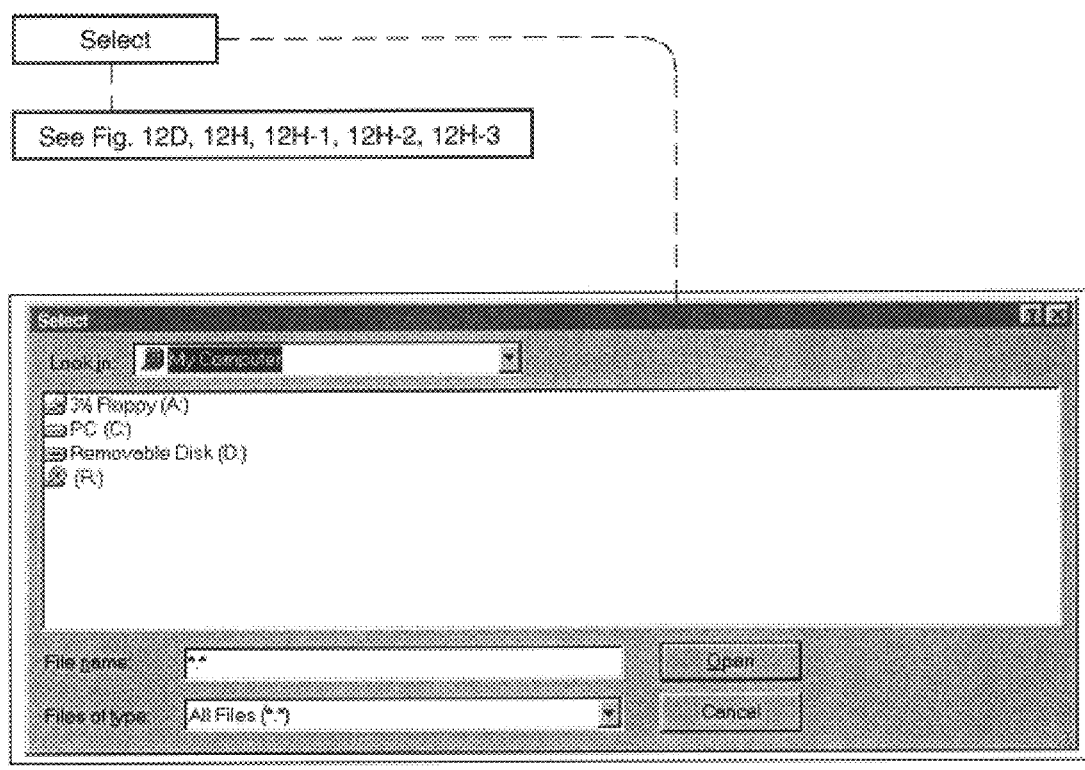
Figure 12B:
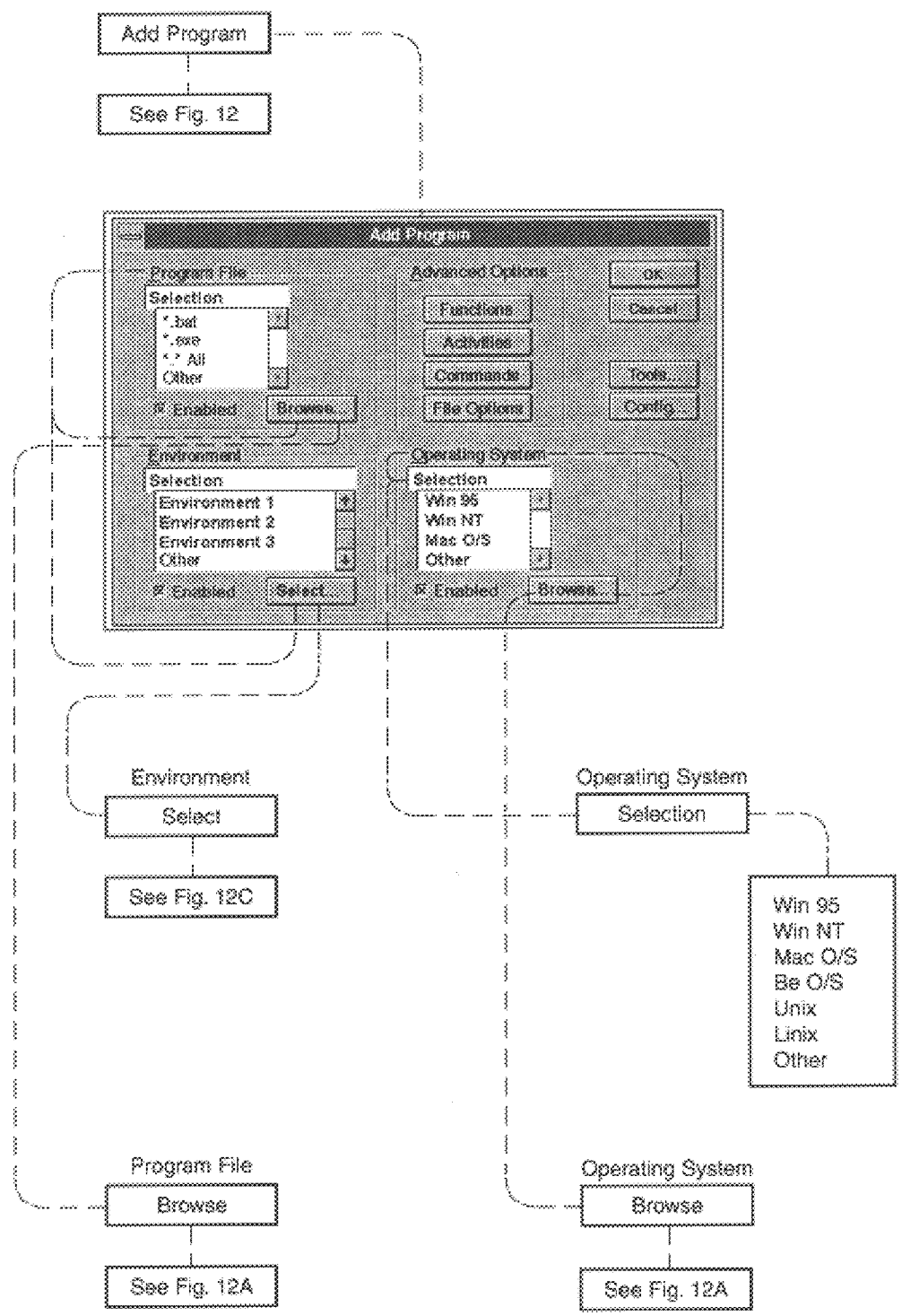
Figure 12C:
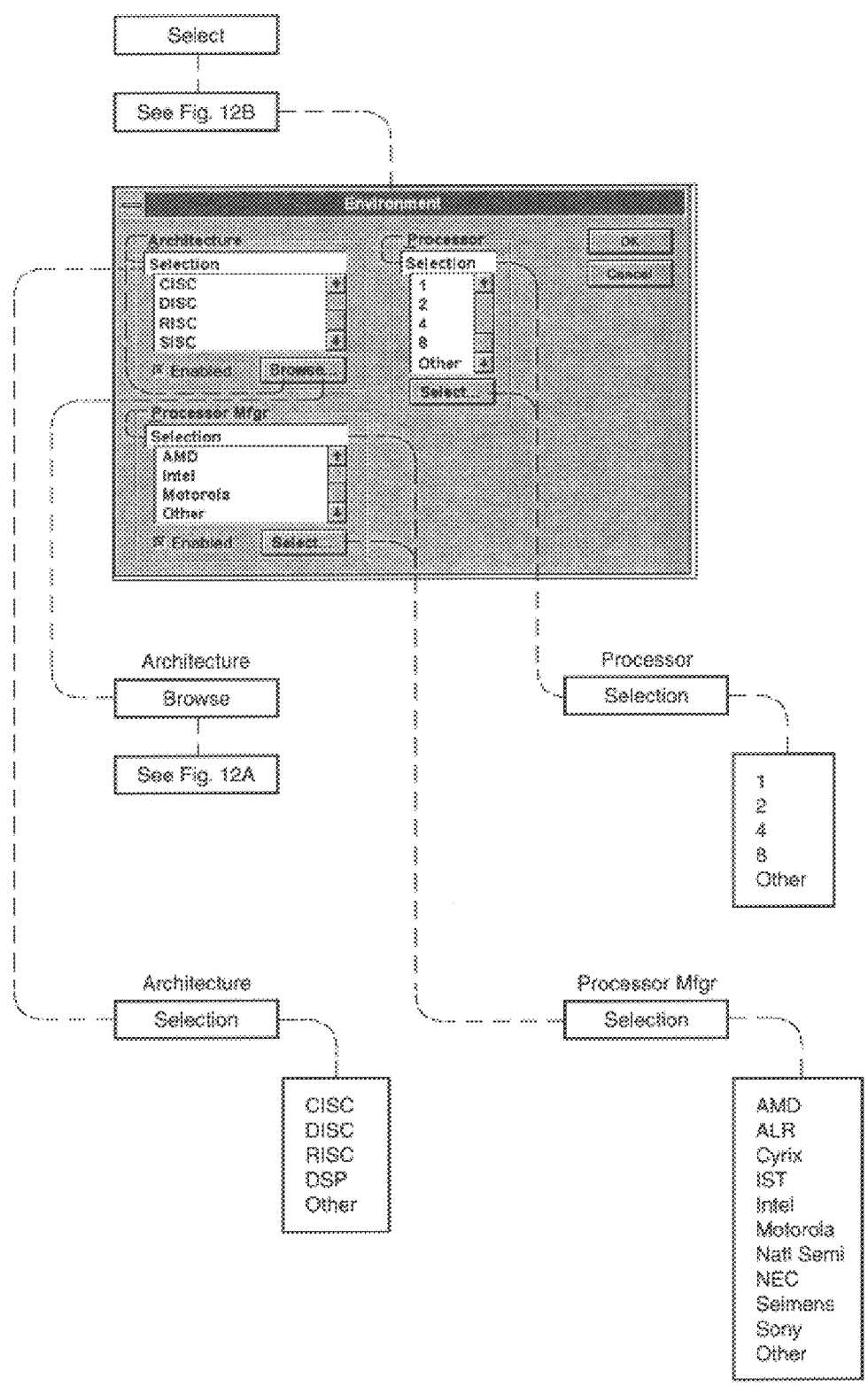

FIG. 8. The overall view of the operating screen, and of the controls and functions FIG. 9. Shell Configuration Manager and Initiating Editor FIG. 10. Configuration Manager showing compounds, controls, and functions. FIGS. 10A-10I show nine applications of the Color Scheme Tab used in this Configuration Manager FIG. 11. Button Label Tabs. FIGS. 11A-11B show two applications of the Button Label Tag FIG. 12. This shows the startup selection screen FIGS. 12A, 12A-1 show Browse and selection screens FIG. 12B shows the Add program screen FIG. 12C shows the Environment Expansion screen FIG. 12D-1 This shows the Compression selection and its directory of program functions that includes; Compression, and Thread. The Browse button is enabled by a check box option.

Figure 12D:
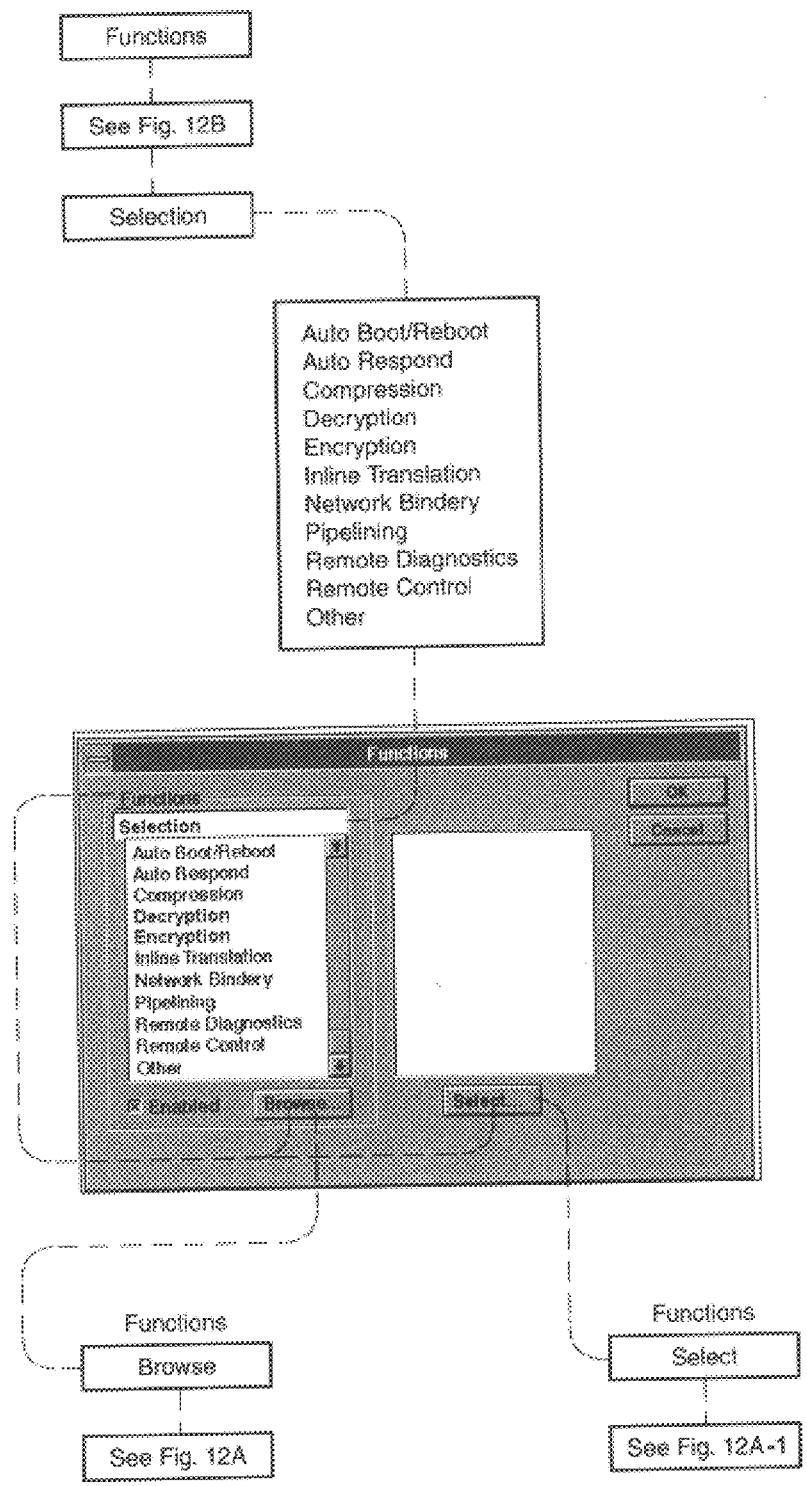
Figures 1, 12D:
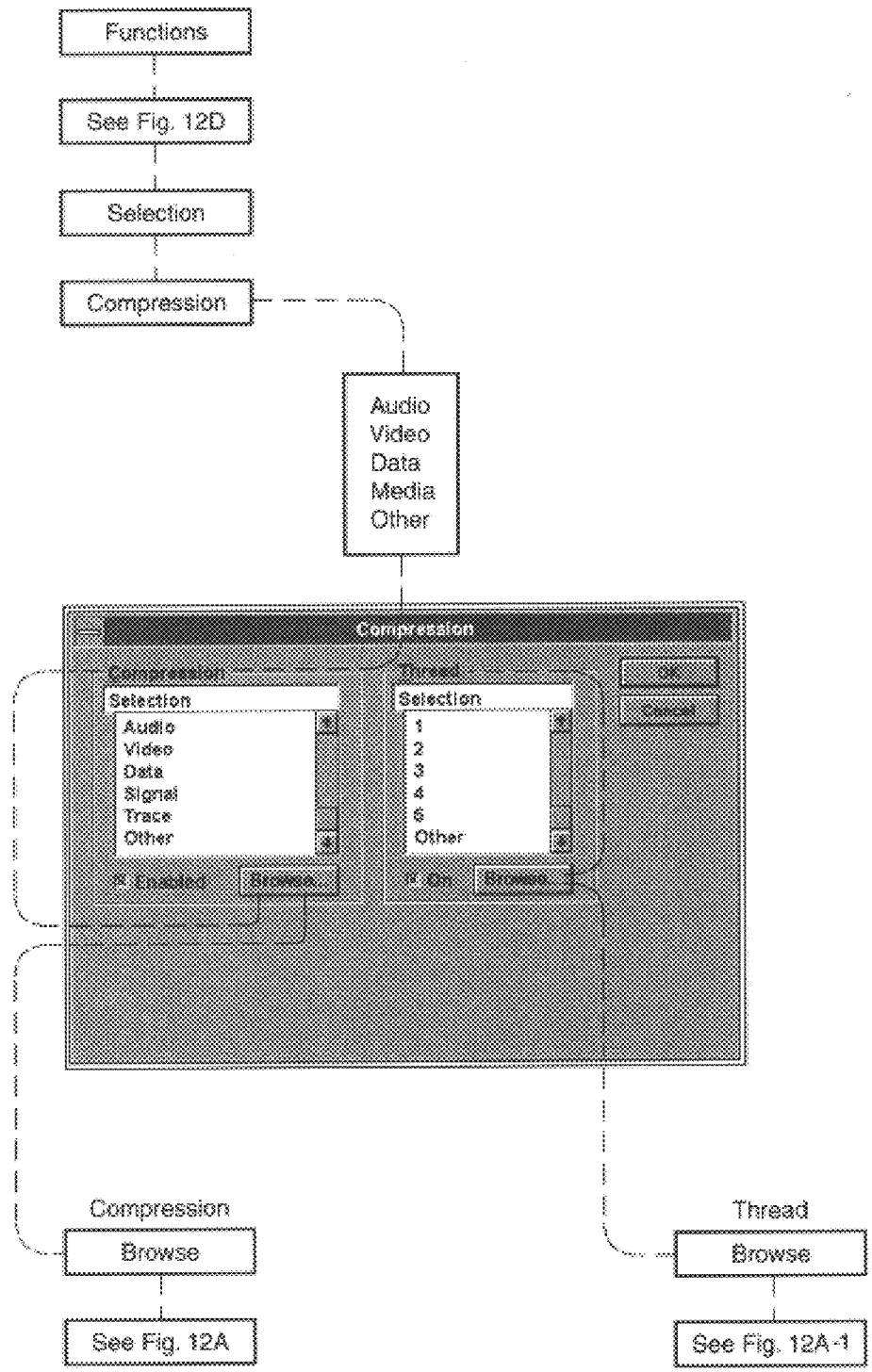
Figures 2, 12D:
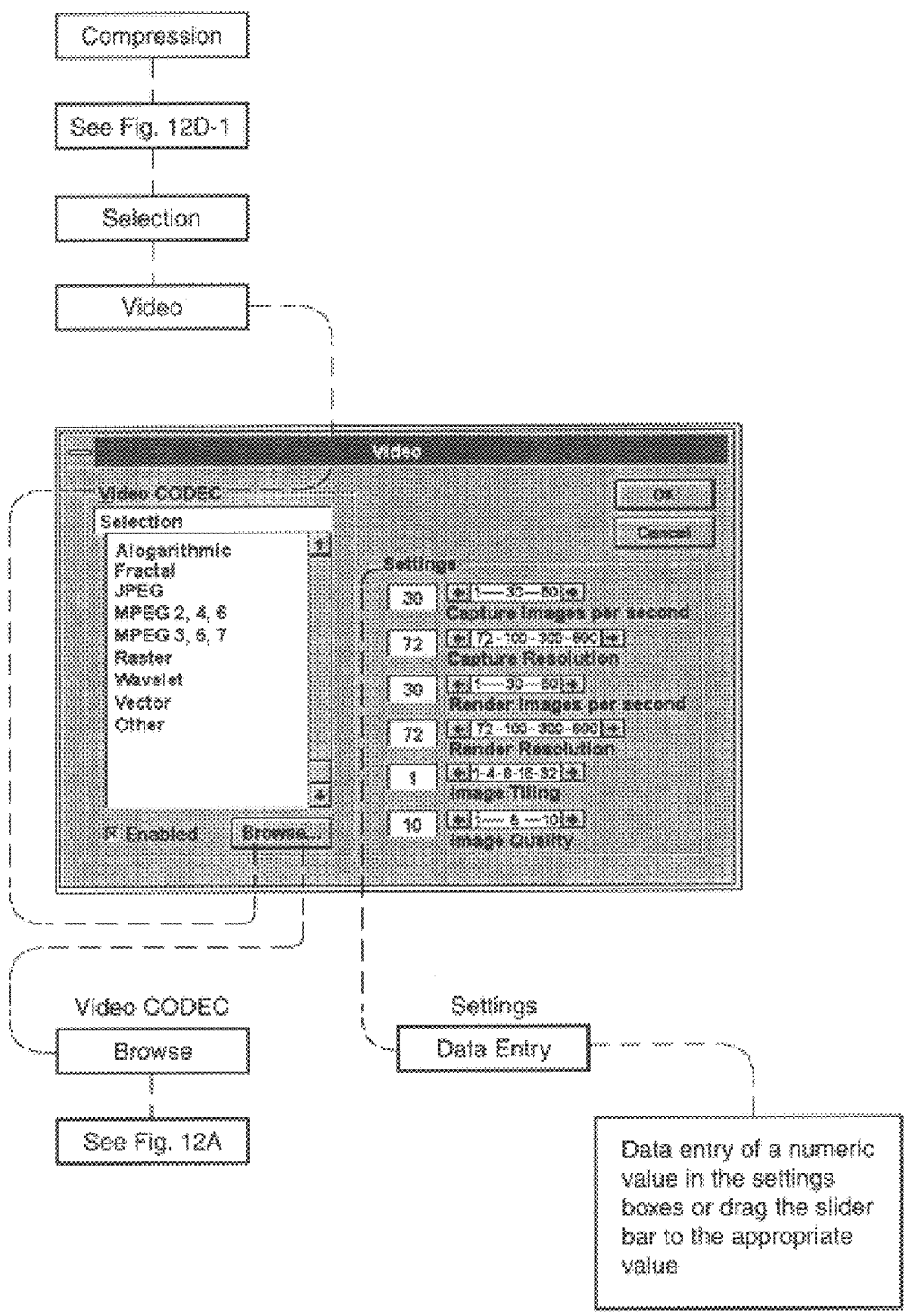
Figures 3, 12D:
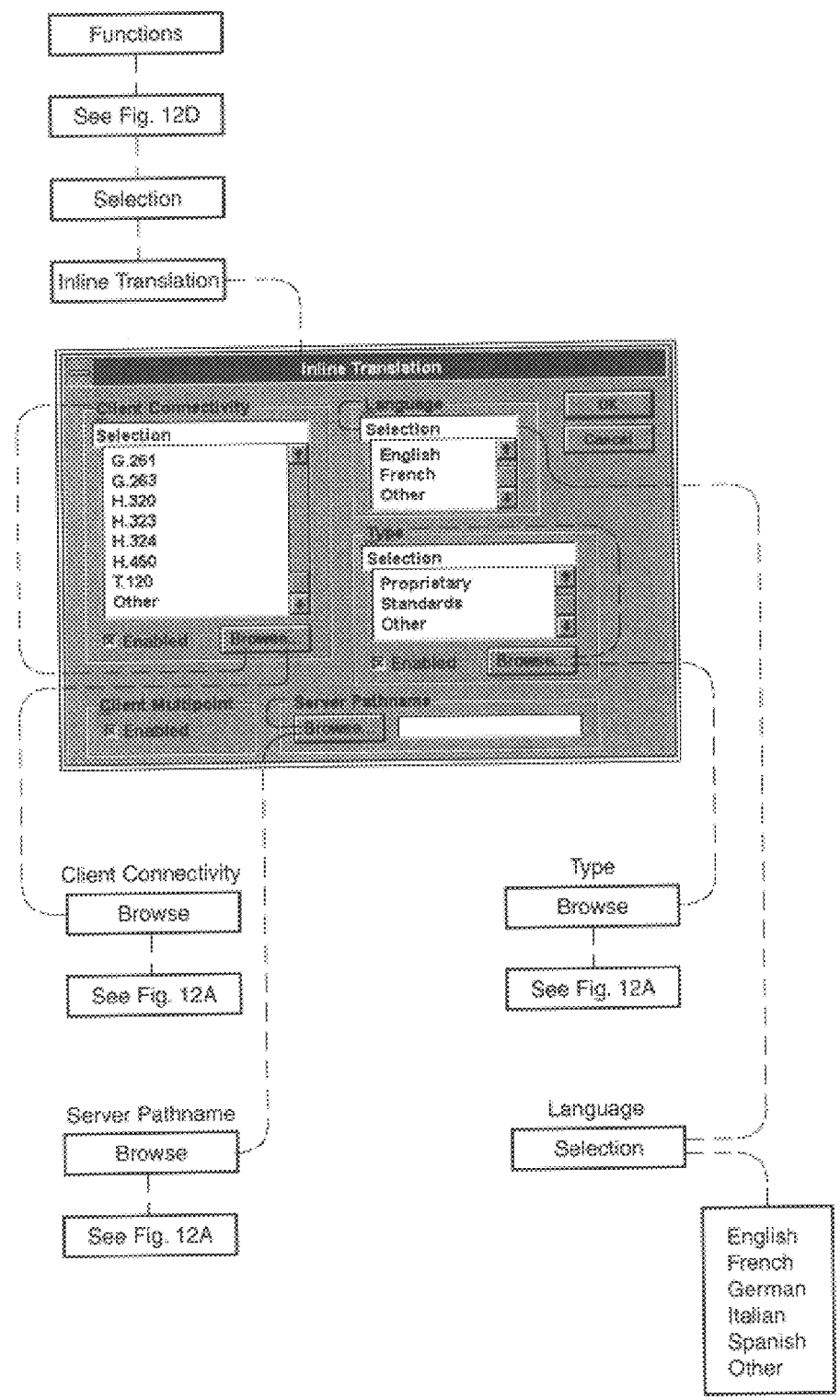
Figures 4, 12D:
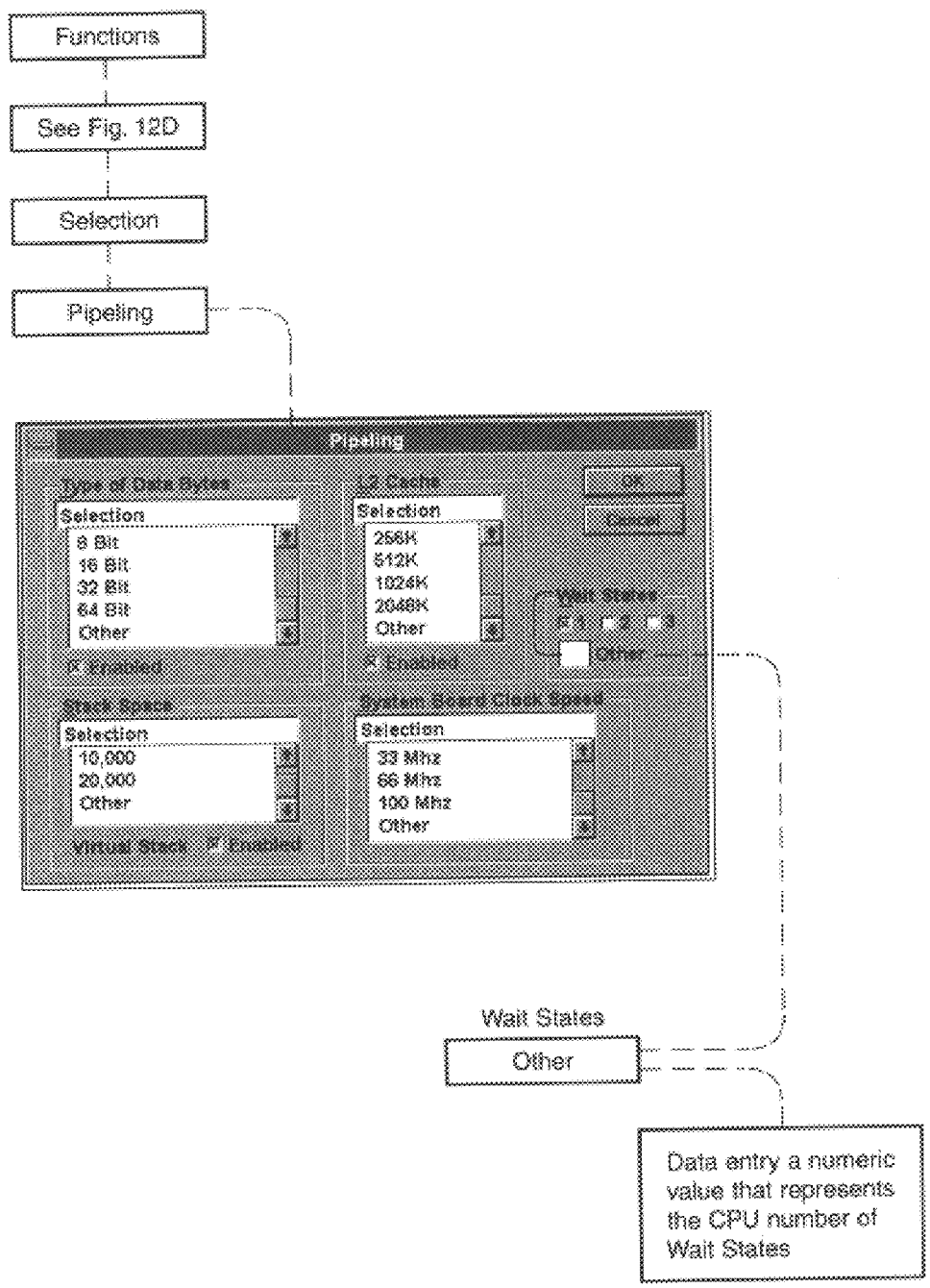
Figures 5, 12D:
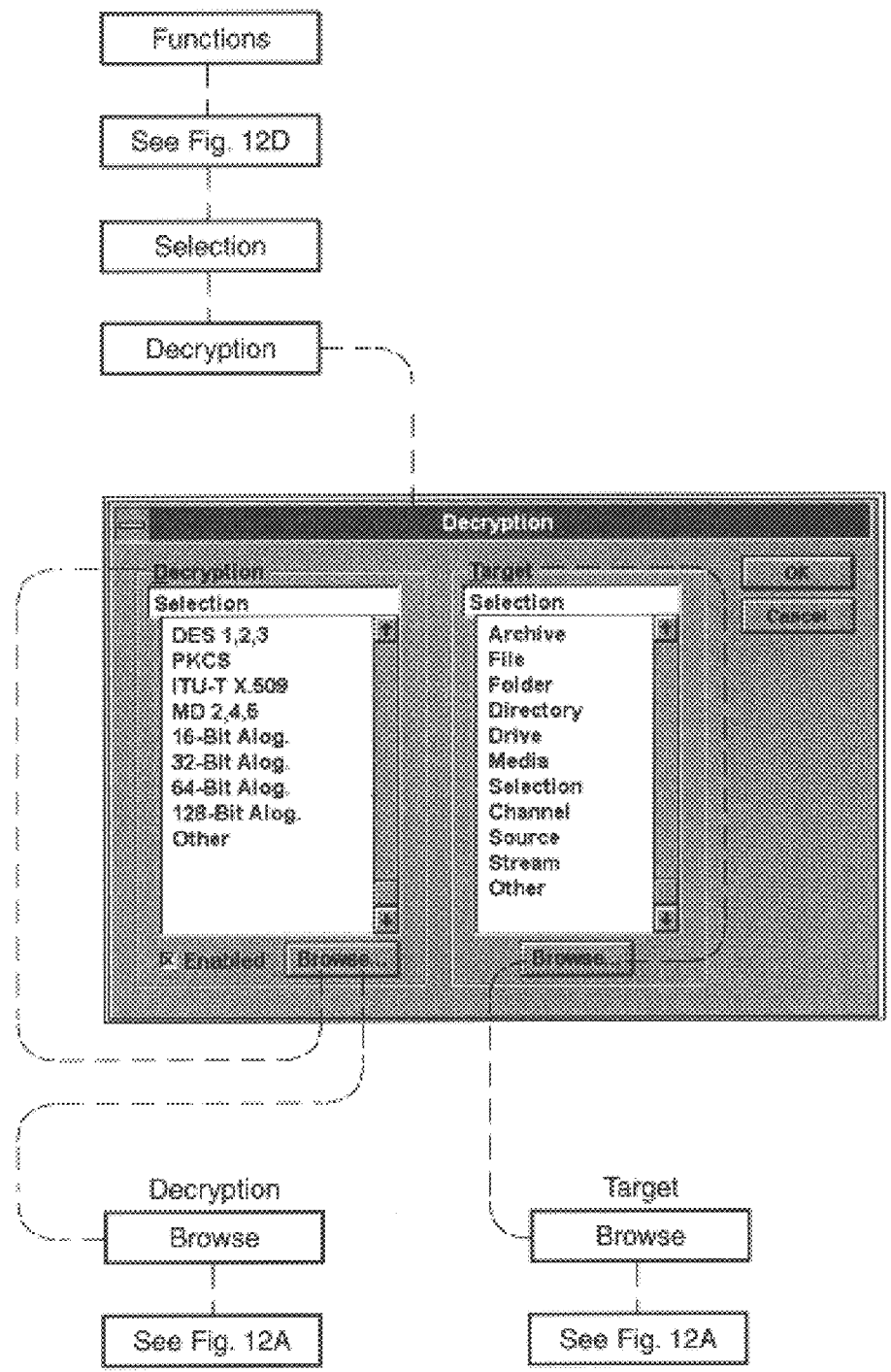
Figures 6, 12D:
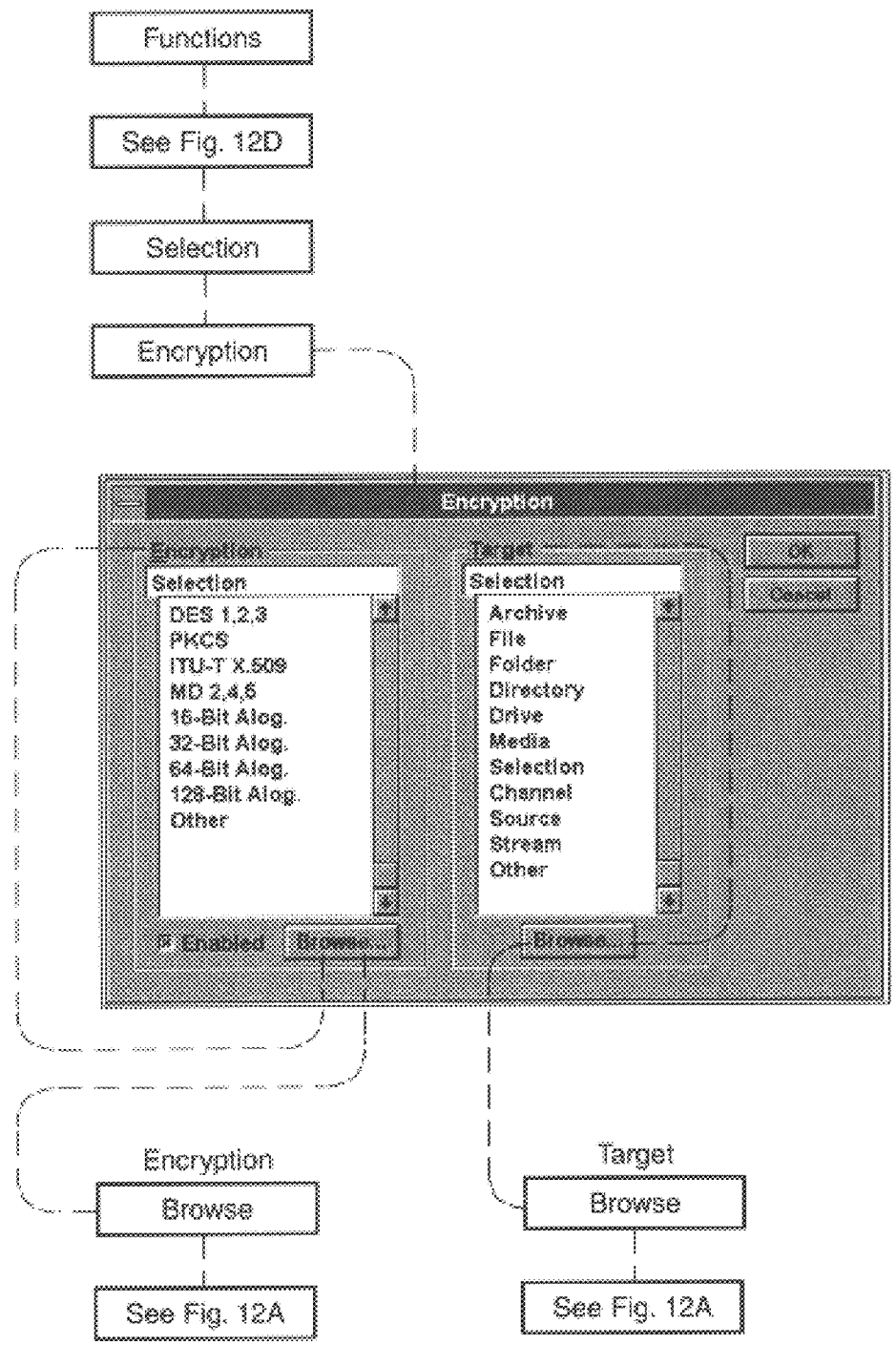
Figures 7, 12D:
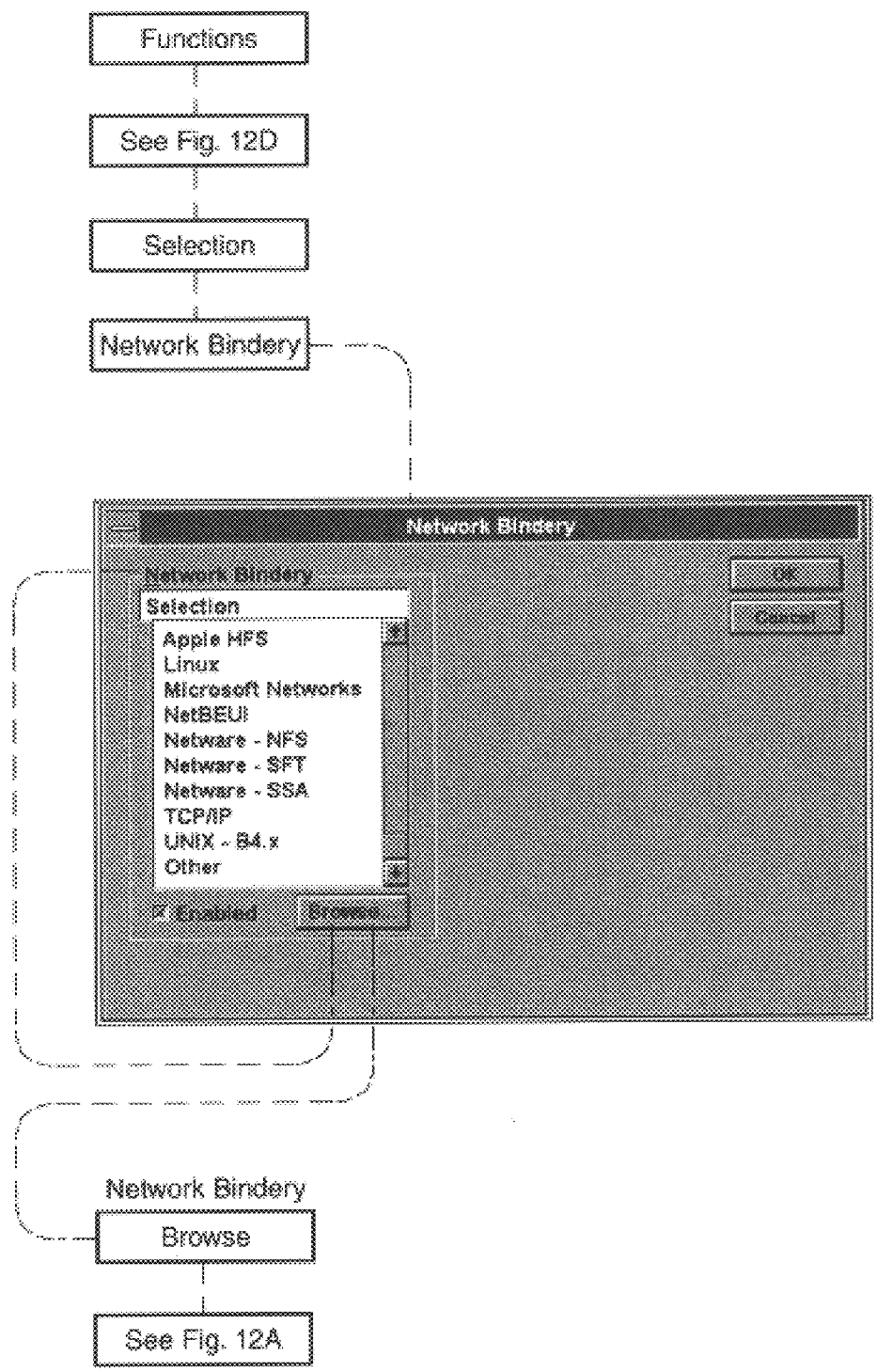
Figures 8, 12D:
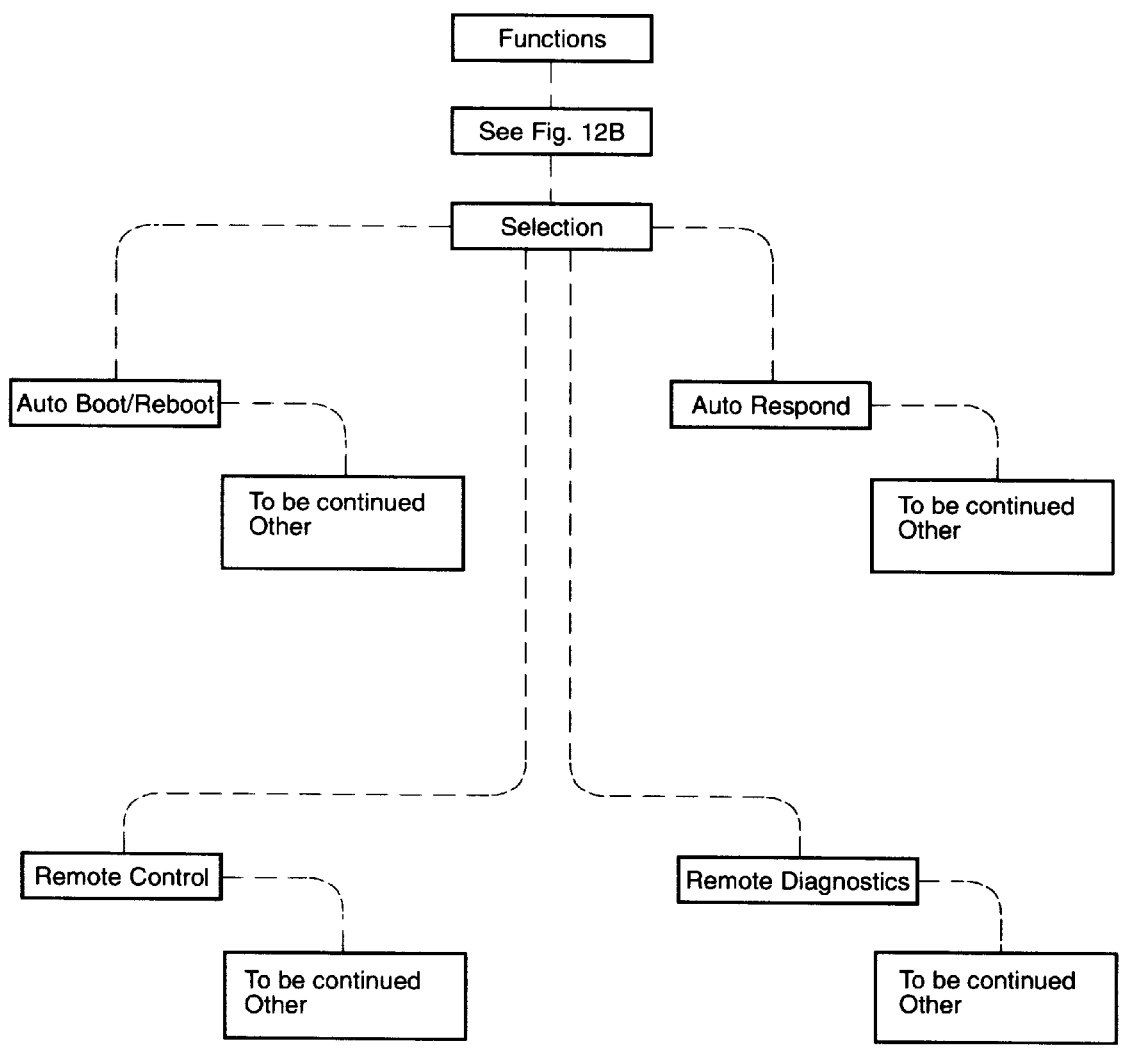

FIG 12D-2 This shows the Video selection and its directory of program functions that includes; Video, and Settings. The Browse button is enabled by a check box option.

FIG. 12D-3 This shows the Inline Translation selection and its directory of program functions that includes; Client Connectivity, Language, Type, Client Multipoint, and Server Pathname. The Browse button is enabled by a check box option.

FIG. 12D-4 This shows the Pipeling selection and its directory of program functions that includes; Type of Data Bytes, L2 cache, Stack Space, Wait States, and System Board Clock Speed. The selection is enabled by a check box option and includes the Virtual Stack option.

FIG 12D-5 This shows the Dycryption selection and its directory of program functions that includes; Decryption and Target. The Browse button is enabled by a check box option.

FIG. 12D shows the Function Selection screen

FIG. 12D-6 This shows the Encryption selection and its directory of program functions that incudes; Encryption and Target. The Browse button is enabled by a check box option.

FIG. 12D-7 This shows the Network Bindery selection and its directory of program functions that includes Network Bindery. The Browse button is enabled by a check box option.

FIG. 12D-8 This shows the Functions selection and its directory of program functions that includes; Auto Boot/Reboot, Auto Respond, Remote Control, remote Diagnostics.

Figure 12E:
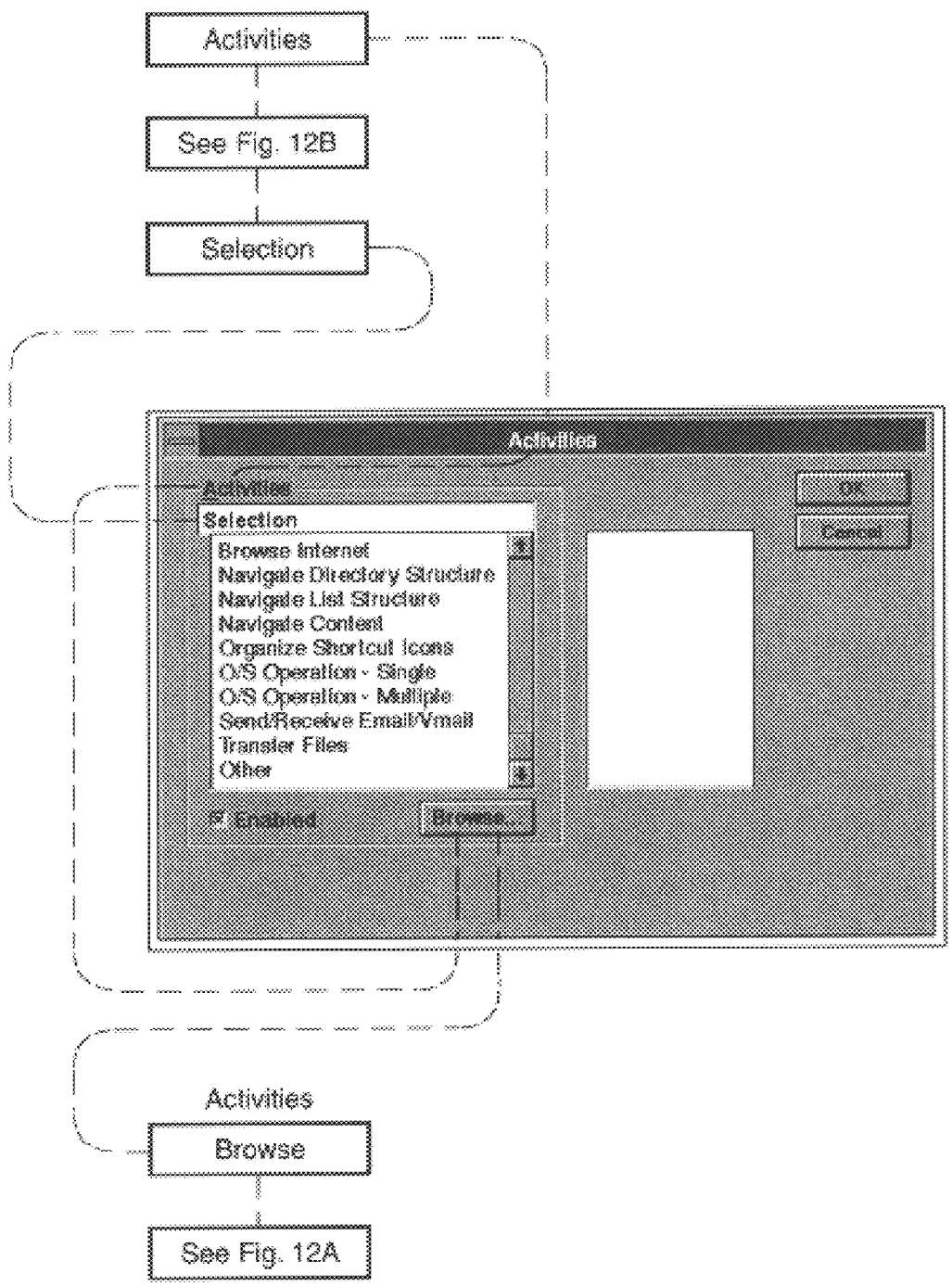

FIG. 12E This shows the Activities selection and its directory of program functions that includes Activities. Other information will appear beside the Activities display box as selections are made from the available list of choices. The Browse button is enabled by a check box option.

Figure 12F:
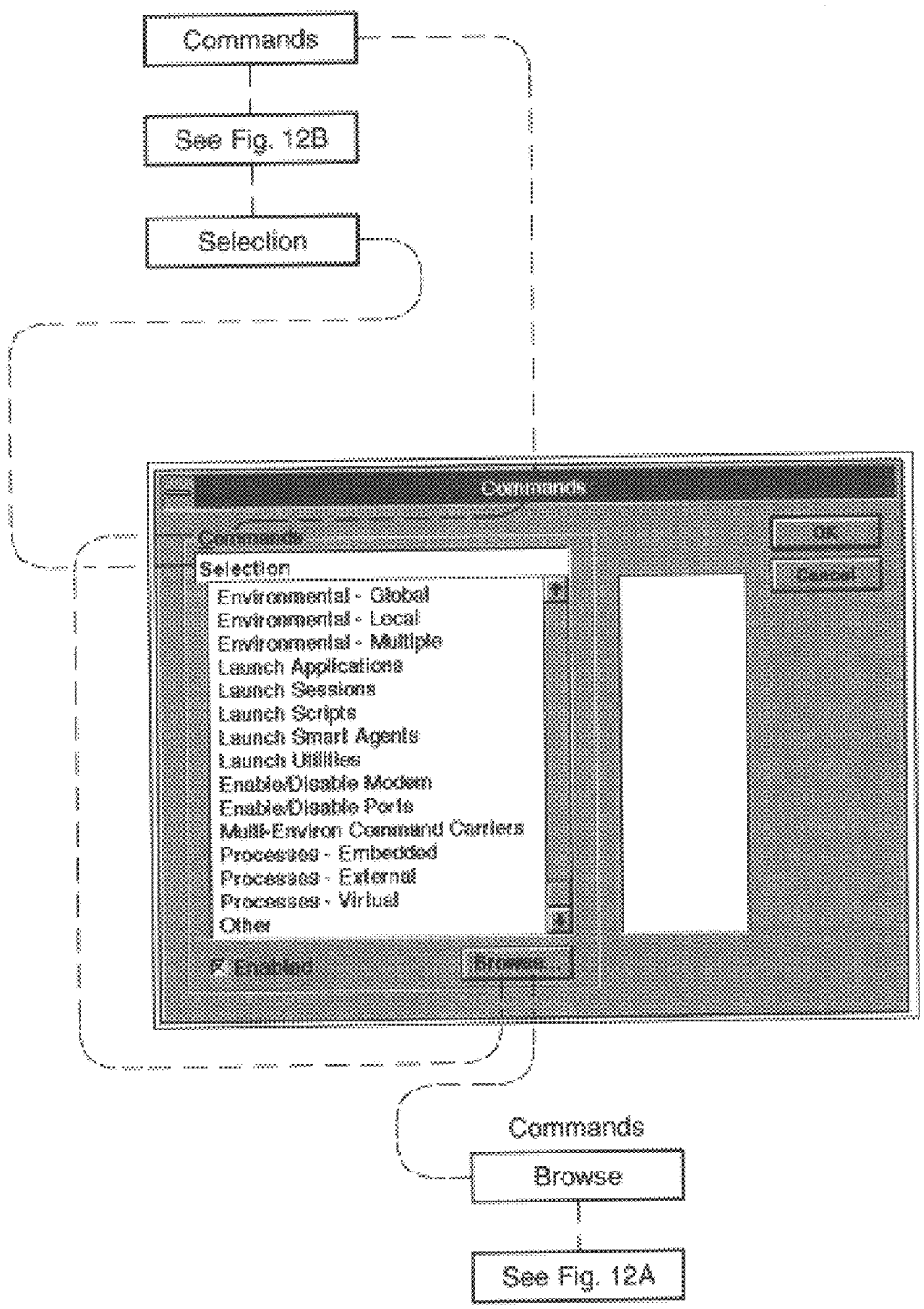

FIG. 12F This shows the Commands selection and its directory of program functions that includes Commands. Other information will appear beside the Commands display box as selections are made from the available list of choices. The Browse button is enabled by a check box option.

Figure 12G:
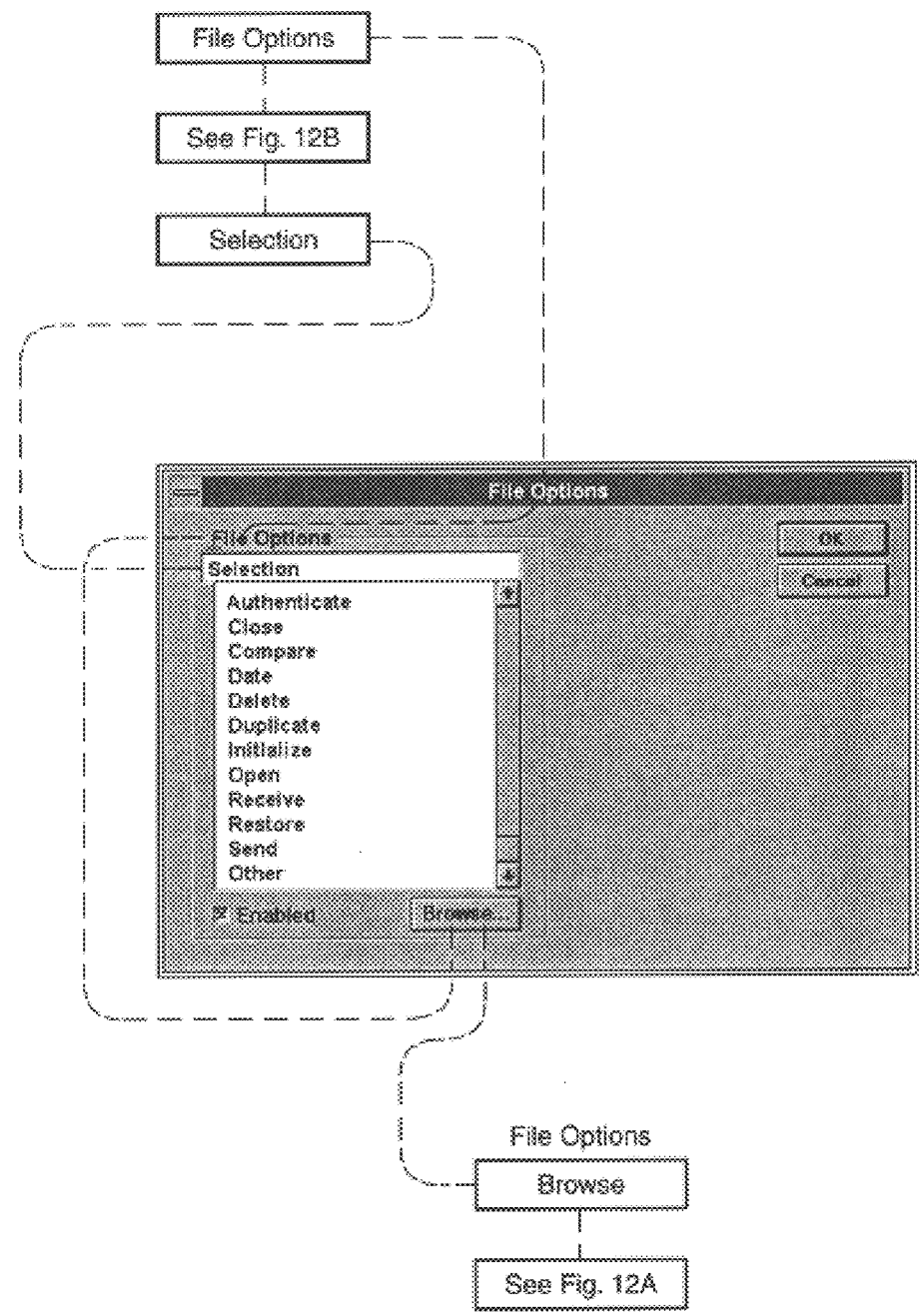

FIG. 12G This shows the File Options selection and its directory of program functions that include File Options. The Browse button is enabled by a check box option.

Figure 12H:
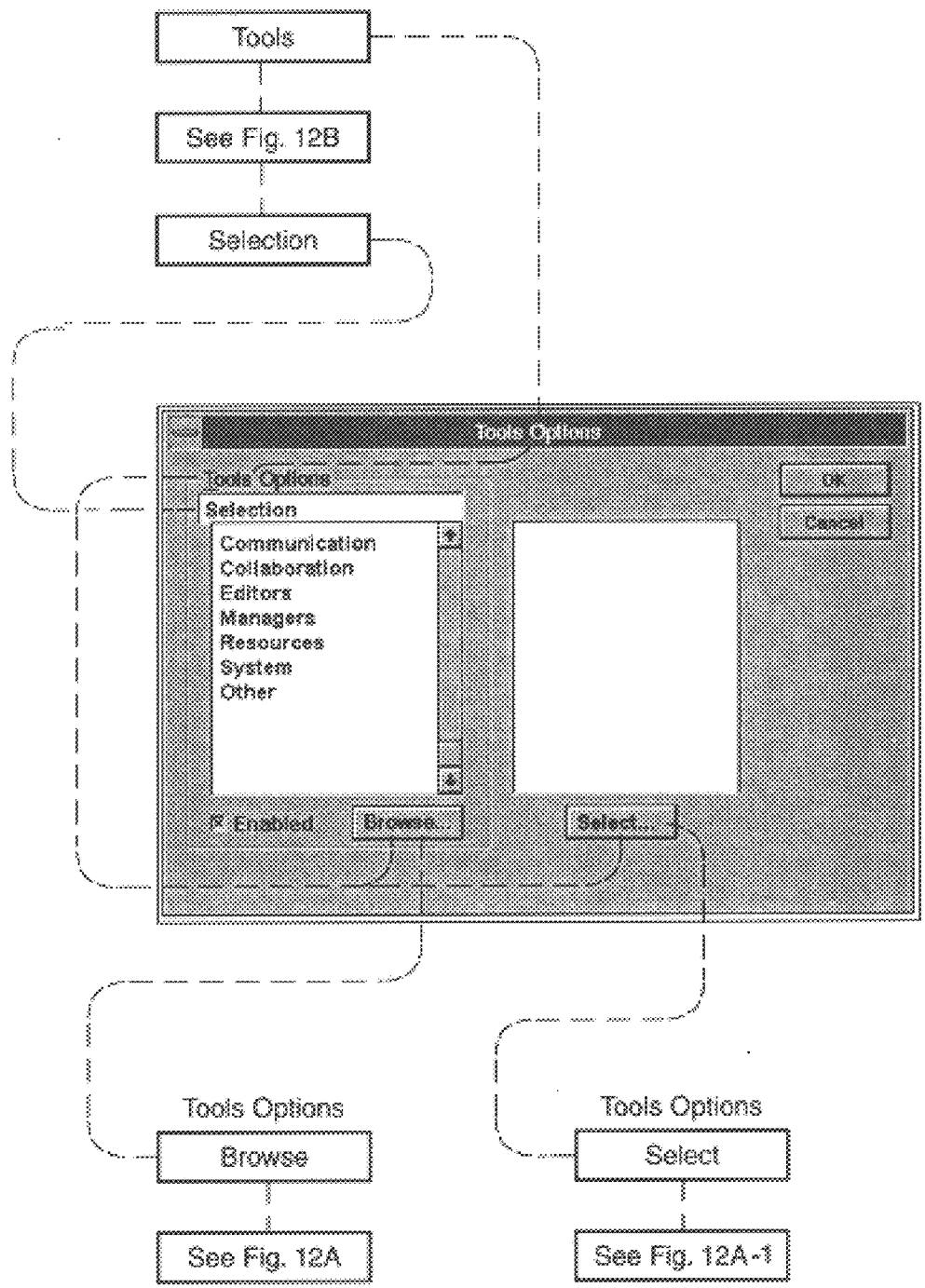
Figures 1, 12H:
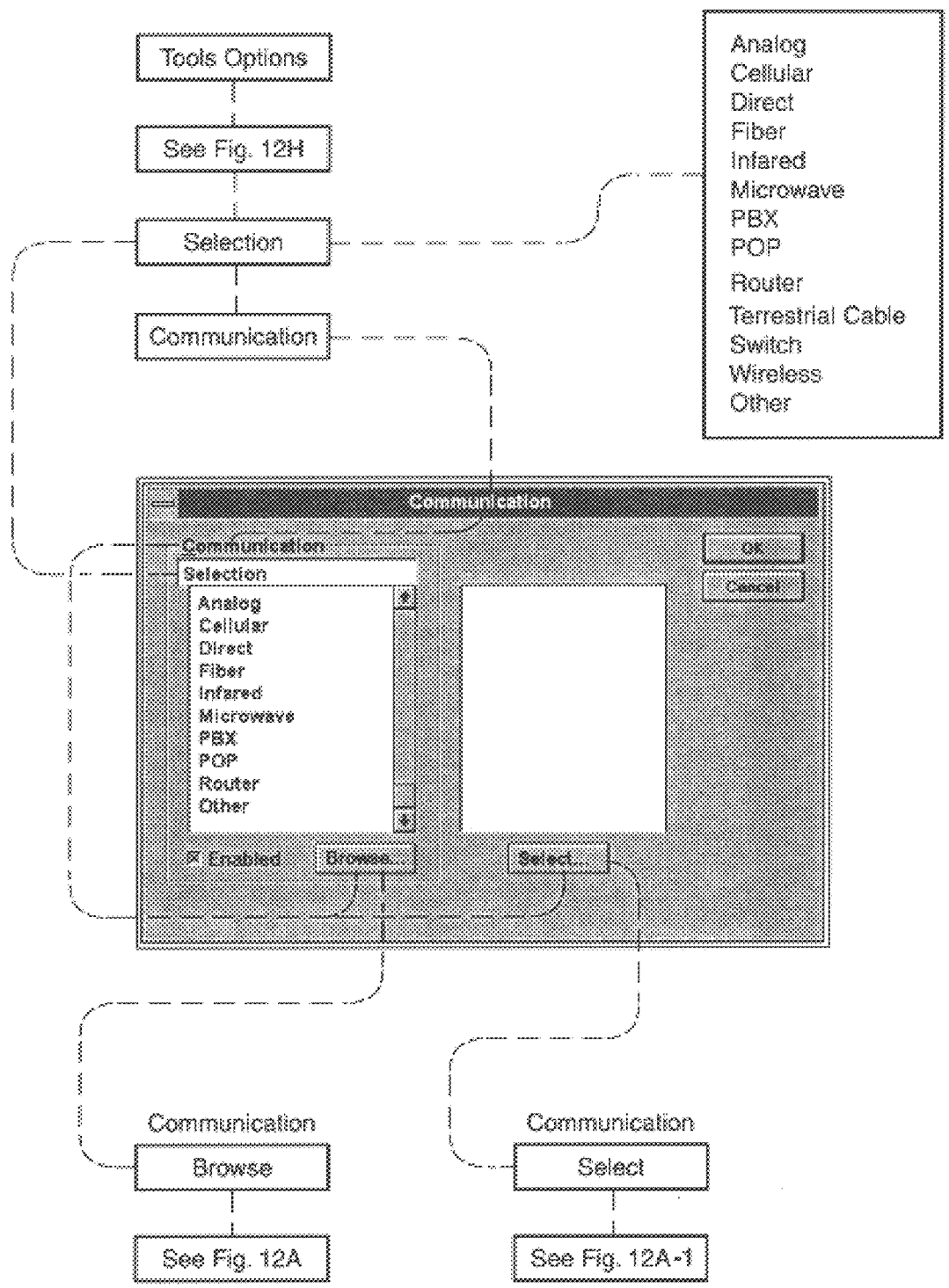
Figures 2, 12H:
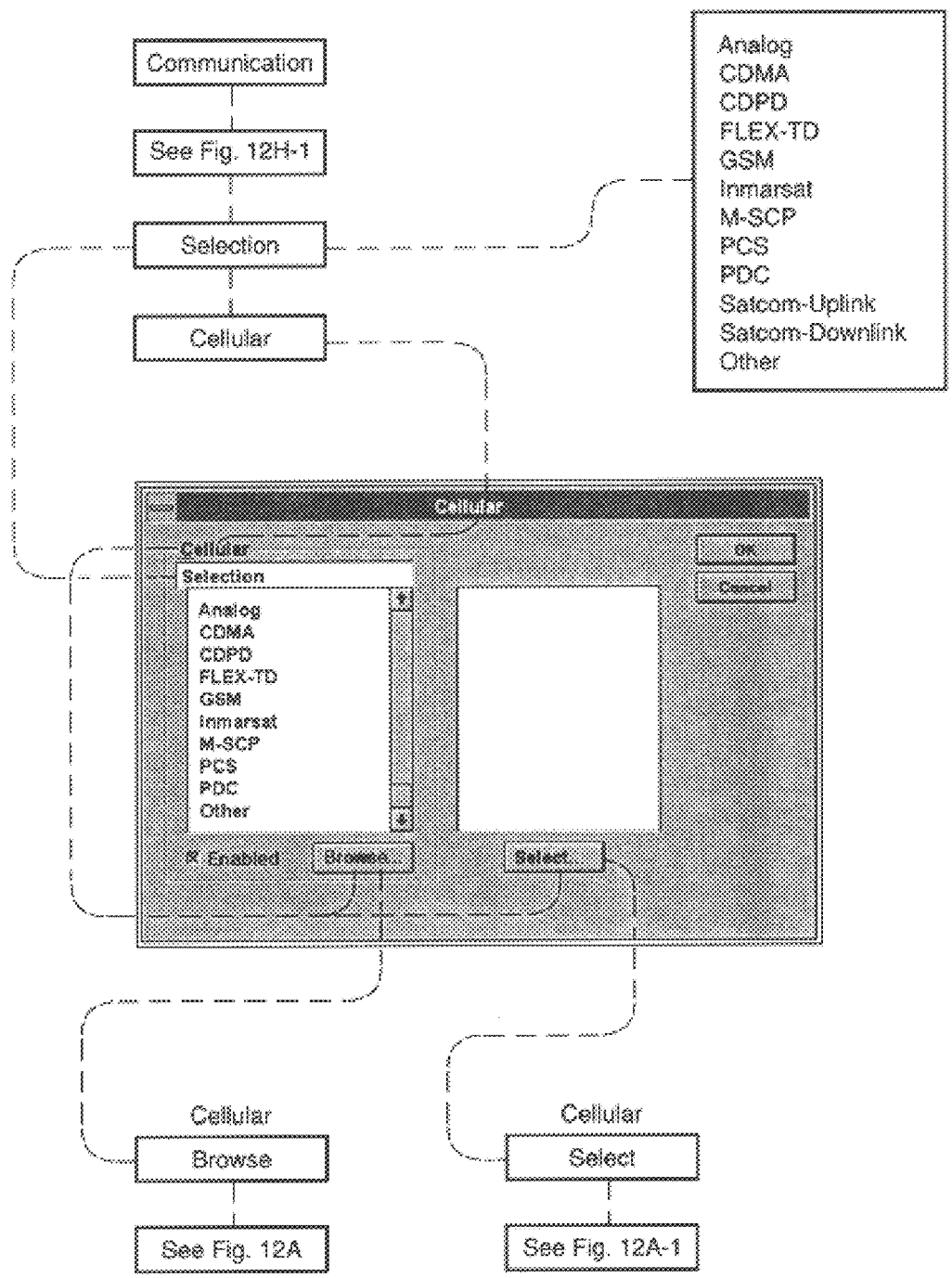
Figures 3, 12H:
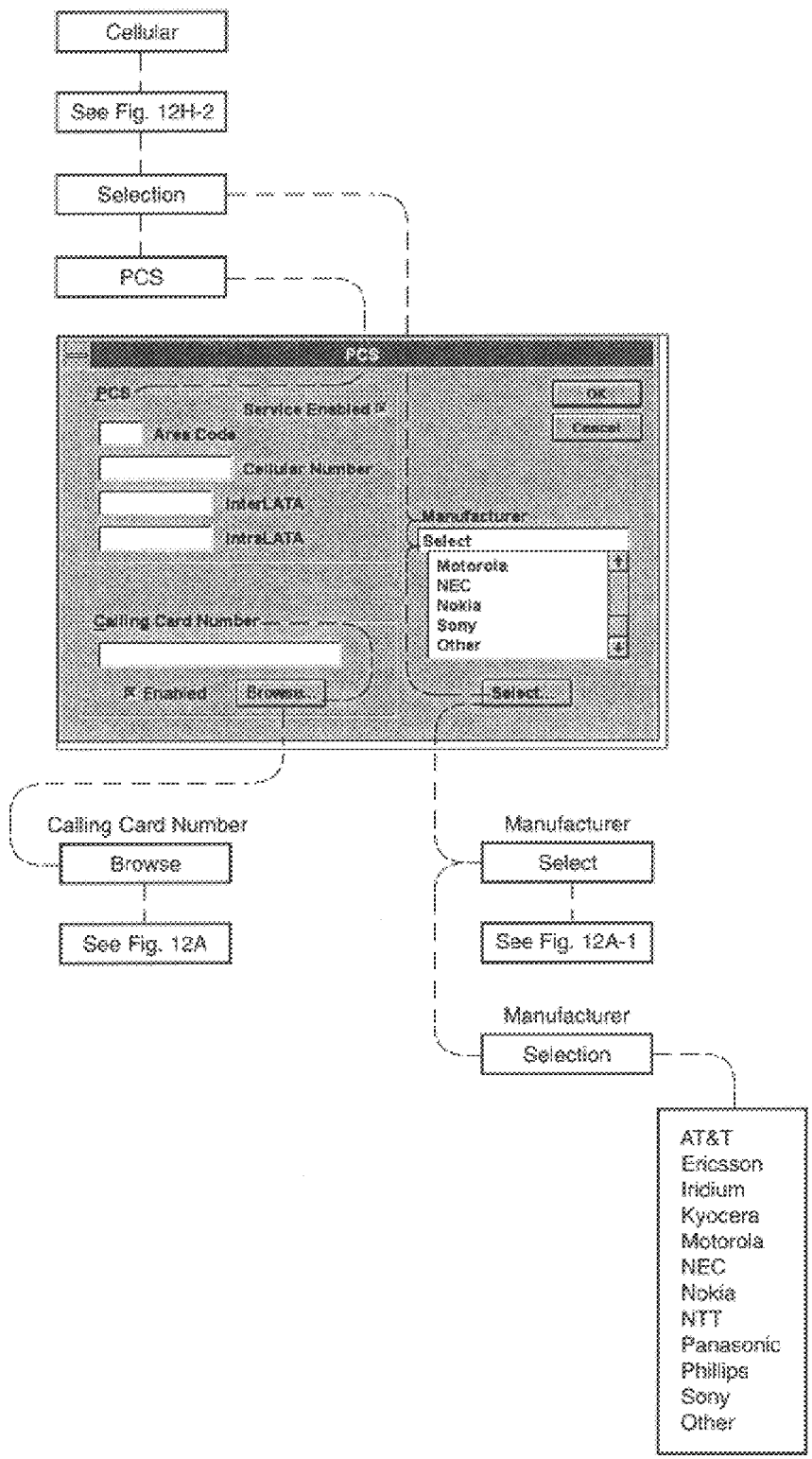
Figures 4, 12H:
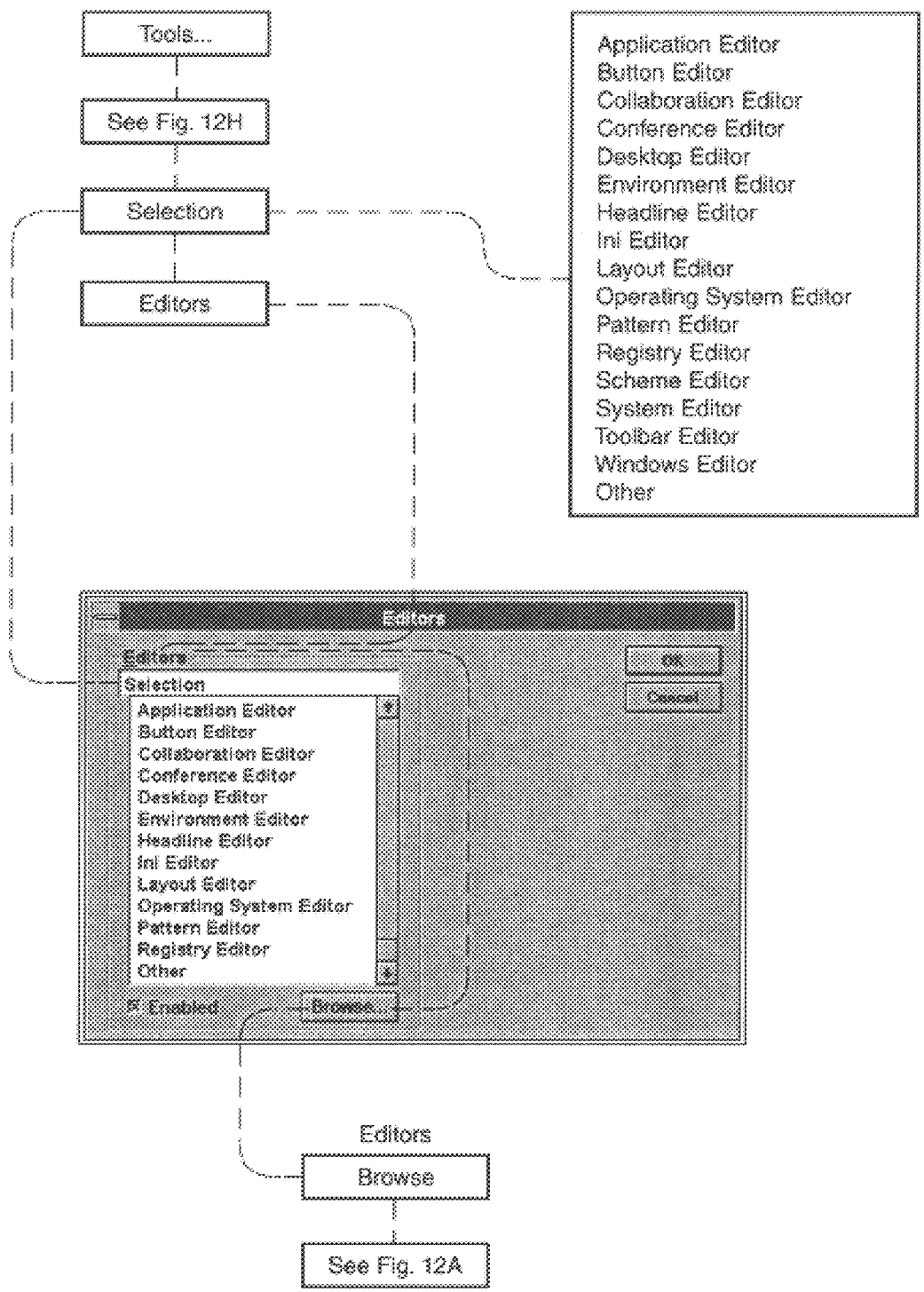
Figures 5, 12H:
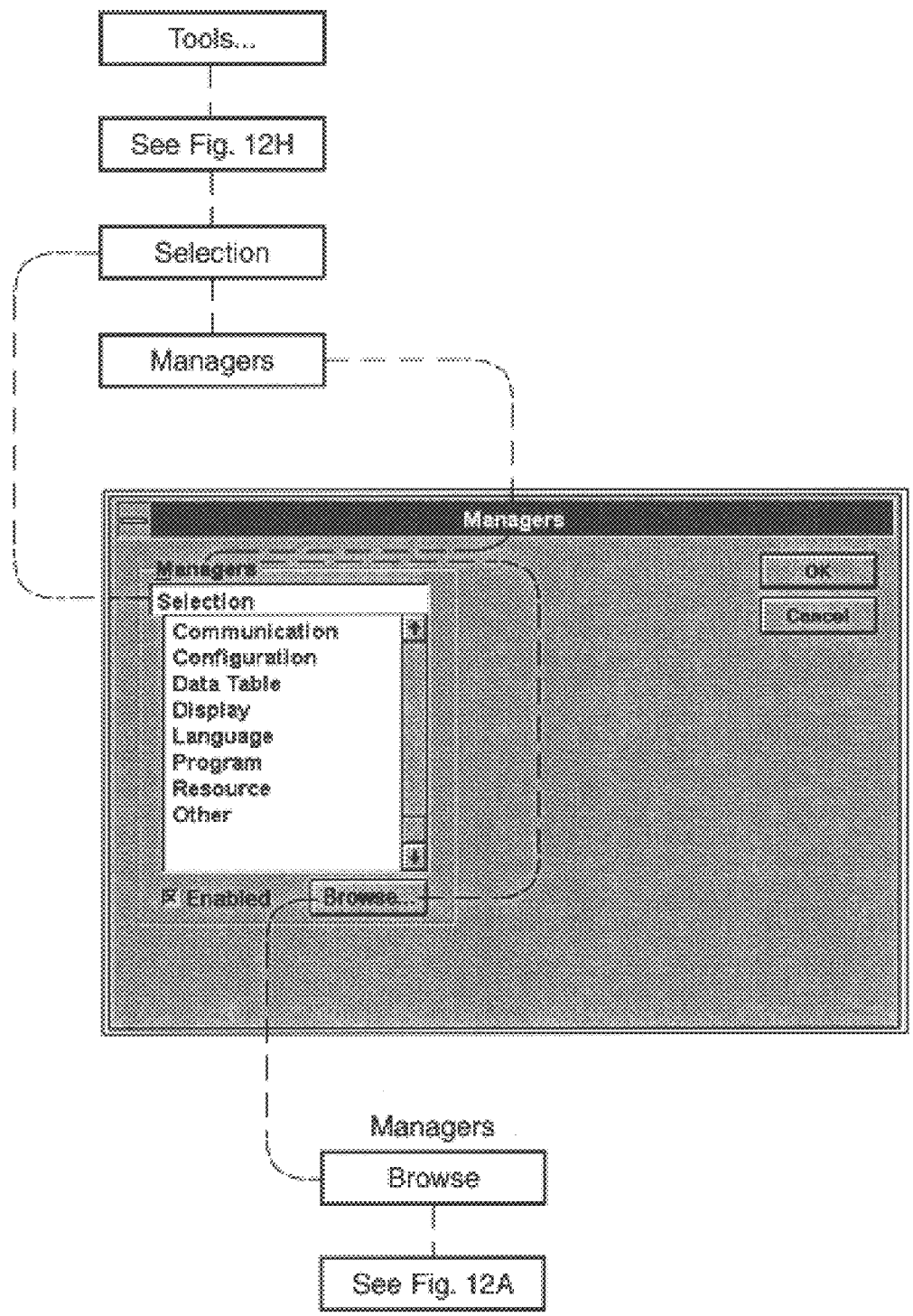
Figures 6, 12H:
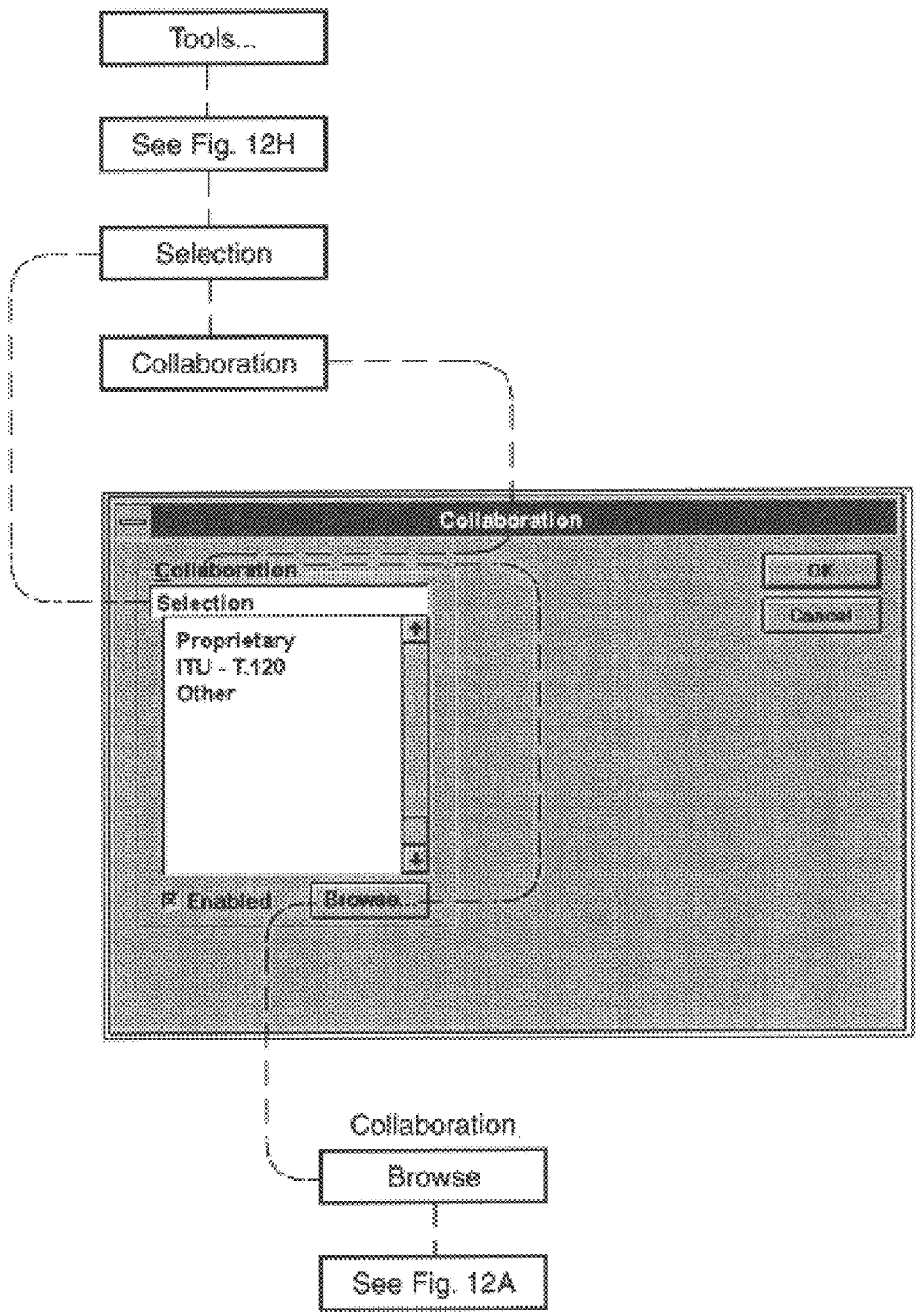
Figures 7, 12H:
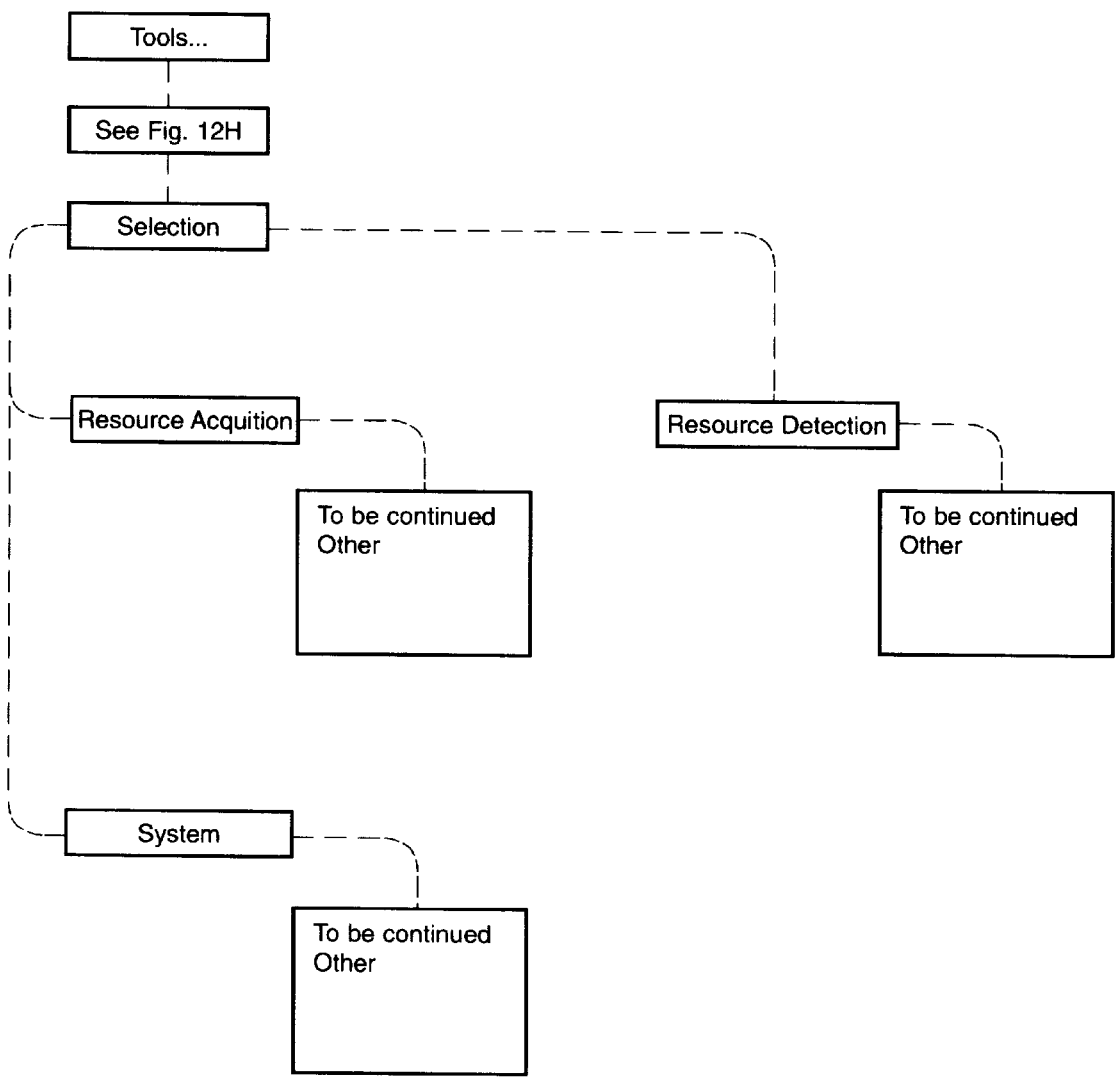

FIG. 12H This shows the Tools Options selection and its directory of program functions including Tools Options. Other information will appear beside the Commands display box as selections are made from the available list of choices. The Browse button is enabled by a check box option and the Select button displays choices from the list.

FIG. 12H-1 This shows the Communication selection and its directory of program functions that includes Communication. The Browse button is enabled by a check box option and the Select button displays choices from the list.

FIG. 12H-2 This shows the Cellular selection and its directory of program functions that includes Cellular. The Browse button is enabled by a check box option and the Select button displays choices from the list.

FIG. 12H-3 This shows the PCS selection and its directory of program function that includes, PCS, Calling card Number, and Manufacutrer. The Browse button is enabled by a check box option and the Select button displays choices from the List. The Service Enabled selection is enabled by a check box option FIG. 12H-4 This shows the Editors selection and its directory of program functions that included Editors. The Browse button is ebabled by a check box option.

FIG. 12H-5 This shows the Managers selection and its directory of program functions that includes Managerss. The Browse button is enabled by a check box option.

FIG. 12H-6 This shows the Collaboration selection and its directory of program functions that includes Collaboration. The Browse button is enabled by a check box option.

FIG. 12H-7 This shows the Tools selection and its directory of program functions that includes; Resource Acquition, Resource Detection, and System.

Figure 12I:
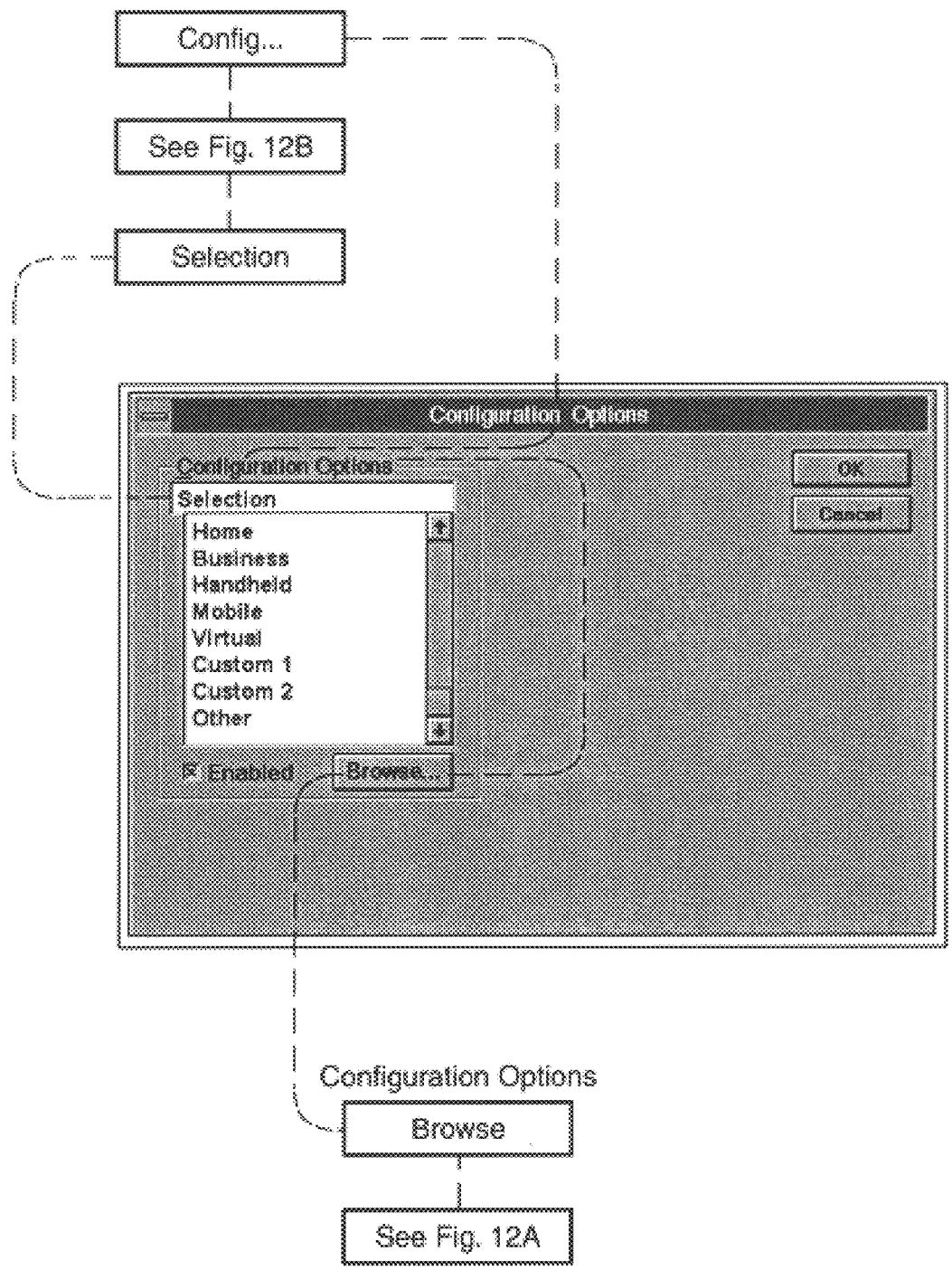

FIG. 12I This shows the Configuration Options selection and its directory of program functions that includes Configuration Options. The Browse button is enabled by a check box option.

Figure 13:
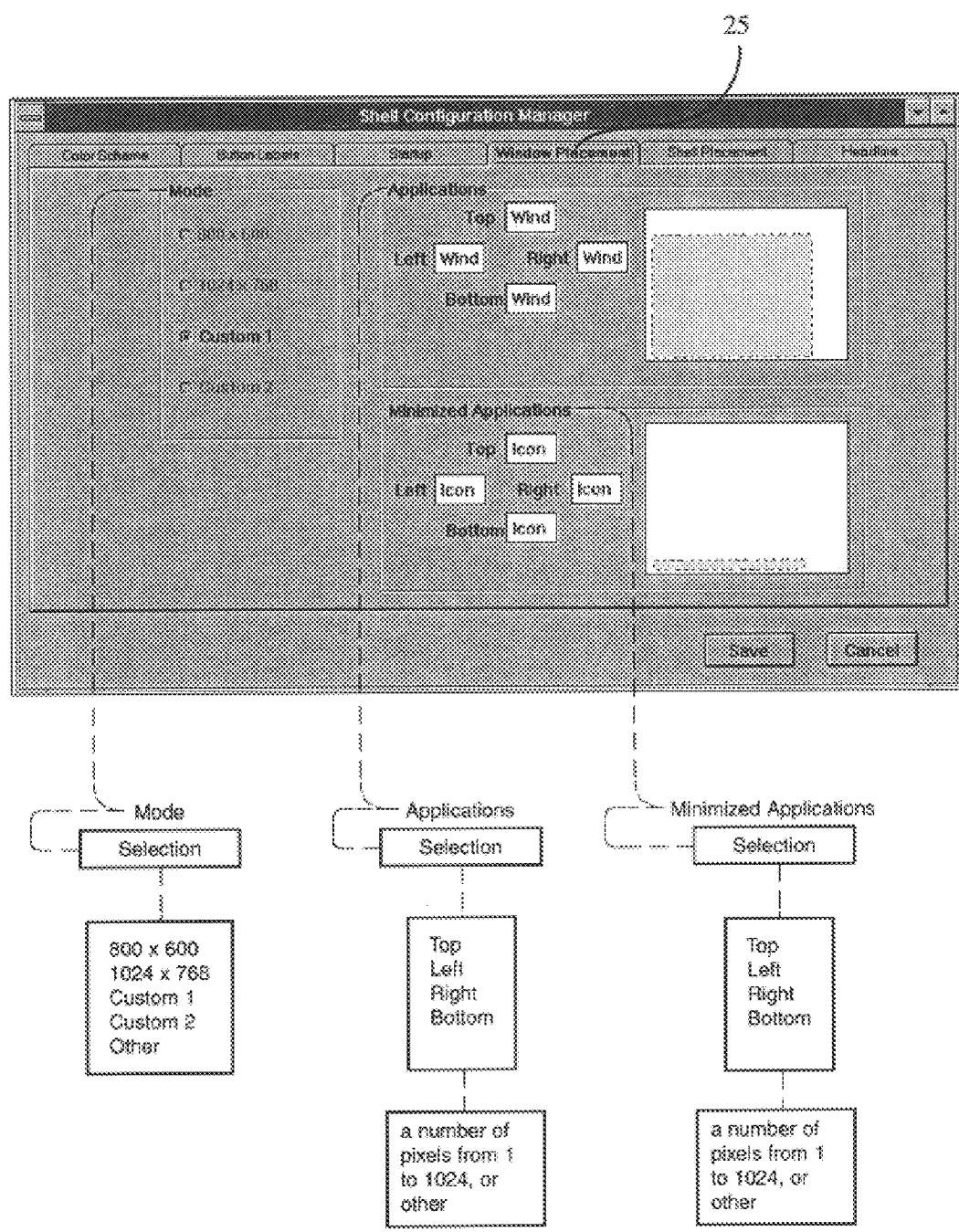

FIG. 13. This shows the Window Placement Tab.

Figure 14:
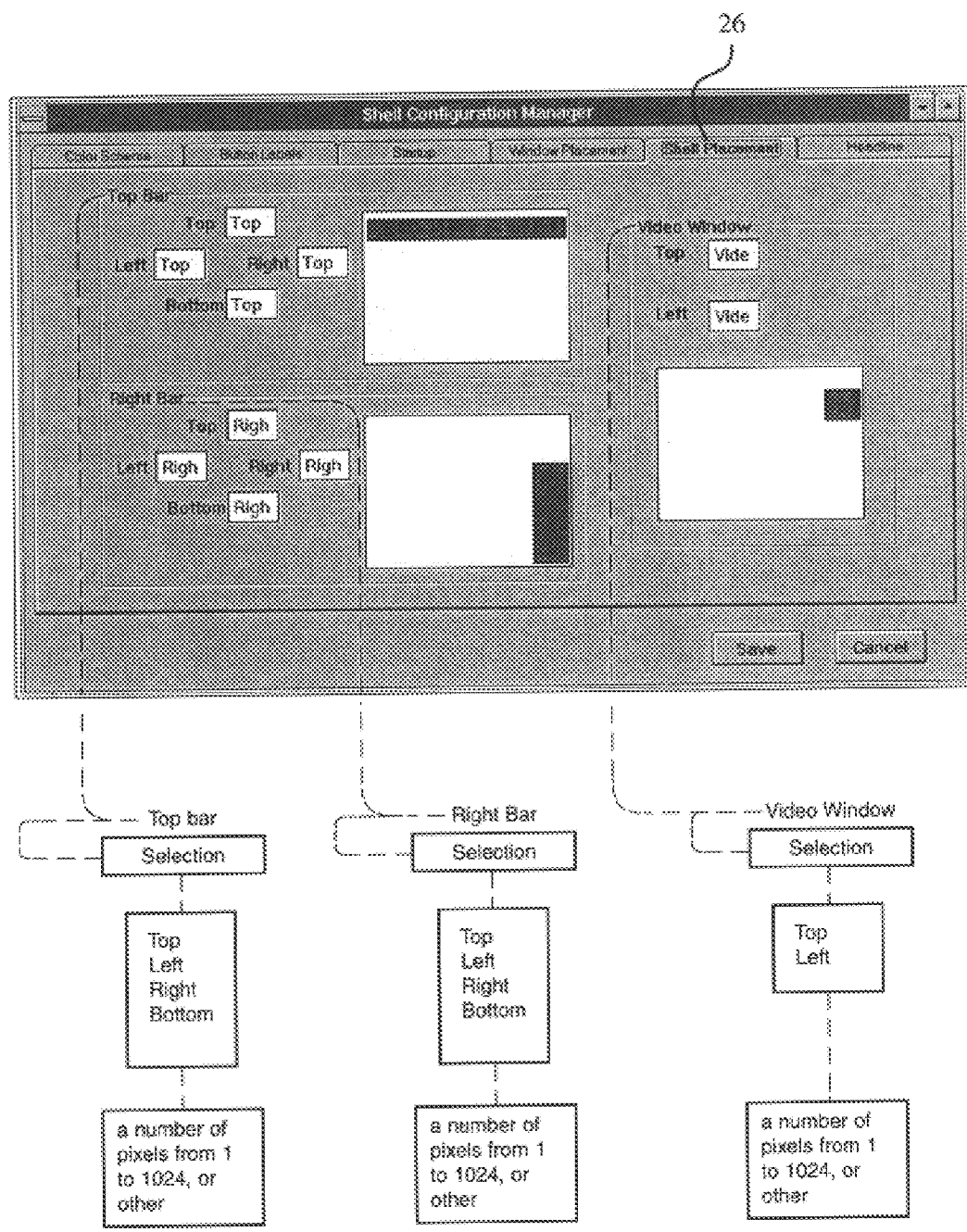

FIG. 14. This shows the Shell Placement Tab.

Figure 15:
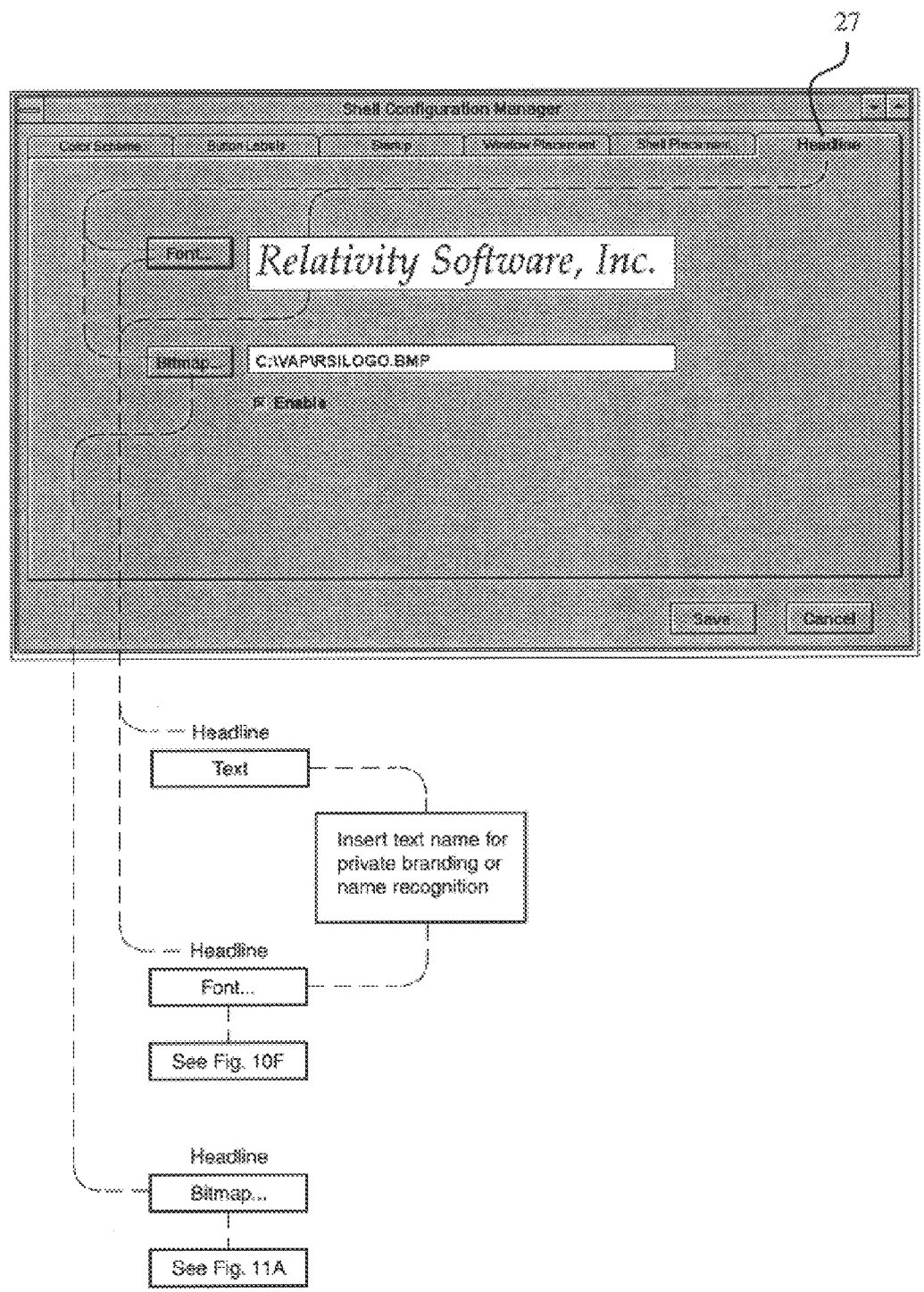

FIG. 15. This shows the Headline Tab.

DETAILED DESCRIPTION OF THE INVENTION

This invention is the second environment that operates with the standard operating single computer system and then co-exists with environment 1 already in place and operating in the computer system. In one configuration as shown in FIG. 1, the dual environments are: [1] the standard operating computer system as seen in item 1; and [2] the video conferencing system as seen in items 2 through 7.

This invention can encompass multiple programs, can extend to multiple environments and can be placed on more than one video monitor as seen in FIG. 6 with the standard operating computer system in the left side monitor that is shown as item 1, and the video conferencing system shown in items 2 through 7 in the monitor on the right side. In this configuration FIG. 6 shows the environment 2 as items 4 and 6; the tool bar system in item 6 with the selection buttons being shown as item 7; the menu system in item 4 with the selection buttons as item 3 showing 40 menu buttons in this demonstration view for video conferencing.

This invention can have two or more independent environments that operate simultaneously with a single computer system. In a dual environment such as shown in the FIG. 6, the video conferencing can be reconfigured as a game, an accounting system, a file, a reference source, or similar independent uses, on its own separate monitor. The capacity and capability of the standard computer in use will dictate certain limitations on the extension of such separate environments as it would on any other application. An application such as this is seen in FIG. 7 wherein 3 environments are shown. Environment 1 is on the left side video monitor [8] as item 1 and typically represents the usual single operating computer activity. Environment 2 is seen on the same left side video monitor in the items 4 and 6, and set up for video teleconferencing with the video image [2], and with the menu [3] at the top, the tool buttons [7] to the right side, and the program headline or logo [5] on the right side lower corner. Environment 3 is on the right side video monitor [8] in the items 9, 4, and 6 with the video screen shown as item 9, and the operating sections as menu 3, tools 7, and headline or logo 5. This configuration can vary as shown in FIG. 3 with a larger video screen and smaller integrated operating section, or other configurations as needed for the programs, visuals, or games as selected.

The installation of standard operating software that contains the instructional program in the single computer system will open up the computer to the use of video conferencing and other additional environments as may be programmed.

The existing single computer system will retain all elements and functions that it currently operates as in its environment one seen in FIG. 1, as item 1. This standard operating computer system operated by versions of its single operating system such as DOS, Windows, Unix, and Macintosh would remain as environment one. The existing standard computer system is typically a desktop operating version with a single monitor as seen in FIG. 1, as item 8; but this system can include the laptop version for the two or more environments, and other variations in computer operating systems.

This invention operates upon execution of a computer language code opening the second environment seen in FIG. 1, as items 4 and 6, in a seamless integration of its program. The initial task would involve selections that build up this new environment to its selected functions, beginning with the location of its menu, its visual screen area and location, and its tools. As seen in the FIG. 1, the menu system is item 4 with its operating functions and activities shown as selection buttons in item 3, and a space is set aside in this configuration as item 5, for a name or logo identifying this new program and environment. The tool system for environment 2 is seen in FIG. 1 as located in item 6 with the selection buttons as item 7. In all 7 of the figures shown with this invention, there is continuity throughout in the description and use of each item as each number [#1–#8] is identical in each drawing.

The flexibility of environment 2 is shown in the FIGS. 2 versus 3, 4 and 5 wherein the menu is moved from the top of the monitor as seen in FIG. 2 to the right side in the FIGS. 3, 4 and 5 and shown with 5 selection buttons in FIGS. 3 and 4, and with 7 buttons in FIG. 5. In FIG. 3 the tool system is not shown, and in the FIG. 4 it has 4 selection buttons, and in the FIG. 5 it has 20 selection buttons. This flexibility is programed into environment 2 to demonstrate the variations useful in setting up video conferencing showing these variations with the different locations and number of buttons for the chosen tasks. The available area for the video screen can be adjusted in each environment as seen in FIG. 3 as opposed to FIG. 5 for the standard environment 1, and the location can be adjusted by use of an editor from FIGS. 1 and 2 at the bottom left to the FIG. 4 at the upper left for environment 1 by use of an editor. This flexibility is important when moving from a standard operating single computer system into a dual, or multiple, environment configuration with different operating needs.

While the use of this second separate adjustable environment is convenient and invaluable for video conferencing as your single computer system is tied up waiting your turn at the video conference, this second environment can be used for other applications which in many cases can be as convenient and invaluable as the use for video conferencing. The adaption of a second environment can create convenience, but so can certain adaptions to extend to a third environment, or to multiple environments; and as well, separate monitors or video systems for viewing these alternative environments. In many situations these multiple environments can be available to other monitors or video systems, other computer systems, as in business systems, locally in the immediate office, in the office area of a department, to regional offices statewide, nationally, or worldwide.

I claim:

1. A computer enhanced environment means comprising:
   a. a first means for hosting video teleconferencing compatible with windowing programs; and
   b. a second means for processing video teleconferencing parameters associated with camera-communications and image positioning including a video screen area division means wherein multiple image-blocks are shown on the single video monitor surface, and an image block means for adjusting size by means of length and height, and location on the video monitor surface such that any other windowing does not overlay or disrupt the video teleconferencing region; and
   c. a combining means in which the first and second means will interact but do not conflict or interfere with each other, and wherein the said environment may operate from a single computer system, and said combining means can operate within a single computer,
   d. means to communicate with other computers, compatible simultaneously with the operating system.

2. The computer enhanced environment means of claim 1 comprising an operating menu means with functions, activities and commands.

3. The computer enhanced environment means of claim 1 comprising an operating tool means with managers, editors, and connectivity.

4. The computer enhanced environment means of claim 3 further comprising:

a. a logo display means;

b. a color definition and altering means.

5. The computer enhanced environment means of claim 1 further comprising a multi-user control selector means.

6. The enhanced computer environments of claim 1 have means capable of bidirectional communication and printing.

7. The enhanced computer environments of claim 1 have means capable of audio, video and data communication.

8. The enhanced computer environment means of claim 1 comprising the means of controlling structure of toolbars and buttons that initiate conferencing, collaboration and communication in desktop computer navigation and management.

9. The enhanced computer environment means of claim 8 wherein the toolbars and buttons on the desktop computer contain means of launching and controlling applications in collaboration and conferencing.

10. The enhanced computer environment means of claim 1 wherein all computers have the means capable of performing tasks, functions, activities, and commands, and all computers operate so that they do impede usage of each other.

* * * * *